United States Patent
Akiyama et al.

(10) Patent No.: US 10,063,322 B2
(45) Date of Patent: Aug. 28, 2018

(54) OPTICAL TRANSMITTER AND CONTROL METHOD OF OPTICAL TRANSMITTER

(71) Applicant: FUJITSU LIMITED, Kawasaki-shi, Kanagawa (JP)

(72) Inventors: Yuichi Akiyama, Kawasaki (JP); Hisao Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/365,892

(22) Filed: Nov. 30, 2016

(65) Prior Publication Data
US 2017/0163347 A1 Jun. 8, 2017

(30) Foreign Application Priority Data
Dec. 3, 2015 (JP) ................... 2015-236850

(51) Int. Cl.
*H04B 10/079* (2013.01)
*H04B 10/548* (2013.01)
*H04B 10/564* (2013.01)

(52) U.S. Cl.
CPC ....... *H04B 10/548* (2013.01); *H04B 10/0795* (2013.01); *H04B 10/564* (2013.01)

(58) Field of Classification Search
CPC .. H04B 10/548; H04B 10/564; H04B 10/532; H04B 10/0795
See application file for complete search history.

(56) References Cited

U.S. PATENT DOCUMENTS

| | | |
|---|---|---|
| 2006/0193640 A1 | 8/2006 | Katagiri et al. |
| 2007/0065161 A1 | 3/2007 | Miura et al. |
| 2012/0128289 A1* | 5/2012 | Kuwahara ............. G02F 1/0123 385/2 |
| 2012/0155880 A1* | 6/2012 | Nishimoto ....... H04B 10/50572 398/79 |
| 2014/0212136 A1* | 7/2014 | Akiyama ........... H04B 10/2513 398/65 |
| 2014/0233963 A1* | 8/2014 | Le Taillandier De Gabory ........................ H04B 10/541 398/183 |
| 2015/0050030 A1* | 2/2015 | Le Taillandier De Gabory ........................ H04B 10/50595 398/183 |

FOREIGN PATENT DOCUMENTS

| | | |
|---|---|---|
| JP | 2006-270909 | 10/2006 |
| JP | 2007-82094 | 3/2007 |

* cited by examiner

*Primary Examiner* — Dzung Tran
(74) *Attorney, Agent, or Firm* — Fujitsu Patent Center

(57) ABSTRACT

A signal shifted from a carrier frequency in a frequency domain by using digital signal processing is generated, and the optical modulator is driven with a drive signal based on the signal. A monitor monitors whether or not a component of a modulated signal light output from the optical modulator appears in a specific frequency depending on a frequency shift performed by the digital signal processing, and the controller controls a relation between a sign of the drive signal and an operating point of the optical modulator according to a monitored result.

11 Claims, 54 Drawing Sheets

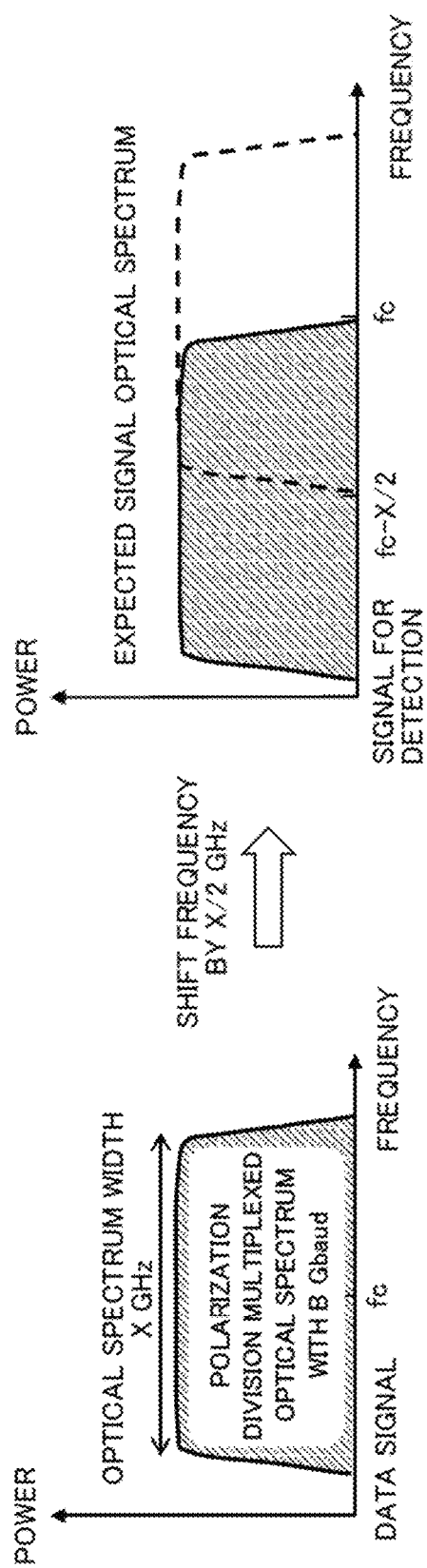

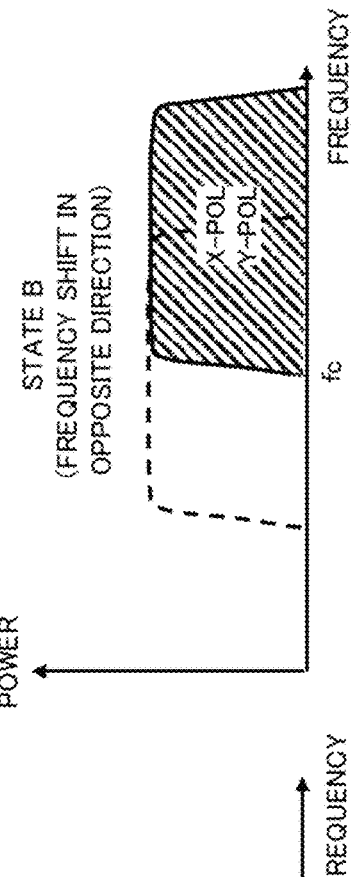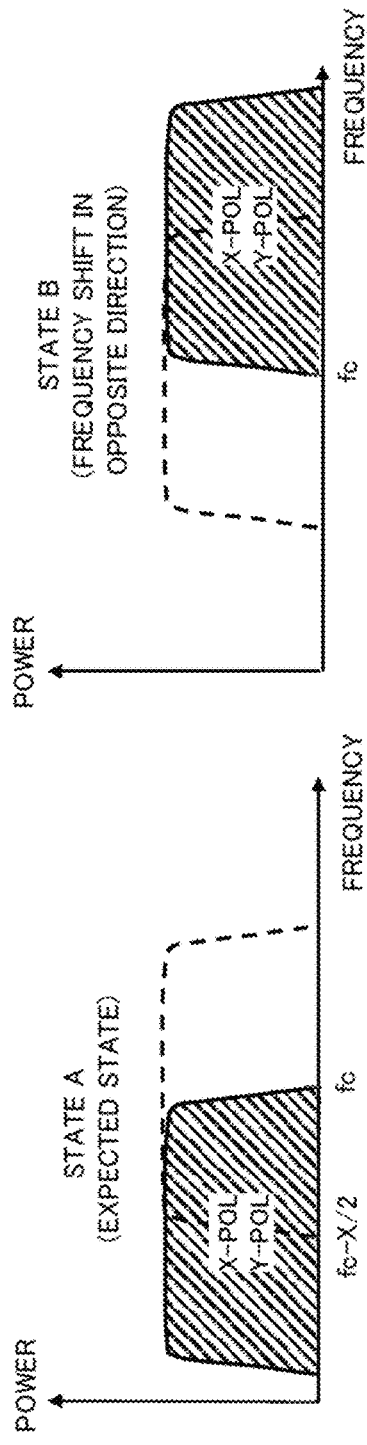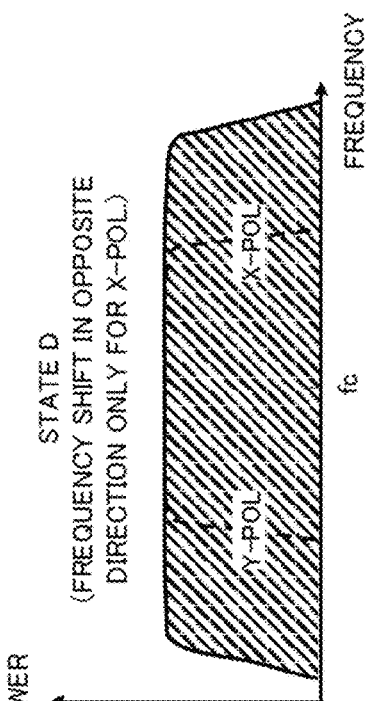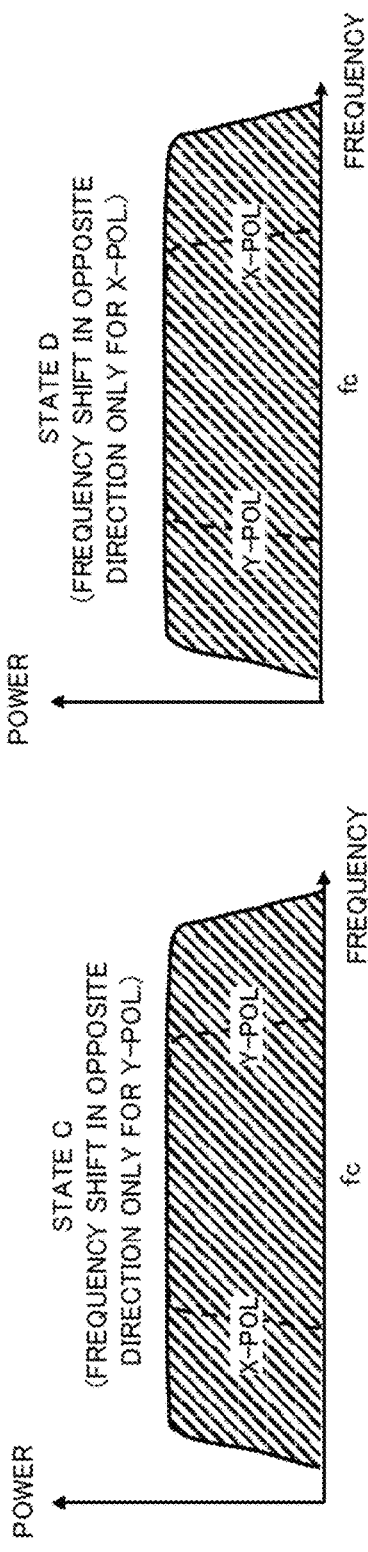

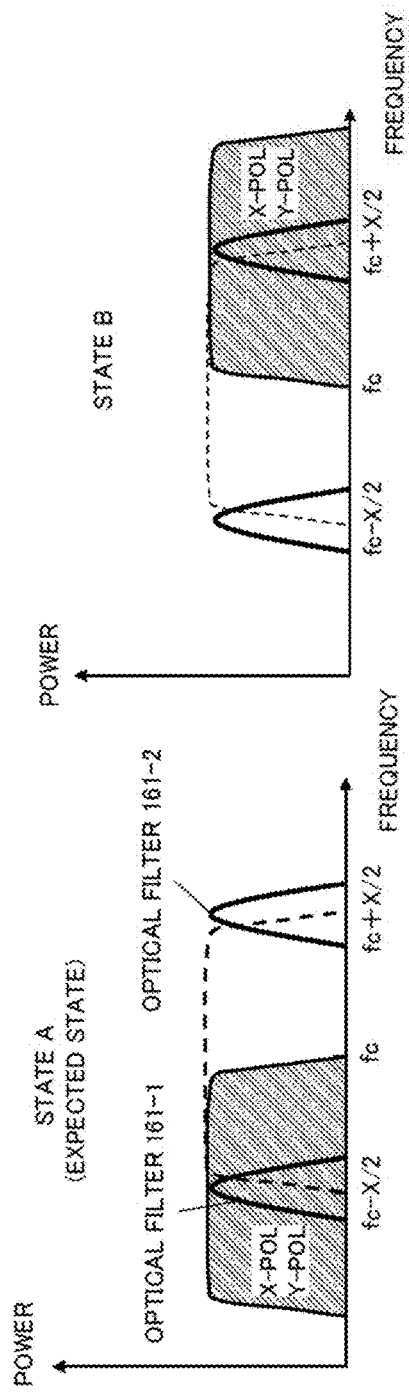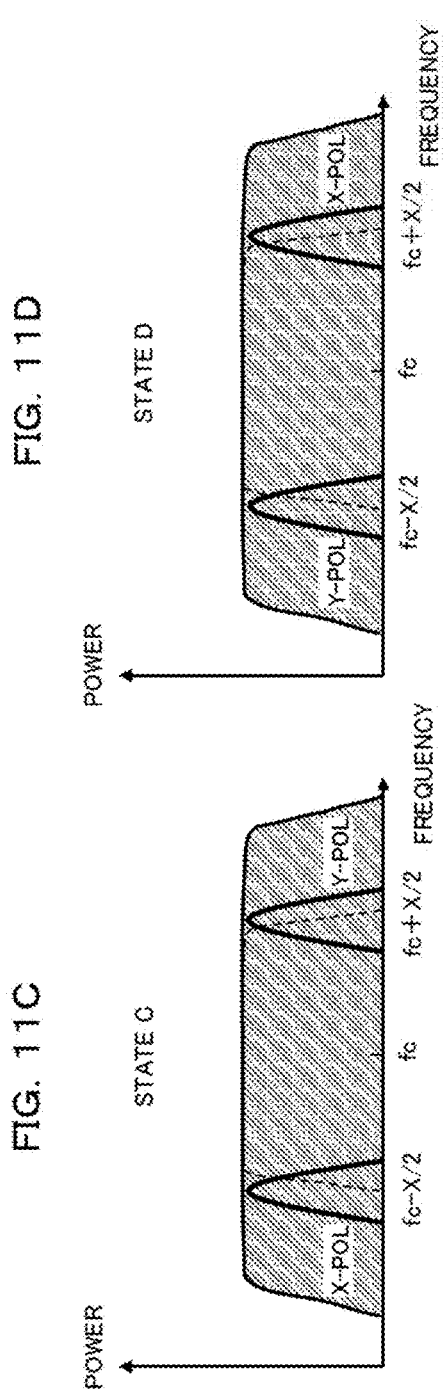

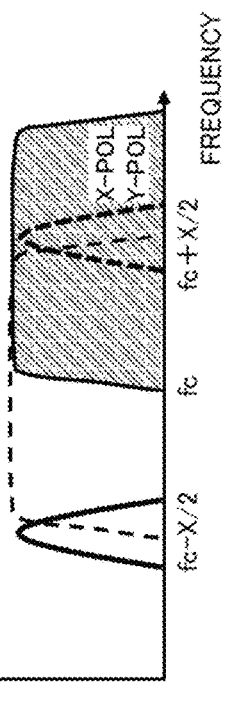
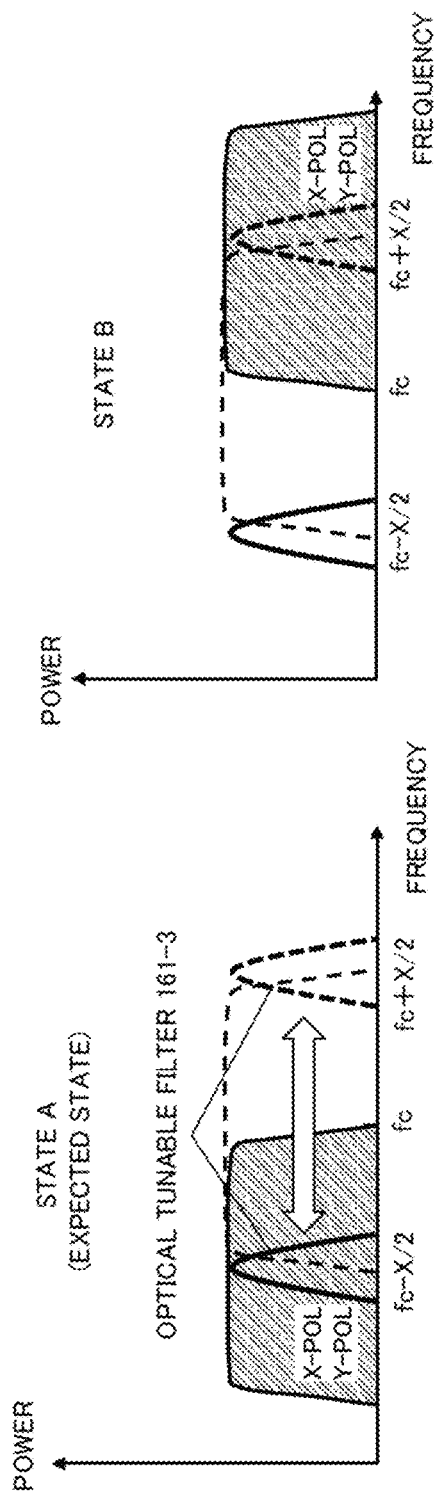
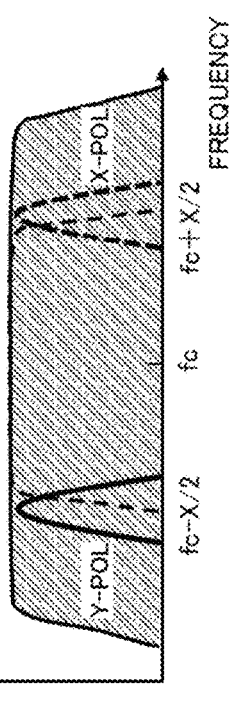
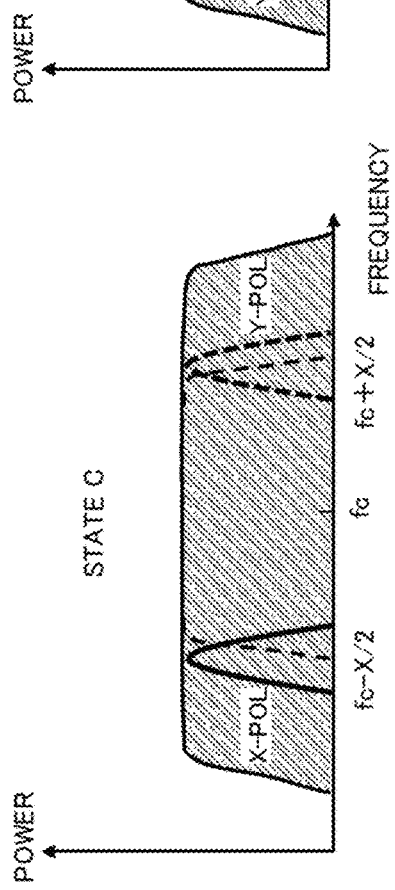

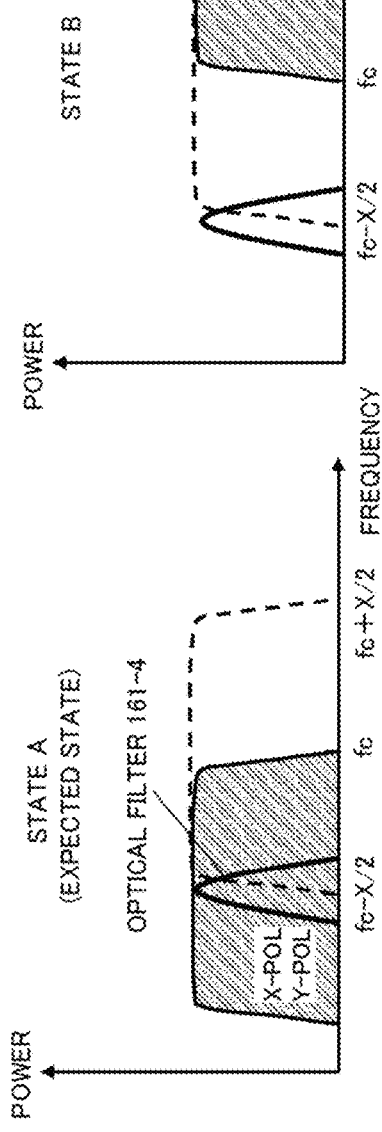
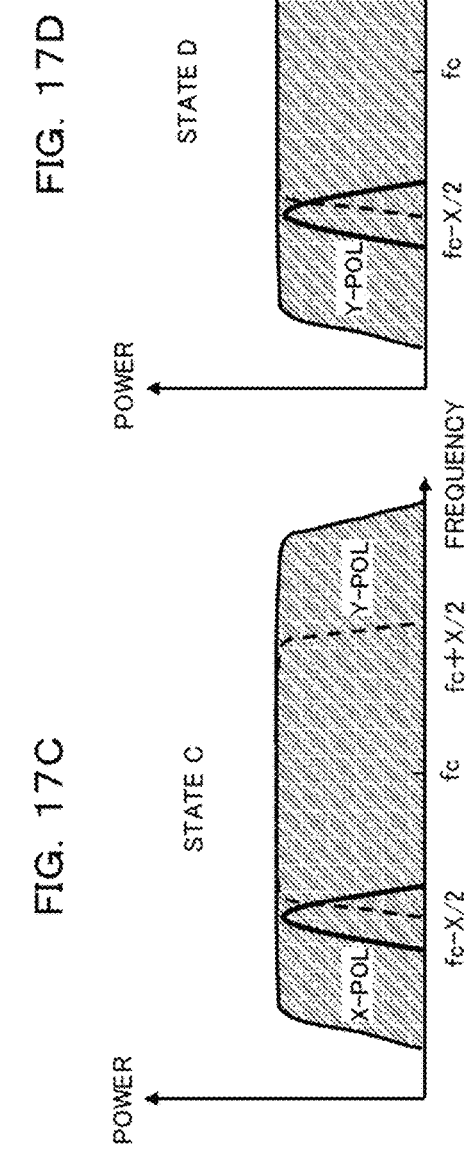
FIG. 17A STATE A (EXPECTED STATE) — OPTICAL FILTER 161-4
FIG. 17B STATE B
FIG. 17C STATE C
FIG. 17D STATE D

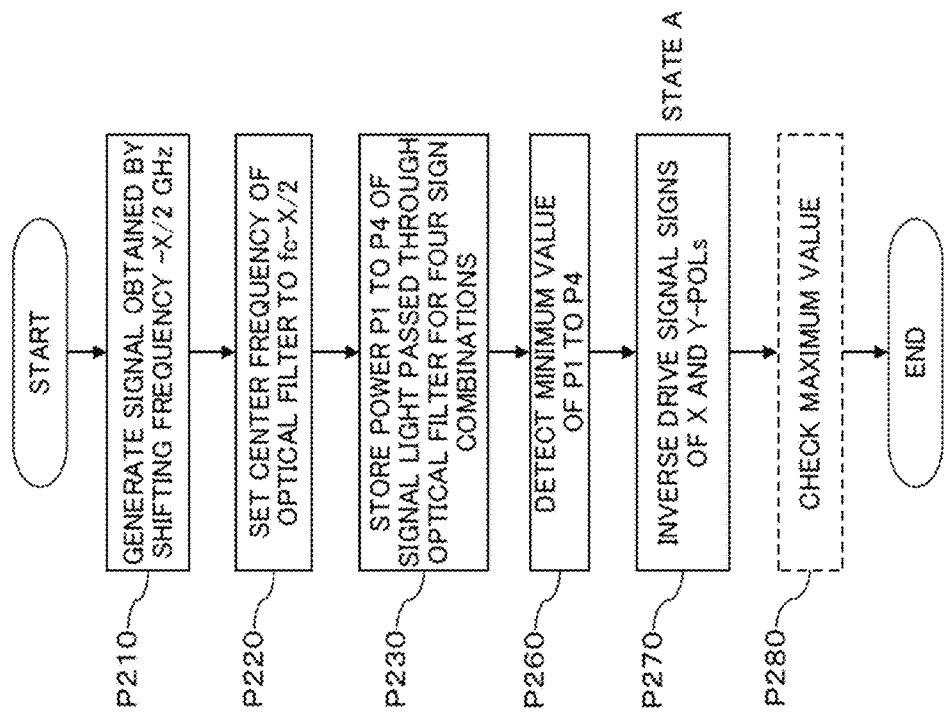

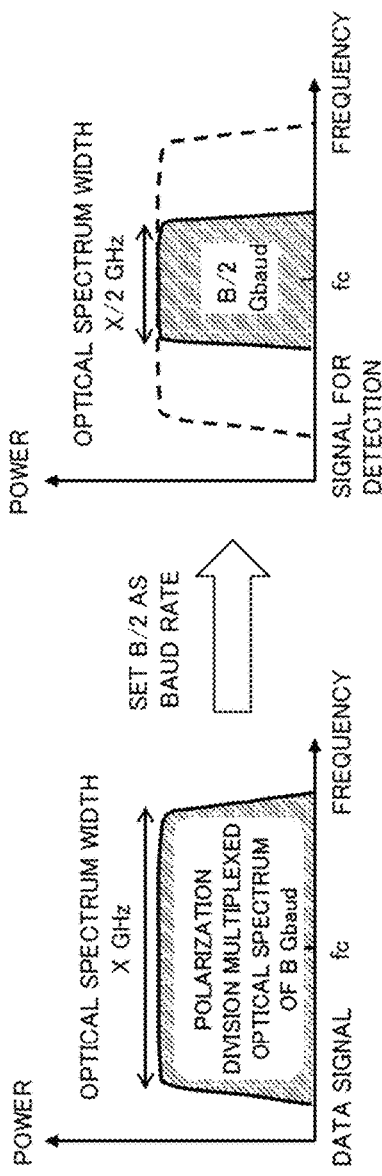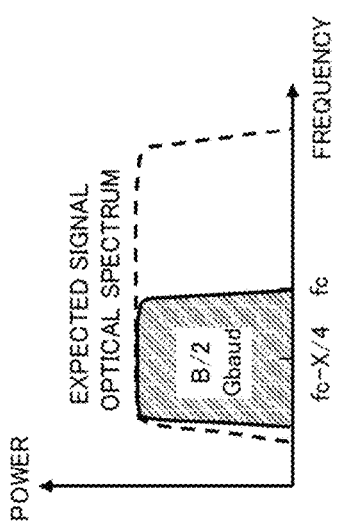

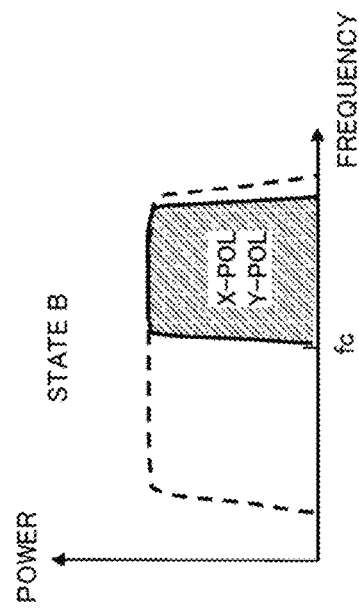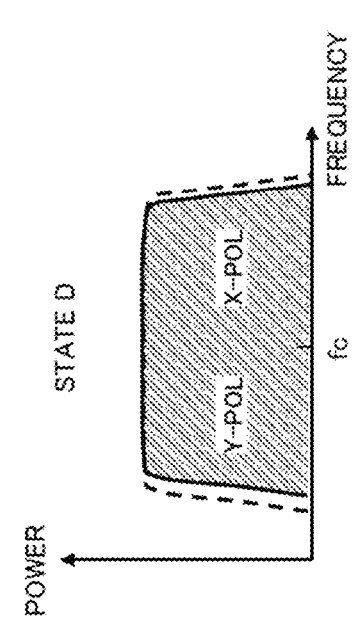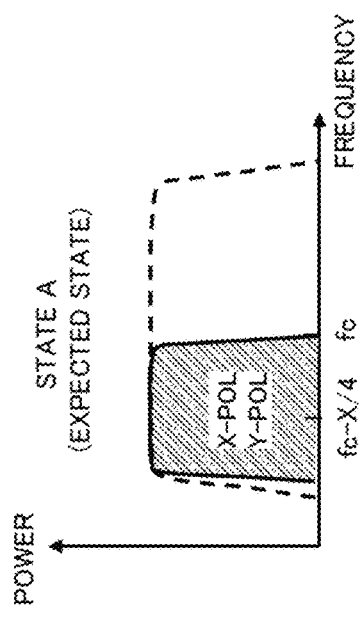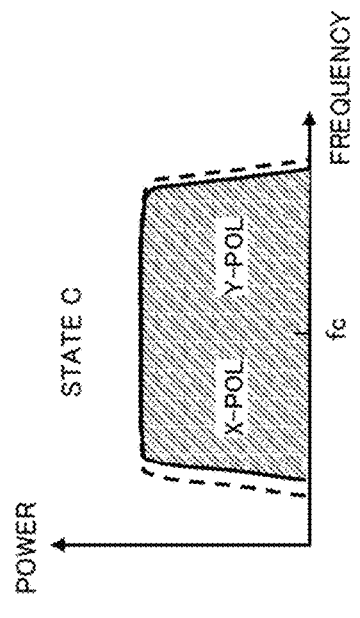

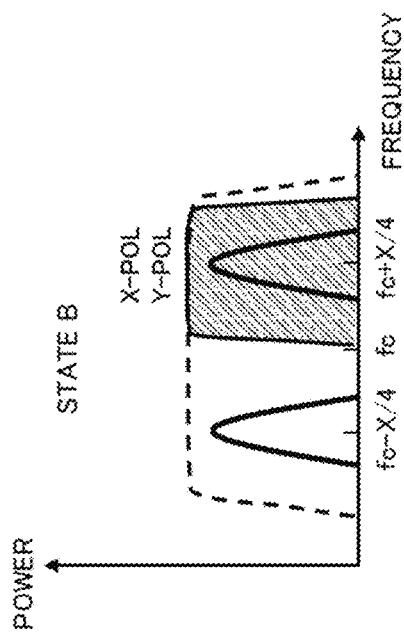
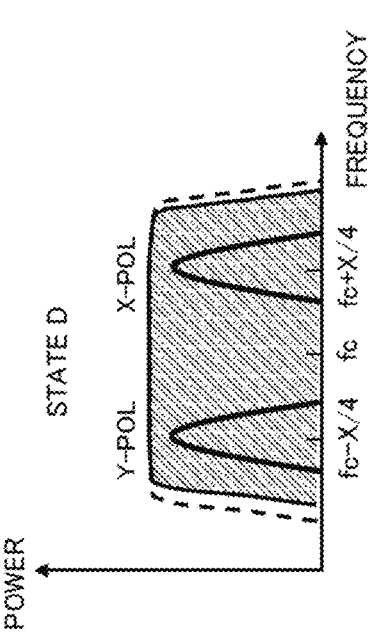
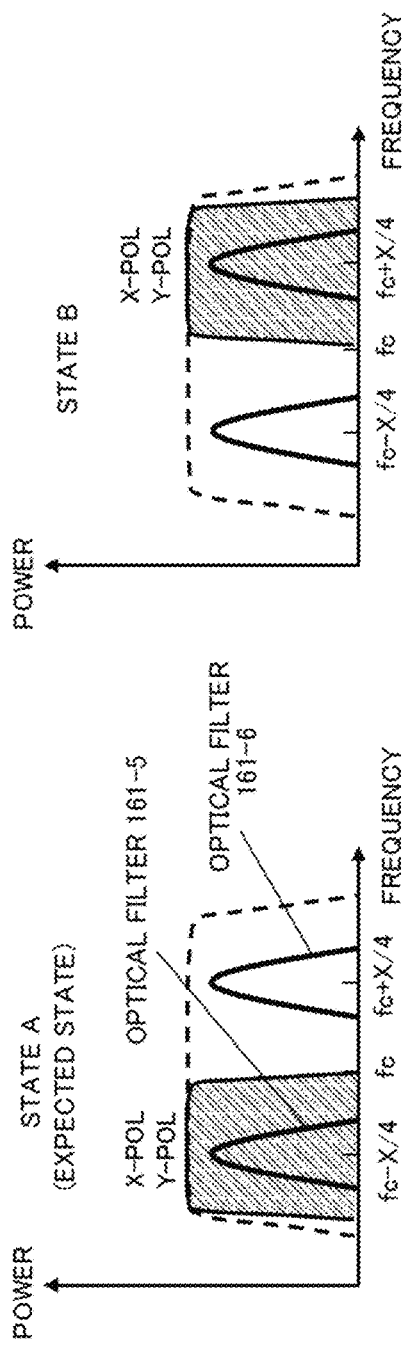
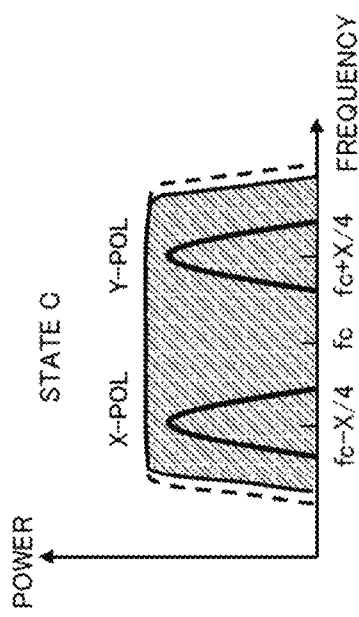

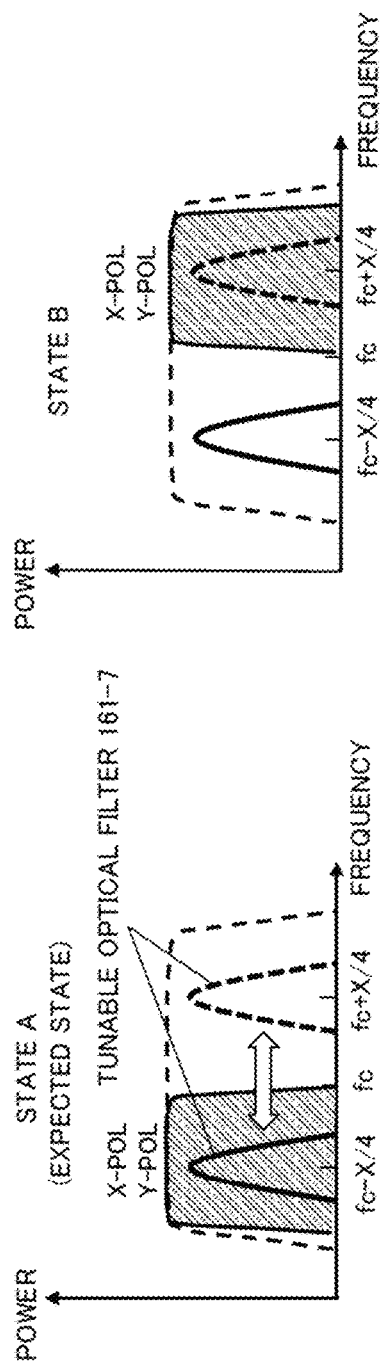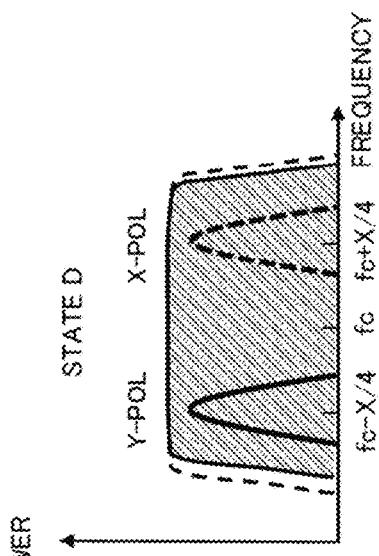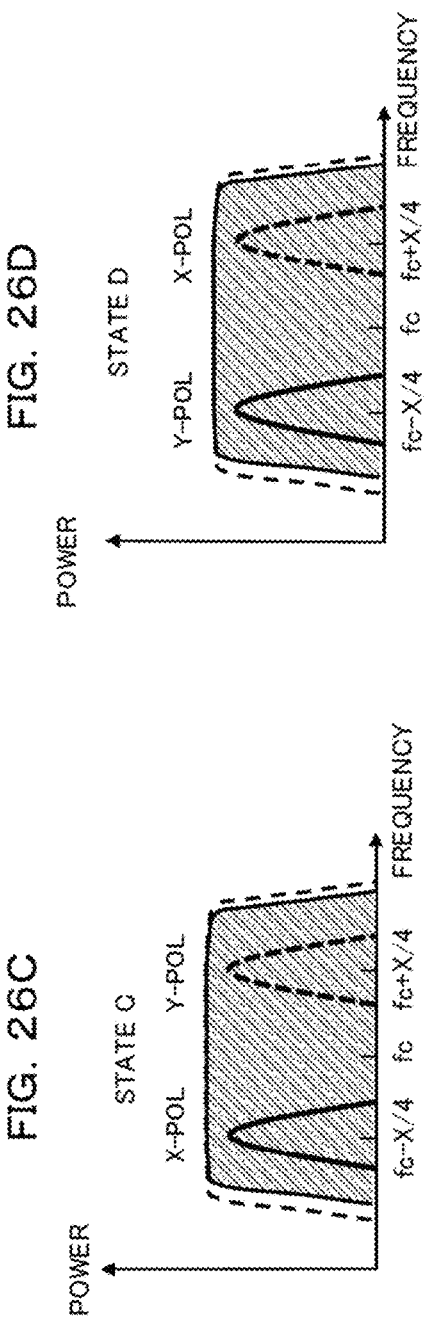

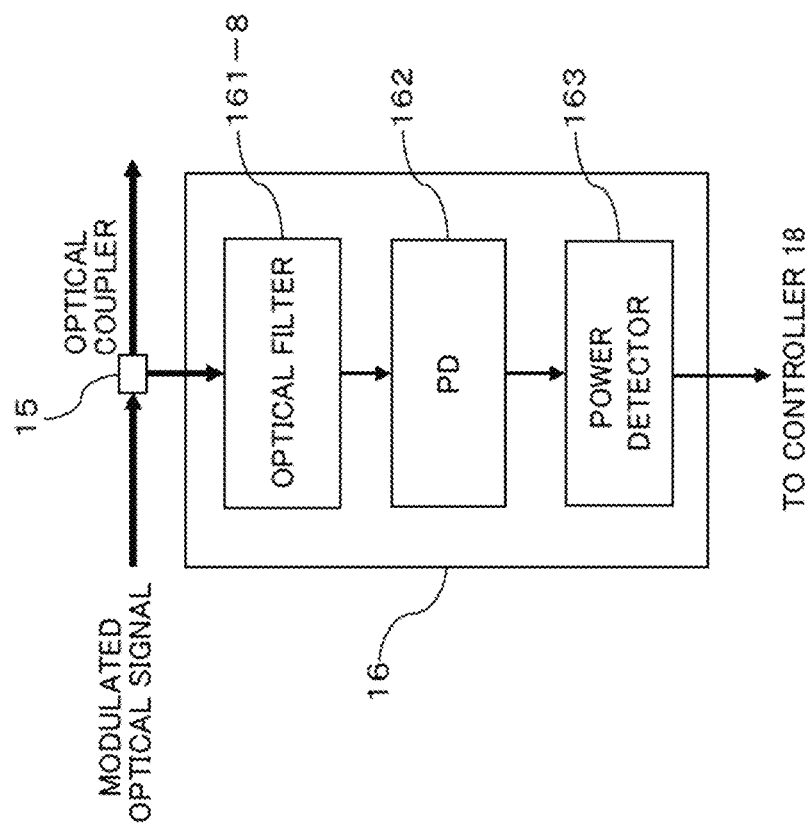

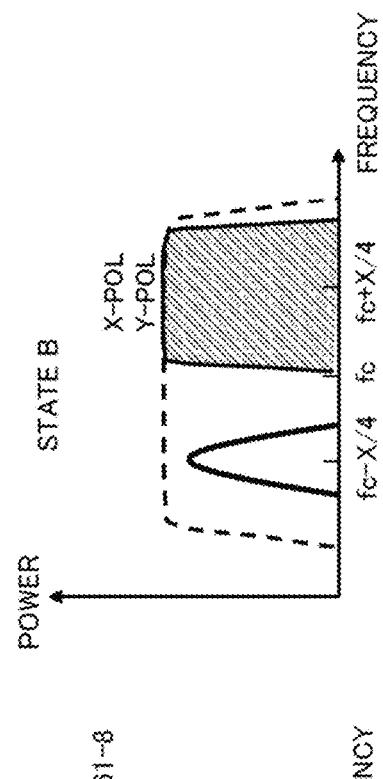
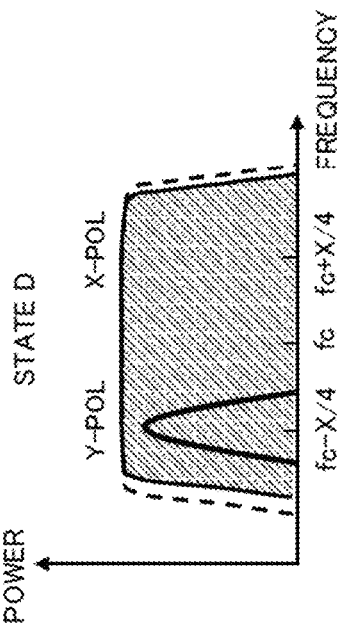
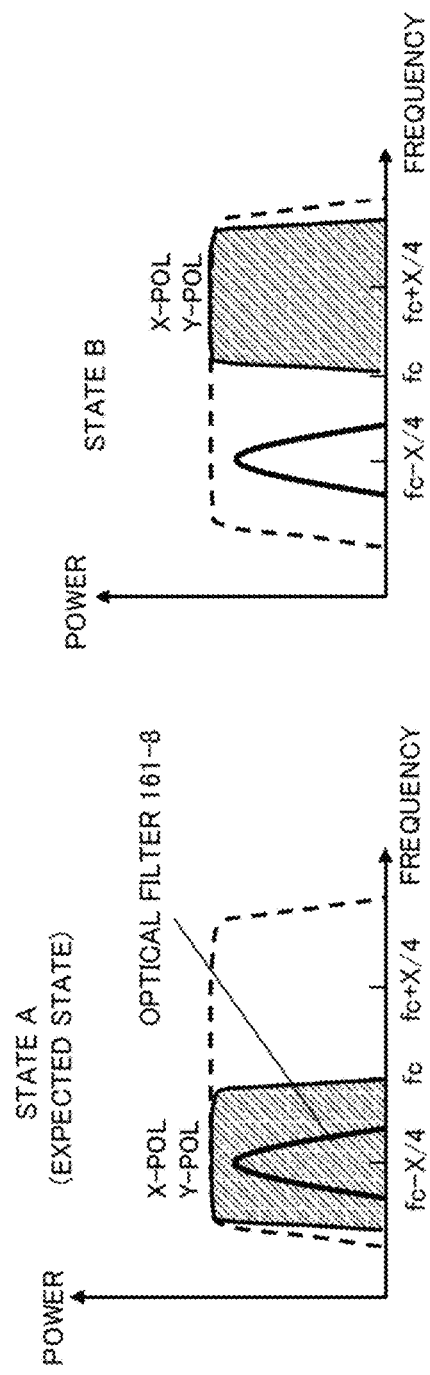
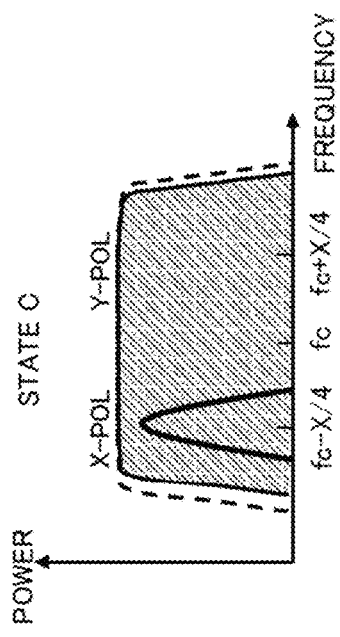

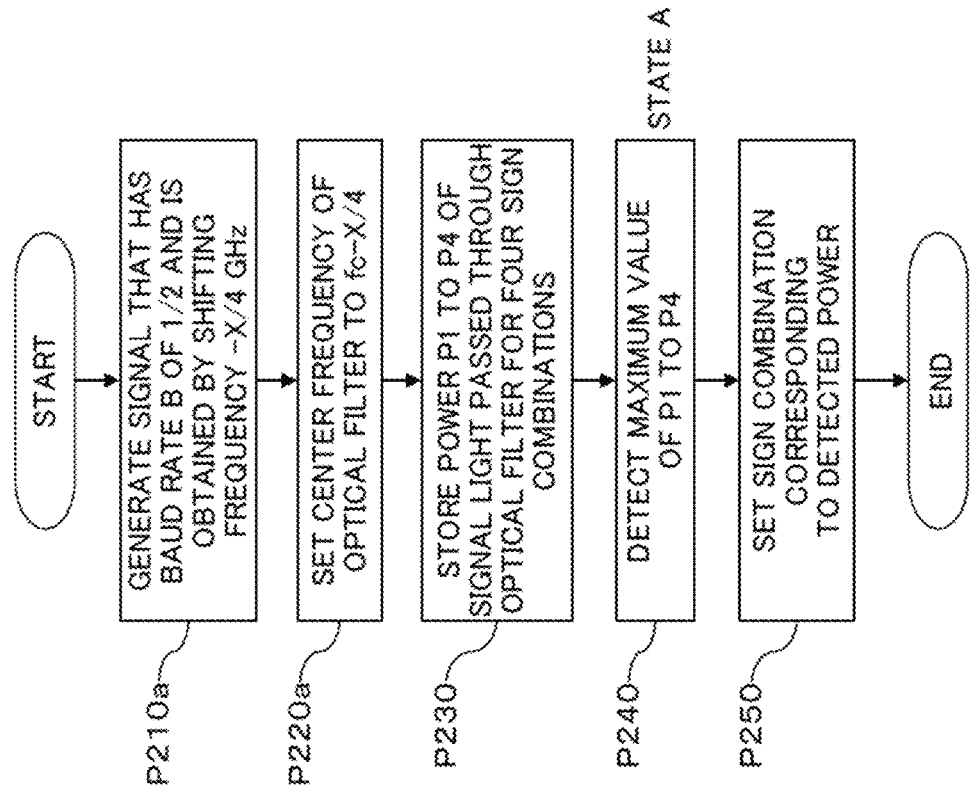

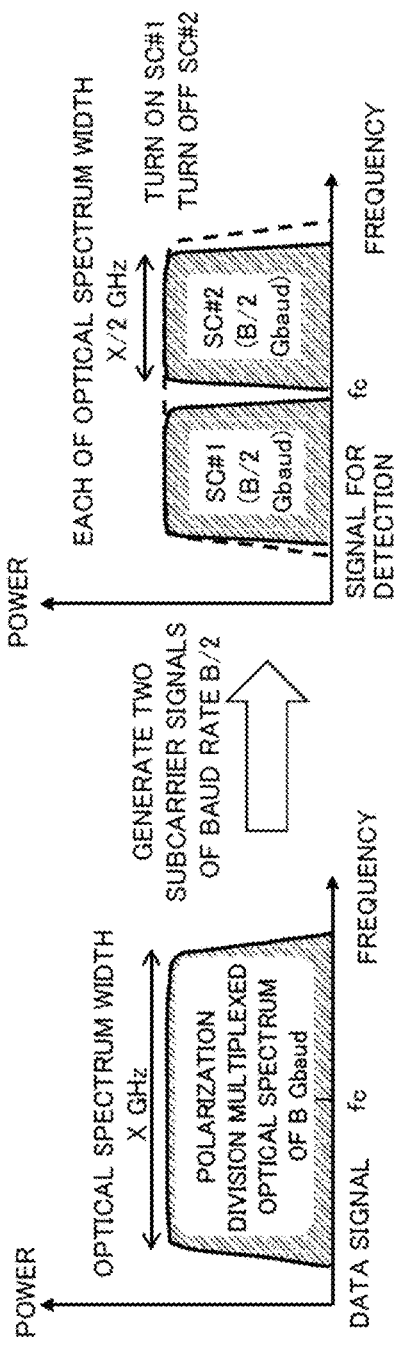

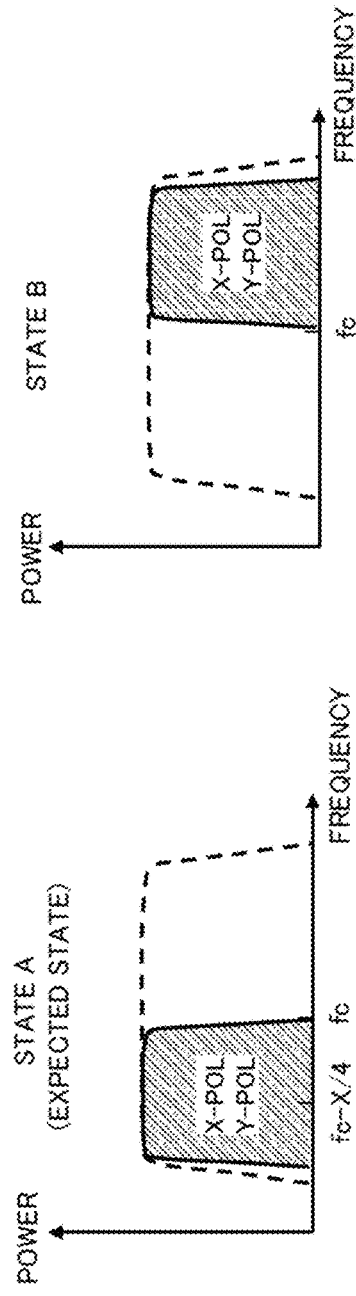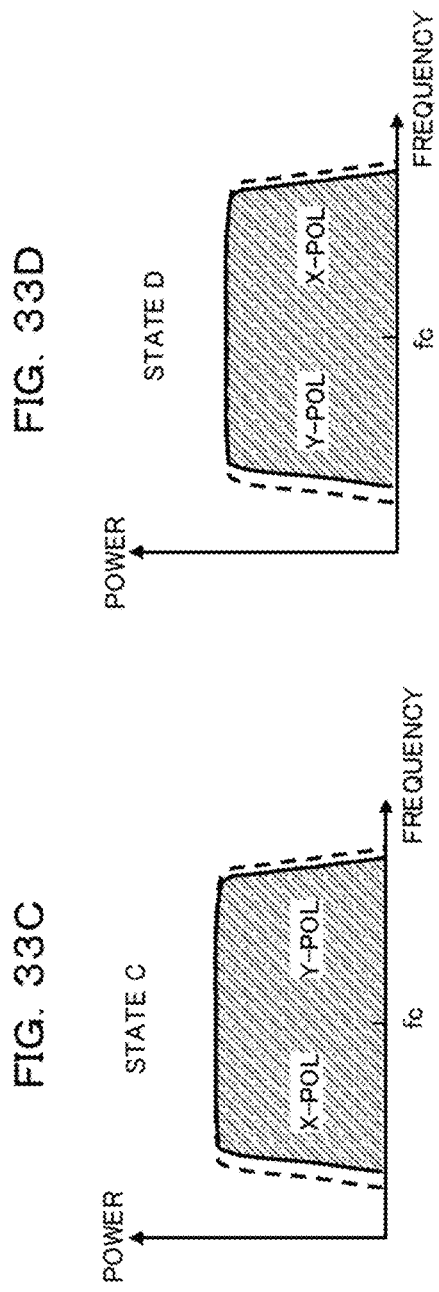

FIG. 35A STATE A (EXPECTED STATE)

FIG. 35B STATE B

FIG. 35C STATE C

FIG. 35D STATE D

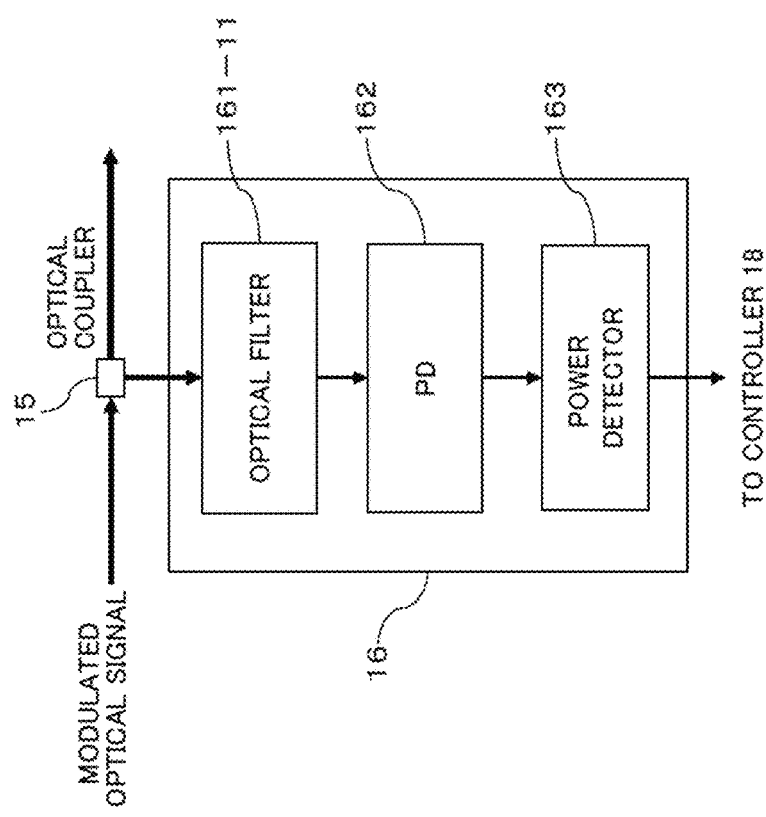

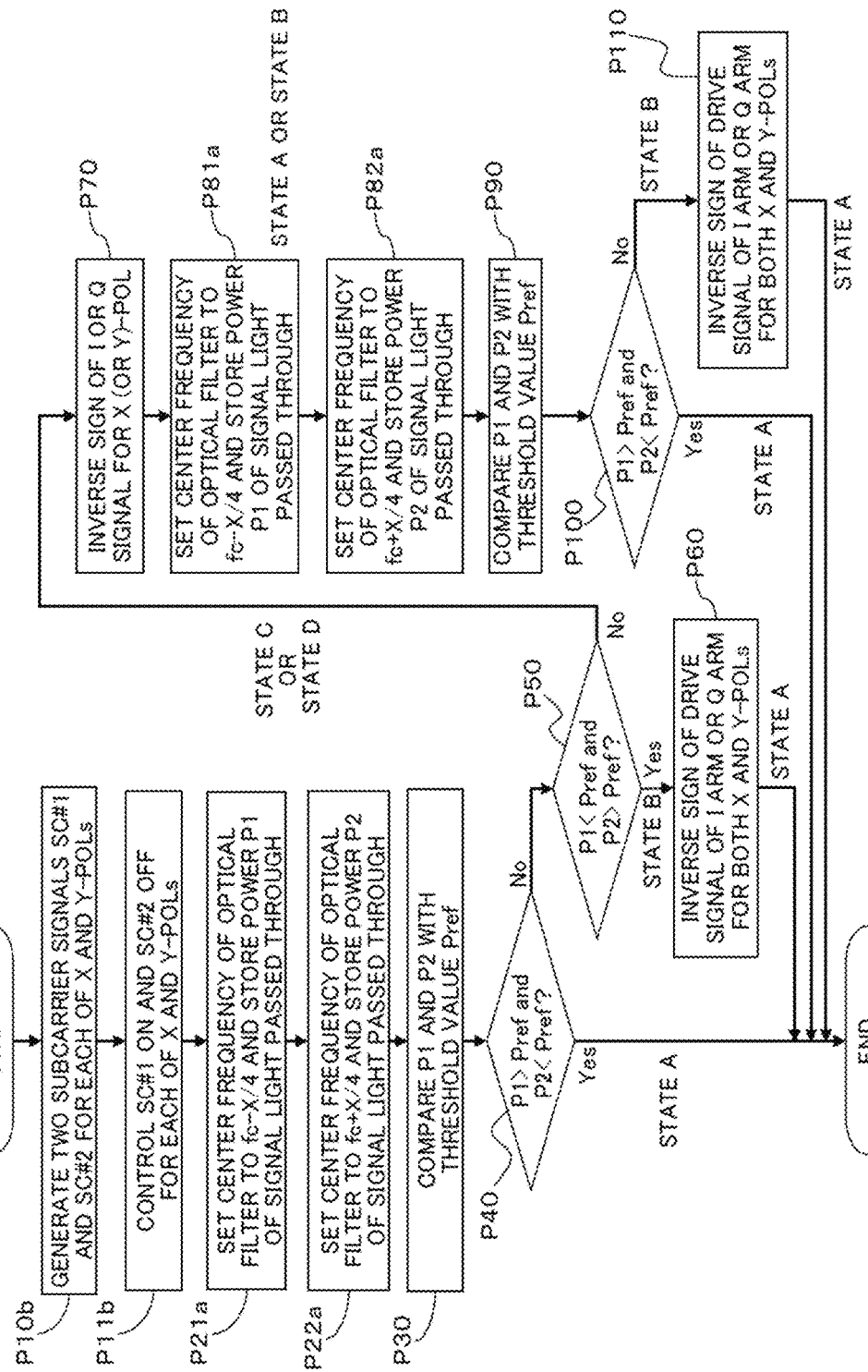

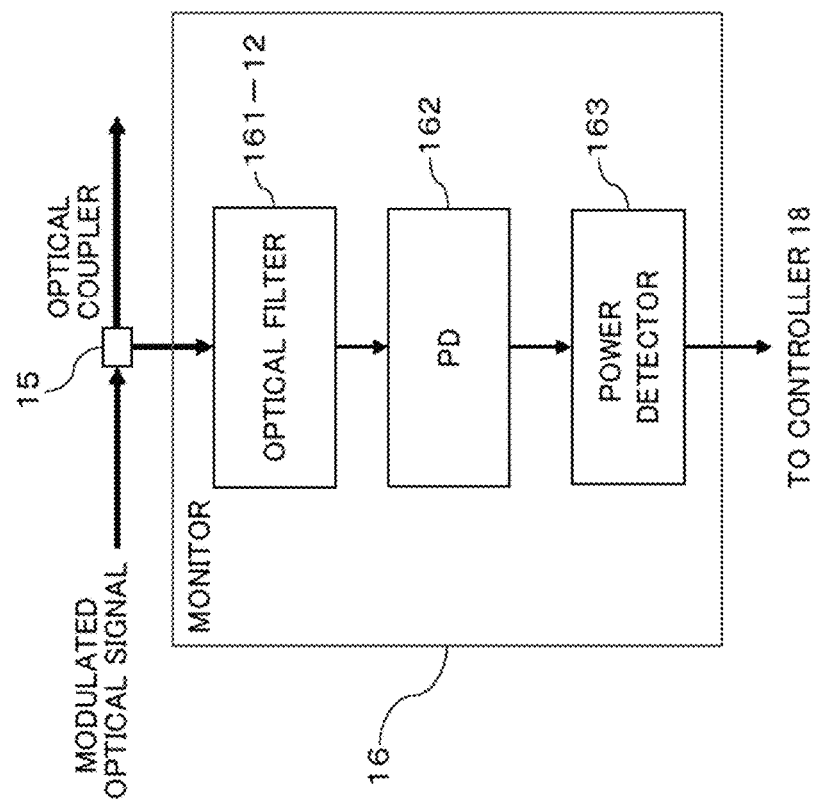

STATE A
(EXPECTED STATE)

STATE C

STATE B

STATE D

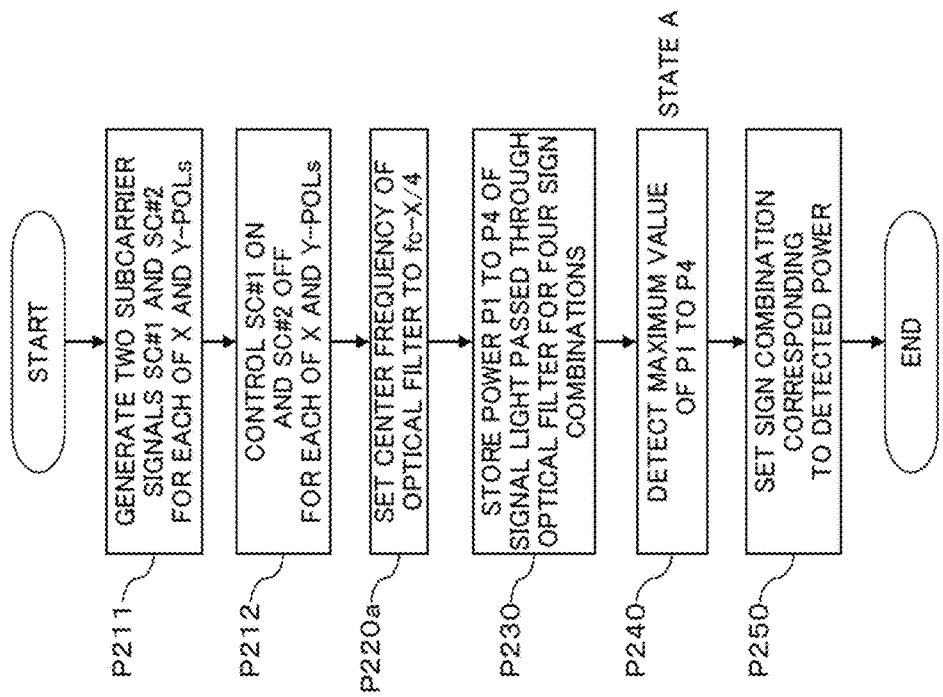

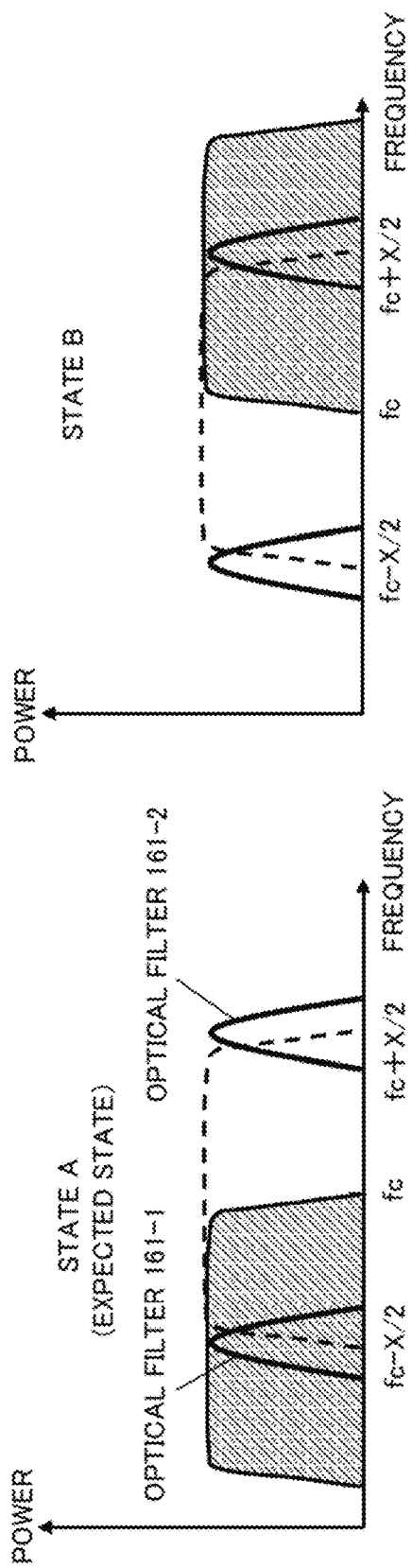

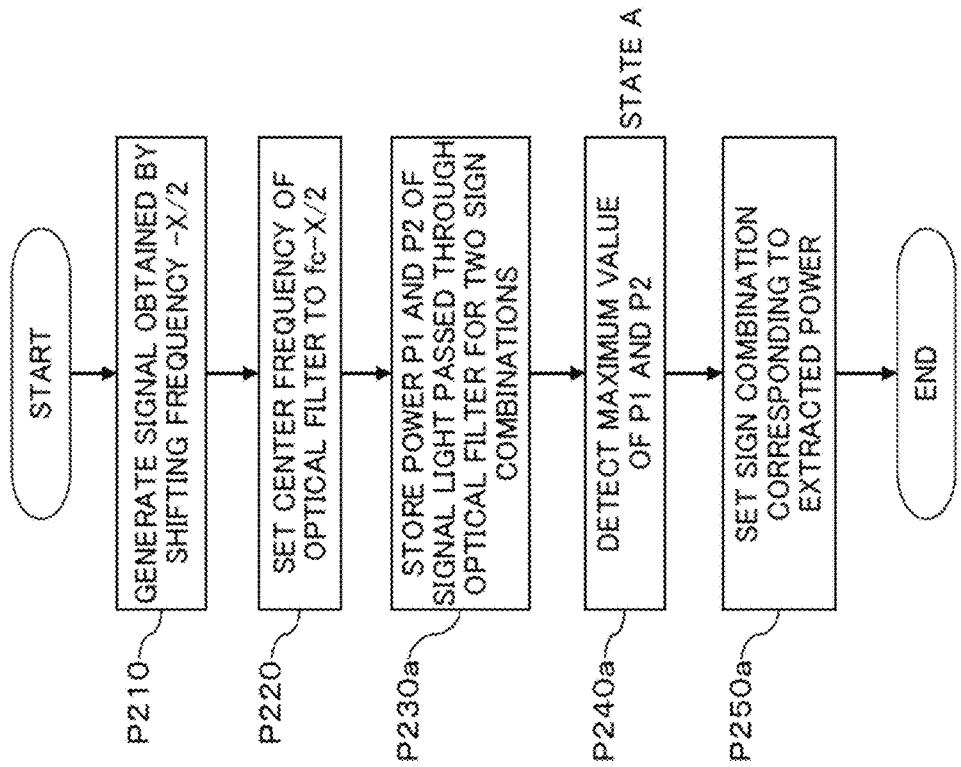

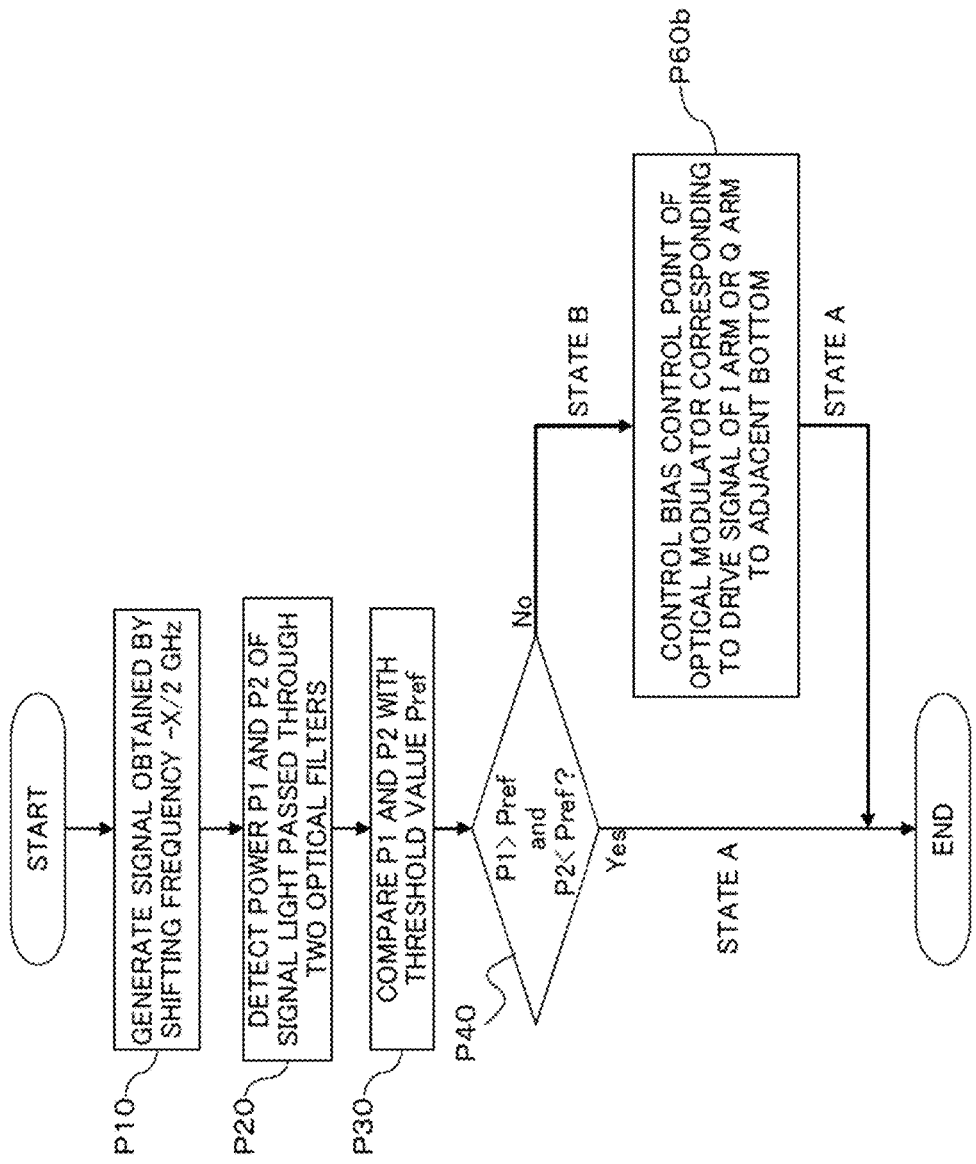

OPTICAL TRANSMITTER AND CONTROL METHOD OF OPTICAL TRANSMITTER

CROSS-REFERENCE TO RELATED APPLICATION

This application is based upon and claims the benefit of priority of the prior Japanese Patent application No. 2015-236850, filed on Dec. 3, 2015, the entire contents of which are incorporated herein by reference.

FIELD

The embodiments discussed herein are related to an optical transmitter and a control method of an optical transmitter.

BACKGROUND

In order to achieve a next generation long-distance and large-capacity communication system, a technology to apply digital signal processing to a drive signal for an optical modulator provided in an optical transmitter has been researched.

For example, it has been researched that an optical transmitter available to perform digital signal processing on a transmission data signal used for a drive signal of an optical modulator to generate a modulated signal light with any of various optical waveforms.

Further, as an example of a technology to increase a transmission capacity, a multilevel modulation technique such as a quadrature phase shift keying (QPSK) or a quadrature amplitude modulation (QAM) has also been researched.

Patent Document 1: JP 2007-82094 A
Patent Document 2: JP 2006-270909 A

When a phase variation according to the digital signal processing is applied to the transmission data signal used for the drive signal of the optical modulator, a sign of the transmission data signal may be inverted due to a relation between a sign of the transmission data signal and an operating point of the optical modulator set by a bias control. In other words, there is a possibility that the phase variation of the modulated signal light does not correspond to an expected (or desired) phase variation according to the digital signal processing.

SUMMARY

In one aspect, an optical transmitter may include a signal generator, an optical modulator, a monitor, and a controller. The signal generator may generate a signal shifted from a carrier frequency in a frequency domain by using digital signal processing. The optical modulator may be driven with a drive signal based on the signal. The monitor may monitor whether or not a component of modulated signal light output from the optical modulator appears in a specific frequency depending on a frequency shift performed by the digital signal processing. The controller may control a relation between a sign of the drive signal and an operating point of the optical modulator according to a monitored result of the monitor.

Further, in one aspect, a control method of an optical transmitter provided with an optical modulator may include the following processes:

(a) a process to generate a signal shifted from a carrier frequency in a frequency domain by using digital signal processing and to drive the optical modulator with a drive signal based on the signal;

(b) a process to monitor whether or not a component of modulated signal light output from the optical modulator appears in a specific frequency depending on a frequency shift performed by the digital signal processing; and (c) a process to controll a relation between a sign of the drive signal and an operating point of the optical modulator according to a monitored result of (b).

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8A is a diagram illustrating an example of a modulated signal optical spectrum;

FIG. 8B is a diagram illustrating an example in which the modulated signal optical spectrum illustrated in FIG. 8A is frequency-shifted from a carrier frequency according to a frequency shift of a drive signal;

FIGS. 9A to 9D are diagrams illustrating examples of four possible states of a modulated signal optical spectrum output from a polarization multiplexing optical modulator according to a relation between a bias control point and an output light phase variation of a polarization multiplexing optical modulator illustrated in FIG. 6;

FIGS. 11A to 11D are diagrams illustrating examples of a relation between the four possible states of the modulated signal optical spectrum illustrated in FIGS. 9A to 9D and filter characteristics of two optical filters illustrated in FIG. 10;

FIGS. 14A to 14D are diagrams illustrating examples of a relation between the four possible states of the modulated signal optical spectrum illustrated in FIGS. 9A to 9D and filter characteristics of an optical tunable filter illustrated in FIG. 13;

FIGS. 17A to 17D are diagrams illustrating examples of a relation between the four possible states of the modulated signal optical spectrum illustrated in FIGS. 9A to 9D and filter characteristics of an optical filter illustrated in FIG. 16;

FIG. 19 is a flowchart illustrating an exemplary operation according to a third modified example of the first embodiment;

FIG. 20A is a diagram illustrating an example of a modulated signal optical spectrum according to a second embodiment;

FIG. 20B is a diagram illustrating an example in which a modulated signal optical spectrum illustrated in FIG. 20A is narrowed as a baud rate of a drive signal is decreased;

FIG. 20C is a diagram illustrating an example in which a modulated signal optical spectrum illustrated in FIG. 20B is frequency-shifted from a carrier frequency according to a frequency shift of the drive signal;

FIGS. 21A to 21D are diagrams illustrating examples of four possible states of a modulated signal optical spectrum illustrated in FIG. 20C according to a relation between a bias control point and an output light phase variation of a polarization multiplexing optical modulator;

FIGS. 23A to 23D are diagrams illustrating examples of a relation between the four possible states of the modulated signal optical spectrum illustrated in FIGS. 21A to 21D and filter characteristics of two optical filters illustrated in FIG. 22;

FIGS. 26A to 26D are diagrams illustrating examples of a relation between the four possible states of the modulated signal optical spectrum illustrated in FIGS. 21A to 21D and filter characteristics of an optical tunable filter illustrated in FIG. 25;

FIG. 28 is a block diagram illustrating an exemplary configuration of a monitor according to a second modified example of the second embodiment;

FIGS. 29A to 29D are diagrams illustrating examples of a relation between the four possible states of the modulated signal optical spectrum illustrated in FIGS. 21A to 21D and filter characteristics of an optical filter illustrated in FIG. 28;

FIG. 30 is a flowchart illustrating an exemplary operation according to a second modified example of the second embodiment;

FIG. 32A is a diagram illustrating an example of a modulated signal optical spectrum according to a third embodiment;

FIG. 32B is a diagram illustrating an example of a subcarrier-modulated signal optical spectrum when a plurality of subcarrier signals are used for a drive signal;

FIG. 32C is a diagram illustrating an example of a subcarrier-modulated signal optical spectrum when one of the plurality of subcarrier signals is off-controlled;

FIGS. 33A to 33D are diagrams illustrating examples of four possible states of a modulated signal optical spectrum illustrated in FIG. 32C according to a relation between a bias control point and an output light phase variation of a polarization multiplexing optical modulator;

FIG. 37 is a block diagram illustrating an exemplary configuration of a monitor according to a first modified example of the third embodiment;

FIG. 39 is a flowchart illustrating an exemplary operation according to the first modified example of the third embodiment;

FIG. 40 is a block diagram illustrating an exemplary configuration of a monitor according to a second modified example of the third embodiment;

FIG. 42 is a flowchart illustrating an exemplary operation according to a second modified example of the third embodiment;

FIGS. 47A and 47B are diagrams illustrating examples of a relation between the two possible states of the modulated signal optical spectrum illustrated in FIGS. 46A and 46B and filter characteristics of two optical filters illustrated in FIG. 10;

FIG. 52 is a flowchart illustrating an exemplary operation according to the second modified example of the fifth embodiment;

FIG. 54 is a flowchart illustrating an example in which a bias control corresponding to the exemplary operation illustrated in FIG. 44 is applied to the optical transmitter illustrated in FIG. 45.

DESCRIPTION OF EMBODIMENTS

Figure 1:
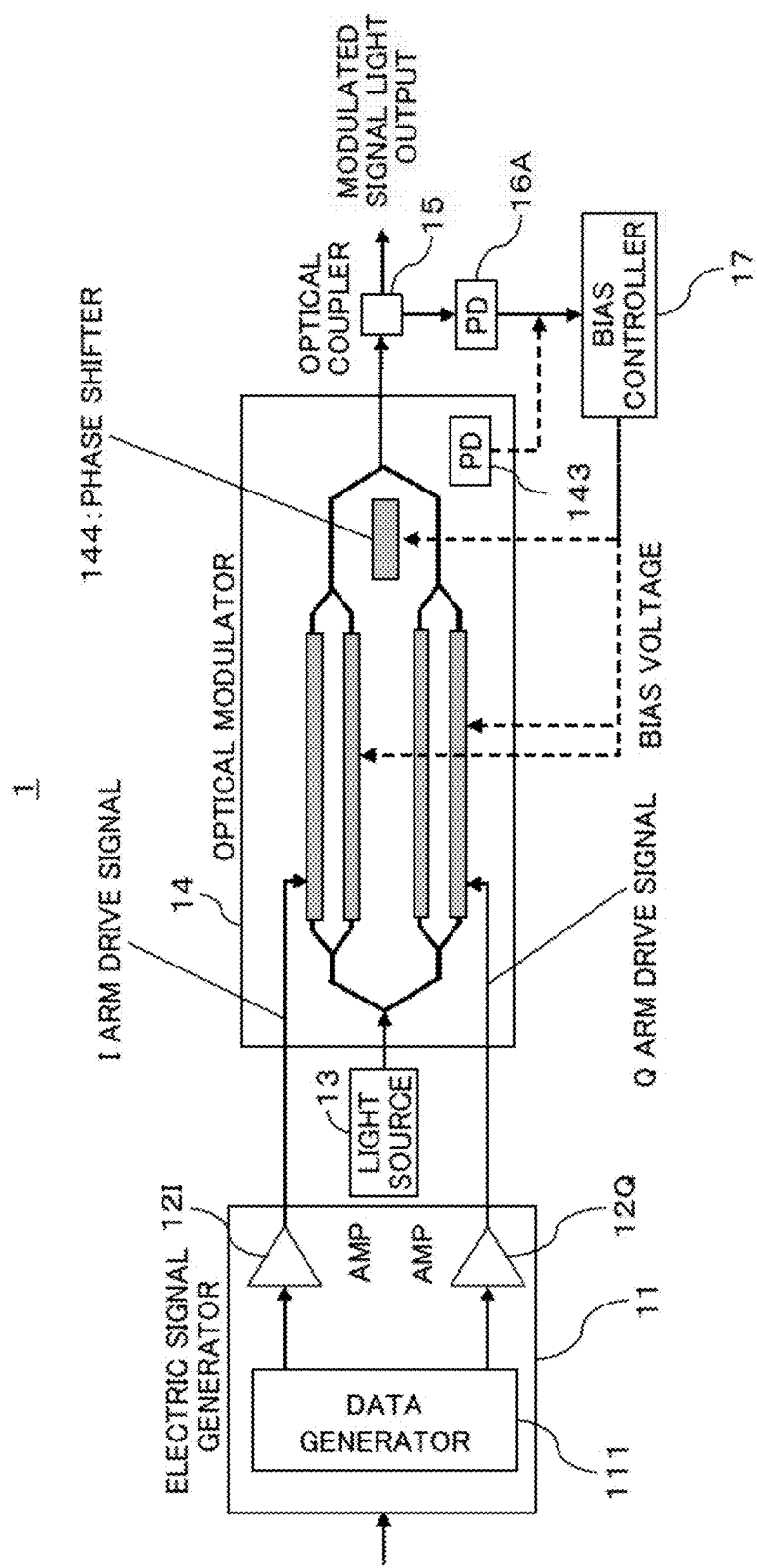
FIG. 1 is a block diagram illustrating an exemplary configuration of an optical transmitter.

Hereinafter, an exemplary embodiment(s) will be described with reference to the drawings. However, the embodiment(s) described below is merely an example and not intended to exclude an application of various modifications or techniques which are not explicitly described below. Further, various exemplary aspects described below may be appropriately combined and carried out. Elements or components assigned the same reference numeral in the drawings used for the following embodiment(s) will represent identical or similar elements or components unless otherwise specified.

FIG. 1 is a block diagram illustrating an exemplary configuration of an optical transmitter (may also be referred to as an "optical transmission device."). The optical transmitter 1 illustrated in FIG. 1 includes, for example, an electric signal generator 11, a light source 13, an optical modulator 14, an optical coupler 15, a photodetector or photodiode (PD) 16A, and a bias controller 17.

The electric signal generator 11 generates an electric signal (may also be referred to as a "drive signal") used to drive the optical modulator 14. The electric signal generator 11 may include, for example, a data generator 111 and amplifiers 12I and 12Q. The amplifiers 12I and 12Q may be arranged outside the electric signal generator 11.

The data generator 111 generates a transmission data signal, for example. The transmission data signal may be an analog electric signal. The analog electric signal may be generated separately for an in-phase component (an I component) and a quadrature component (a Q component) when the analog electric signal is allocated (or mapped) to a symbol represented on a complex plane (an IQ plane).

Each of the amplifiers 12I and 12Q may be an electric amplifier and may be provided for an I component signal and a Q component signal separately, for example. The amplifiers 12I and 12Q amplify the I component signal and the Q component signal respectively to involve appropriate amplitudes as the drive signals for the optical modulator 14. Therefore, the amplifiers 12I and 12Q may also be referred to as "driver amplifiers" 12I and 12Q or referred to simply as "drivers" 12I and 12Q.

For example, one driver amplifier 12I may generate a drive signal having an amplitude according to the I component signal to apply the drive signal to a drive electrode provided on an optical waveguide that forms an I arm of the optical modulator 14.

The other driver amplifier 12Q may generates a drive signal having an amplitude according to the Q component signal to apply the drive signal to a drive electrode provided on an optical waveguide that forms a Q arm of the optical modulator 14.

The light source 13 output light with a certain wavelength. A laser diode (LD) may be applied to the light source 13. The LD may be a tunable LD available to change wavelengths of output light. The output light of the light source 13 may be input to the optical modulator 14.

The optical modulator 14 may be, for example, an LN modulator using lithium niobate ($LiNbO_3$) and may include the optical waveguide that forms the I arm and the optical waveguide that forms the Q arm. The optical modulator 14 may further include an optical branch unit that branches light from the light source 13 for the I arm and the Q arm and an optical interference unit at which lights propagated along the I arm and the Q arm are mixed and optically interfere each other.

As described above, the drive electrodes are provided on the I arm and the Q arm, and the drive signals are applied from the driver amplifiers 12I and 12Q to the drive electrodes, respectively.

A refractive index of a corresponding one of the I arm and the Q arm changes according to a change in the drive signal applied to the drive electrode, and thus a phase of light propagated along the corresponding one of the I arm or the Q arm changes.

According to the change in the phase of the light, intensity of light output from the optical interference unit changes. In such a way, the output light of the light source 13 is modulated by the optical modulator 14 based on the drive signal according to the transmission data signal, so that modulated signal light is generated.

The optical modulator 14 may be provided with a phase shifter 144 which applies a phase difference (may also be referred to as a "phase shift amount") to the lights that are propagated along the I arm and the Q arm and are caused to interfere each other at the optical interference unit. The phase shift amount of the phase shifter 144 may be set and controlled by a bias voltage applied from the bias controller 17, for example.

The PD 143 may be provided inside or outside the optical modulator 14. The PD 143 may receive one or more of light input to the optical modulator 14, light propagated along either or both of the I arm and the Q arm, and output light of the optical modulator 14 as needed. An electric signal according to the received optical signal is output from the PD 143. The electric signal output from the PD 143 may be input to the bias controller 17 so that the bias voltages for the I arm and the Q arm of the optical modulator 14 are controlled, for example.

The optical coupler 15 branches (may also be referred to as "taps") the modulated signal light that is the output light of the optical modulator 14, for example. One of the branched lights may be output to an optical transmission line as transmission light, and the other of the branched lights may be output to the PD 16A as monitor light.

The PD 16A outputs an electric signal corresponding to a received optical signal of the monitor light input from the optical coupler 15 to the bias controller 17.

The bias controller 17 controls the bias voltage of the optical modulator 14 based on the output signal of the PD 16A, for example. A control target of the bias voltage may be any one of the I arm and the Q arm of the optical modulator 14 and the phase shifter 144.

Figure 2:
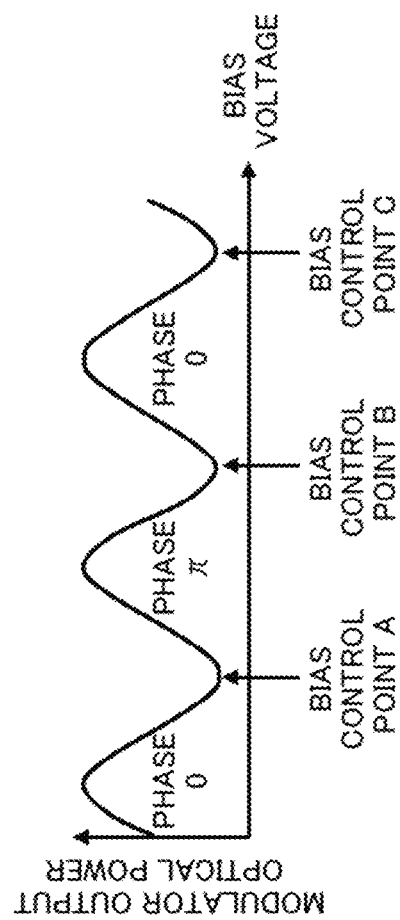
FIG. 2 is a diagram illustrating an example of a relation between I arm and Q arm bias voltages of the optical modulator illustrated in FIG. 1 and output optical power of the optical modulator.

FIG. 2 illustrates an example of a relation of the bias voltages for the I arm and the Q arm of the optical modulator 14 and the output optical power of the optical modulator 14. The output optical power of the optical modulator 14 has characteristics (may also be referred to as a "extinction (or quenching) curve") that periodically change with respect to the bias voltage as illustrated in FIG. 2.

In bias control on the I arm and the Q arm of the multilevel modulation scheme such as quadrature phase shift keying (QPSK), the bias voltage is controlled to become a voltage corresponding to a "bottom" portion of a periodic extinction curve. For example, since a plurality of "bottom" portions periodically appear in the extinction curve as illustrated in FIG. 2, there are a plurality of bias voltages corresponding to the "bottom" portions, in other words, a plurality of bias control points as well. Three bias control points A, B, and C are illustrated in FIG. 2. The bias control point may be understood to correspond to an operating point of the optical modulator 14.

Even when the bias voltage is controlled to be one of a plurality of bias control points in a settable voltage range, there is no large difference in an output light intensity waveform of the optical modulator 14, but there is a difference in a phase.

Referring to FIG. 2, for example, when the bias voltage is increased from the bias control point A, an output light phase of the optical modulator 14 changes from 0 toward $\pi$. On the other hand, when the bias voltage is increased from the bias control point B, the output light phase of the optical modulator 14 conversely changes from $\pi$ toward 0.

In other words, the output light phase of the optical modulator 14 with respect to the drive signal can be shifted relatively by $\pi$ according to a difference in the bias control point. It indicates that a sign of an output light electric field of the optical modulator 14 can be inverted according to a difference in the bias control point.

For this reason, in phase modulation, a logic of a transmission data bit mapped to the symbol of the modulated signal light is possibly inverted according to the bias control point.

Figure 3:
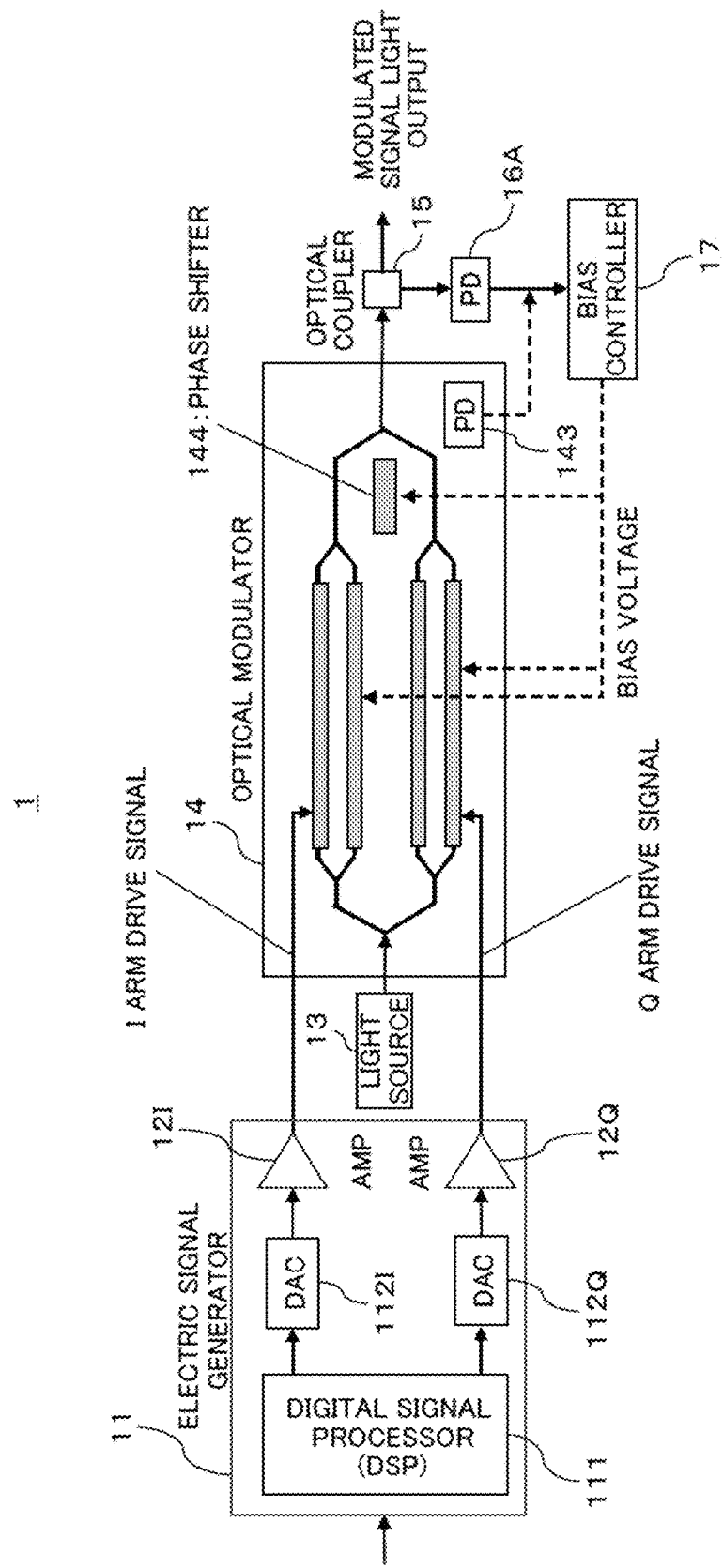
FIG. 3 is a block diagram illustrating an exemplary configuration in which a digital signal processor is applied to a data generator of the optical transmitter illustrated in FIG. 1.

Here, for example, in a configuration in which a digital signal processor (DSP) is applied as an example of the data generator 111 as illustrated in FIG. 3, it is important to appropriately control a phase change direction. In FIG. 3, reference numeral 1121 indicates a digital-analog converter (DAC) corresponding to the I arm of the optical modulator 14. Reference numeral 112Q indicates a DAC corresponding to the Q arm of the optical modulator 14.

For example, the digital signal processor 111, there are cases in which frequency deviation compensation of transmission signal light or distortion compensation of signal light by wavelength dispersion of an optical transmission line is performed through digital signal processing. The distortion compensation performed at a transmission side may also be referred to as "pre-equalization."

In order to perform pre-equalization, a phase of light is changed, but the sign of the transmission data bit is inverted to be different from an expected state unless a relation between the sign of the transmission data signal used as the drive signal of the optical modulator 14 and the bias control point of the optical modulator 14 is set and controlled appropriately.

For example, it is assumed that the digital signal processor 111 shifts a carrier frequency and applies phase rotation to a QPSK modulated signal in order to change a phase of light.

Figure 4:
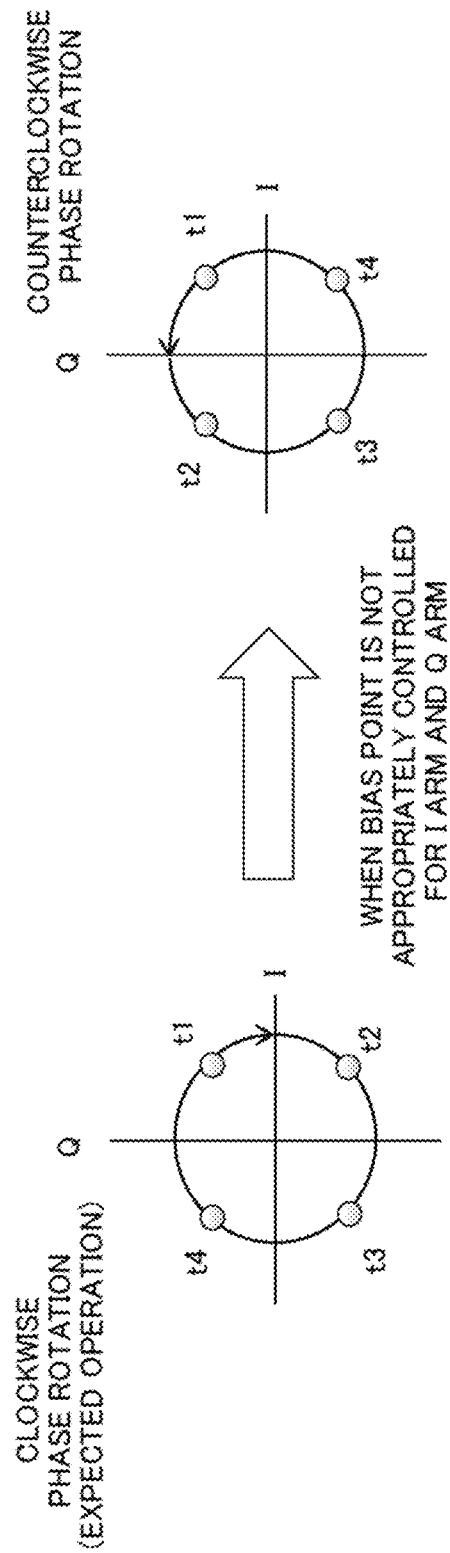
FIG. 4 is a diagram for illustrating that a transmission symbol may rotate in a direction opposite to an expected phase rotation on an IQ plane according to a relation between a sign of a transmission data signal for driving the optical modulator illustrated in FIG. 3 and a bias control point.

In this case, when a relation between the sign of the transmission data signal and the bias control point is not appropriately set and controlled, a transmission symbol rotates in a direction opposite to expected phase rotation in the IQ plane as illustrated in FIG. 4. FIG. 4 illustrates an example in which a phase rotates in an order of t1, t2, t3, and t4.

When the sign of the transmission data signal is inverted by the different phase rotation from the expected phase rotation as described above, a process is performed in a direction opposite to a direction in which pre-equalization is desired to be performed, and thus signal characteristics deteriorate.

Further, there is a case in which the digital signal processor 111 performs frequency shift keying (FSK) on the transmission data signal and causes an FSK signal to be superimposed on the transmission signal light. A reception side is available to monitor a state of the optical transmission line through which the signal light is transmitted by detecting the FSK signal superimposed on the signal light.

In this case, when a relation between the sign of the transmission data signal for driving the optical modulator 14 and the bias control point of the optical modulator 14 is not set and controlled appropriately, at the reception side, a frequency variation appeared in a received signal optical spectrum according to the FSK signal becomes a variation in a direction opposite to an expected variation direction. For this reason, it is unavailable to properly monitor the state of the optical transmission line.

Further, in a state in which the sign of the transmission data signal is inverted, it becomes difficult to perform a polarization separation process in an optical receiver and/or a process of compensating a frequency difference between a local light with which an optical receiver is equipped and a data signal, and it may be impossible according to circumstances.

Further, even when a relation between the sign of the transmission data signal for driving the optical modulator 14 and the bias voltage of the phase shifter 144 that applies a relative phase difference to light propagated along the I arm and the Q arm is not appropriately set and controlled, the sign may also be inverted.

For example, if it is not discriminated whether the phase shift amount of the phase shifter 144 is set and controlled to "$\pi/2+2n\pi$" (n is an integer) or "$3\pi/2+2n\pi$", a constellation in the IQ plane may be mirrored according to a condition that control is performed.

Figure 5A:
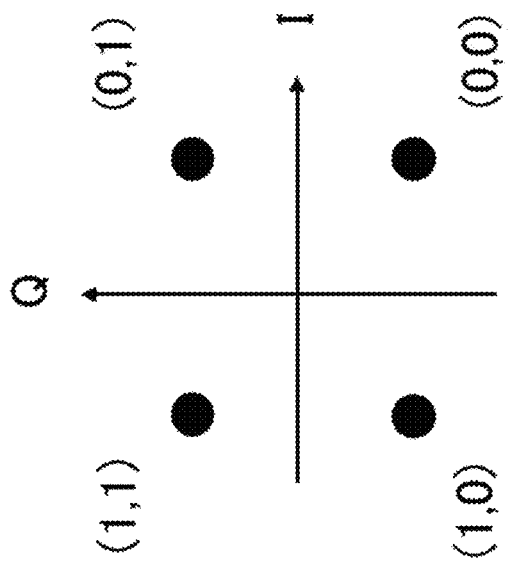
FIG. 5A is a diagram illustrating an example of a constellation when a phase shift amount is "π/2" on an IQ plane in a dual polarization-quadrature phase shift keying (DP-QPSK)
Figure 5B:
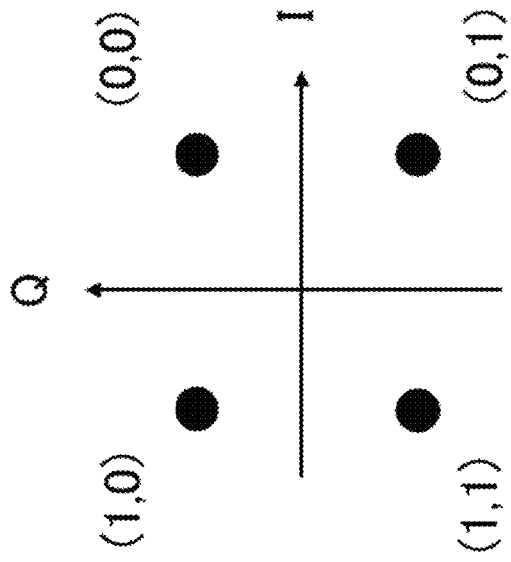
FIG. 5B is a diagram illustrating an example of a constellation when a phase shift amount is "3π/2" on the IQ plane in the DP-QPSK.

FIGS. 5A and 5B illustrate examples of a constellation in an IQ plane of dual polarization (DP)-QPSK. FIG. 5A illustrates a constellation when the phase shift amount is "$\pi/2$", and FIG. 5B illustrates a constellation when the phase shift amount is "$3\pi/2$."

In the examples of FIGS. 5A and 5B, a positive side and a negative side of a Q axis when the phase shift amount is "π/2" are inverted centering on an I axis of the IQ plane compared to those when the phase shift amount is "3π/2". When the constellation in the IQ plane is mirrored as described above, a relation between a symbol and a bit mapped to the symbol is also mirrored.

The reception side is available to discriminate the presence or absence of the mirroring, but as a multilevel degree of multilevel modulation increases, an discrimination process may be more complicated, and a longer processing time may be taken for. According to circumstances, it is difficult or impossible to perform the discrimination process.

In this regard, in the present embodiment, a relation between the sign of the data signal for driving the optical modulator 14 and the bias control point of the optical modulator 14 is detected, and the sign of the data signal or the bias control point is controlled such that the output light phase of the optical modulator 14 shows an expected phase variation. Hereinafter, some exemplary embodiments will be described.

First Embodiment

Figure 6:
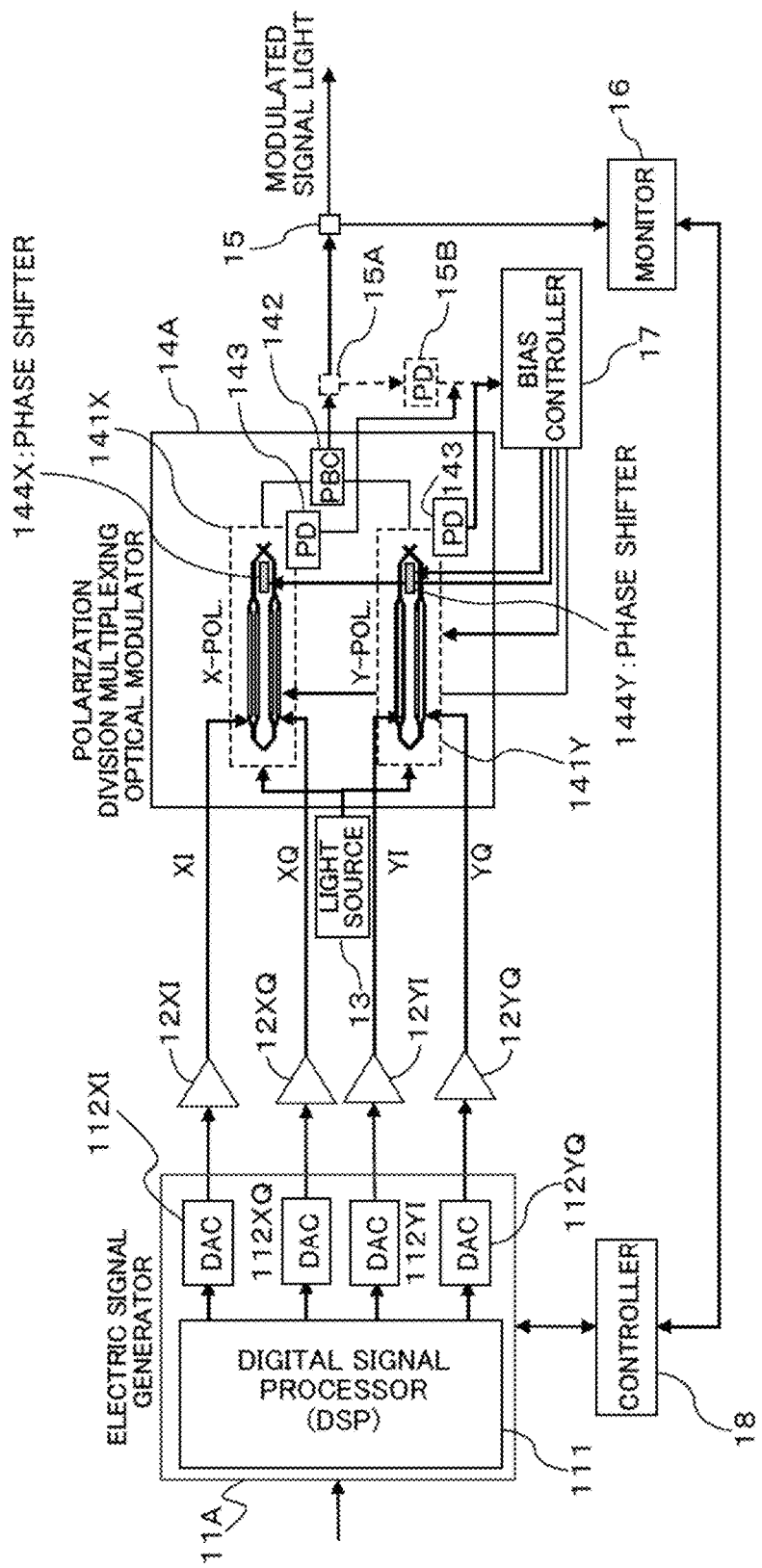
FIG. 6 is a block diagram illustrating an exemplary configuration of an optical transmitter according to a first embodiment.

FIG. 6 is a block diagram illustrating an exemplary configuration of an optical transmitter according to the first embodiment. An optical transmitter 1 illustrated in FIG. 6 is, for example, an optical transmitter to which a polarization multiplexing modulation scheme is applied, and generates polarization multiplexing modulated signal light. The "polarization multiplexing modulated signal light" may also be abbreviated as "modulated signal light" or "signal light" for descriptive purposes.

Thus, the optical transmitter 1 illustrated in FIG. 6 includes, for example, an electric signal generator 11A, driver amplifiers 12XI, 12XQ, 12YI, and 12YQ, a light source 13, and a polarization multiplexing optical modulator 14A.

The polarization multiplexing optical modulator 14A includes optical modulators 141X and 141Y corresponding to different polarizations (for example, an X polarization and a Y polarization) as illustrated in FIG. 6.

Light obtained by performing polarization separation on the output light of the light source 13 through a polarizing beam splitter (PBS) may be input to the optical modulators 141X and 141Y. For example, the X polarization component separated by the PBS is input to the optical modulator 141X, and the Y polarization component separated by the PBS is input to the optical modulator 141Y. For descriptive purposes, the optical modulator 141X is also referred to as an "X polarization optical modulator 141X", and the optical modulator 141Y is also referred to as a "Y polarization optical modulator 141Y."

Both of the optical modulators 141X and 141Y may have the same configuration as the optical modulator 14 illustrated in FIG. 1 and may include, for example, an optical branching unit, an I arm, a Q arm, and an optical interference unit. The light of polarization component separated by the PBS is input to the optical branching unit.

As one option, the PD 143 may be provided for either or both of the optical modulators 141X and 141Y, similarly to the configuration of FIG. 1. In other words, power of the modulated signal light may be monitored through the PD 143 for each of different polarization components. The bias controller 17 may use the output of the PD 143 as the bias control.

As indicated by dotted lines in FIG. 6, information indicating the output optical power of the polarization multiplexing optical modulator 14A may be used in the bias control by the bias controller 17. The output optical power of the polarization multiplexing optical modulator 14A can be detected, for example, by tapping the output light of the polarization multiplexing optical modulator 14A with an optical coupler 15A to be input to a PD 15B.

The I arm and the Q arm in the X polarization optical modulator 141X are also referred to as an "XI arm" and an "XQ arm", respectively, for descriptive purposes. Similarly, the I arm and the Q arm in the Y polarization optical modulator 141Y are also referred to as a "YI arm" and a "YQ arm", respectively, for descriptive purposes.

The light of the X polarization component separated by the PBS is propagated along the XI arm and the XQ arm. The light of the Y polarization component separated by the PBS is propagated along the YI arm and the YQ arm.

The drive electrode may be provided for each of the XI arm, the XQ arm, the YI arm, and the YQ arm. The drive signal may be applied from a corresponding one of the driver amplifiers 12XI, 12XQ, 12YI, and 12YQ to each drive electrode. Each of the driver amplifiers 12XI, 12XQ, 12YI, and 12YQ may be an electric amplifier.

The light propagated along the I arm and the Q arm of the X polarization optical modulator 141X is caused to interfere with each other through the optical interference unit of the X polarization optical modulator 141X and then output. Similarly, the light propagated along the I arm and the Q arm of the Y polarization optical modulator 141Y is caused to interfere with each other through the optical interference unit of the Y polarization optical modulator 141Y and then output.

Phase shifters 144X and 144Y that apply a relative phase shift to the light propagated along the I arm and the Q arm may be provided around the optical interference units of the optical modulators 141X and 141Y. For example, the phase shift amounts applied by the phase shifter 144X and 144Y may be set and controlled through the bias controller 17.

For example, the light that has been caused to interfere with each other though the optical interference units of the optical modulators 141X and 141Y and then output is subject to polarization-combining by a polarization beam combiner (PBC). As a result, the polarization multiplexing modulated signal light is generated and output from the polarization multiplexing optical modulator 14A.

The electric signal generator 11A performs digital signal processing on the transmission data signal, and generates an electric signal (for example, a voltage signal) serving as the drive signal for the polarization multiplexing optical modulator 14A. To this end, the electric signal generator 11A may include, for example, a digital signal processor (DSP) 111 and DACs 112XI, 112XQ, 112YI, and 112YQ.

The DSP 111 is an example of a processor with a calculation function, and performs digital signal processing on the transmission data signal according to a modulation scheme or the like and generates a digital transmission signal. As an example of the modulation scheme, there is a multilevel quadrature phase amplitude modulation scheme such as QPSK or $2^M$-quadrature amplitude modulation (QAM). M is an integer of 2 or more, and indicates the multilevel degree. As the multilevel degree increases, an amount of information that can be transmitted through single modulation increases.

There are cases a differential modulation scheme or a polarization multiplexing scheme may be combined with the QPSK or the QAM in order to further increase an amount of information that can be transmitted through single modulation. The differential modulation scheme is an example of a modulation scheme in which different pieces of information (bits) are allocated to a plurality of signals (differential signals) whose phases are deviated from one another. QPSK and QAM using a differential signal may be referred to as "differential PSK (DPSK)" or "differential QAM (DQAM)."

On the other hand, the polarization multiplexing scheme is an example of a scheme of allocating different pieces of information (bits) on different polarizations (for example, the X polarization and the Y polarization) of light and multiplexing them. QPSK and QAM using the polarization multiplexing may be referred to as "dual polarization (DP)-QPSK" and "DP-QAM."

Each of the DACs 112XI, 112XQ, 112YI, and 112YQ converts the digital transmission signal generated through the DSP 111 into an analog signal.

For example, the DAC 112XI converts a signal corresponding to the in-phase component (the I component) when the digital transmission signal is allocated (or mapped) to a symbol represented on the IQ plane for the X polarization into an analog signal.

The DAC 112XQ converts a signal corresponding to the quadrature phase component (the Q component) when the digital transmission signal is allocated (or mapped) to a symbol represented on the IQ plane for the X polarization into an analog signal.

The DAC 112YI converts a signal corresponding to the I component when the digital transmission signal is mapped to a symbol represented on the IQ plane for the Y polarization into an analog signal.

The DAC 112YQ converts a signal corresponding to the Q component when the digital transmission signal is mapped to a symbol represented on the IQ plane for the Y polarization into an analog signal.

The driver amplifier 12XI amplifies the analog electric signal corresponding to the I component of the X polarization which is input from the DAC 112XI to involve an appropriate amplitude as the drive signal applied to the drive electrode corresponding to the XI arm of the X polarization optical modulator 141X.

The driver amplifier 12XQ amplifies the analog electric signal corresponding to the Q component of the X polarization which is input from the DAC 112XQ to involve an appropriate amplitude as the drive signal applied to the drive electrode corresponding to the Q arm of the X polarization optical modulator 141X.

The driver amplifier 12YI amplifies the analog electric signal corresponding to the I component of the Y polarization which is input from the DAC 112YI to involve an appropriate amplitude as the drive signal applied to the drive electrode corresponding to the I arm of the Y polarization optical modulator 141Y.

The driver amplifier 12YQ amplifies the analog electric signal corresponding to the Q component of the Y polarization which is input from the DAC 112YQ to involve an appropriate amplitude as the drive signal applied to the drive electrode corresponding to the Q arm of the Y polarization optical modulator 141Y.

As the drive signal is individually applied to each of the drive electrodes corresponding to the four arms XI, XQ, YI, and YQ, the refractive index of the corresponding arm changes according to the drive signal, and a phase of the transmission light propagated along each arm changes. Intensity of light output from the optical interference units of the optical modulators 141X and 141Y changes according to this change.

In this way, for each of the different polarization components X and Y, the transmission light from the light source 13 is modulated through the optical modulators 141X and 141Y according to the drive signal corresponding to the transmission data signal, and thus the modulated signal light is generated.

The modulated signal light of the X polarization component serving as the output light of one optical modulator 141X and the modulated signal light of the Y polarization component serving as the output light of the other optical modulator 141Y are input to the PBC 142.

The PBC 142 combines (may also be referred to as "polarization multiplexes") the light of the X polarization component and the Y polarization component. The light that has been subject to the polarization multiplexing is output from the optical transmitter 1 to the optical transmission line as polarization-multiplexed transmission light.

The optical transmitter 1 includes, for example, an optical coupler 15, a monitor 16, a bias controller 17, and a controller 18 as illustrated in FIG. 6.

The optical coupler 15 may be provided in an optical path between the output of the polarization multiplexing optical modulator 14A and the optical transmission line or may branch (or "tap") part of the polarization-multiplexed transmission light to be output to the monitor 16.

For example, the monitor 16 monitors power of a specific frequency component of the modulated signal light output from the polarization multiplexing optical modulator 14A. A term "monitor" may be referred to as a term "detect" or "measure." A specific example of the specific frequency component monitored by the monitor 16 will be described later.

The bias controller 17 controls the bias voltage of the polarization multiplexing optical modulator 14A, for example, based on the output of the PD 143. The control of the bias voltage by the bias controller 17 may be controlled by, for example, the controller 18.

For example, the control target of the bias voltage may be one or more of the I arm and the Q arm of the X polarization optical modulator 141X, the I arm and the Q arm of the Y polarization optical modulator 141Y, the phase shifter 144X of the optical modulator 141X, and the phase shifter 144Y of the optical modulator 141Y.

For example, the controller 18 may control the sign of the drive signal to be applied to the XI arm, the XQ arm, the YI arm, and the YQ arm of the polarization multiplexing optical modulator 14A based on the monitored result of the monitor 16 for each arm.

Since the drive signal of each arm is generated based on the transmission data signal, the sign of the drive signal can be controlled by controlling the sign of the transmission data signal. Hereinafter, the control of the sign of the transmission data signal is also referred to as "sign control A" or referred to simply as "control A" for descriptive purposes.

The controller 18 may control the bias controller 17 such that the bias voltage of the polarization multiplexing optical modulator 14A is controlled based on the monitored result of the monitor 16. The control of the bias voltage may also be referred to as "bias control B" or referred to simply as "control B" for descriptive purposes.

Figure 7:
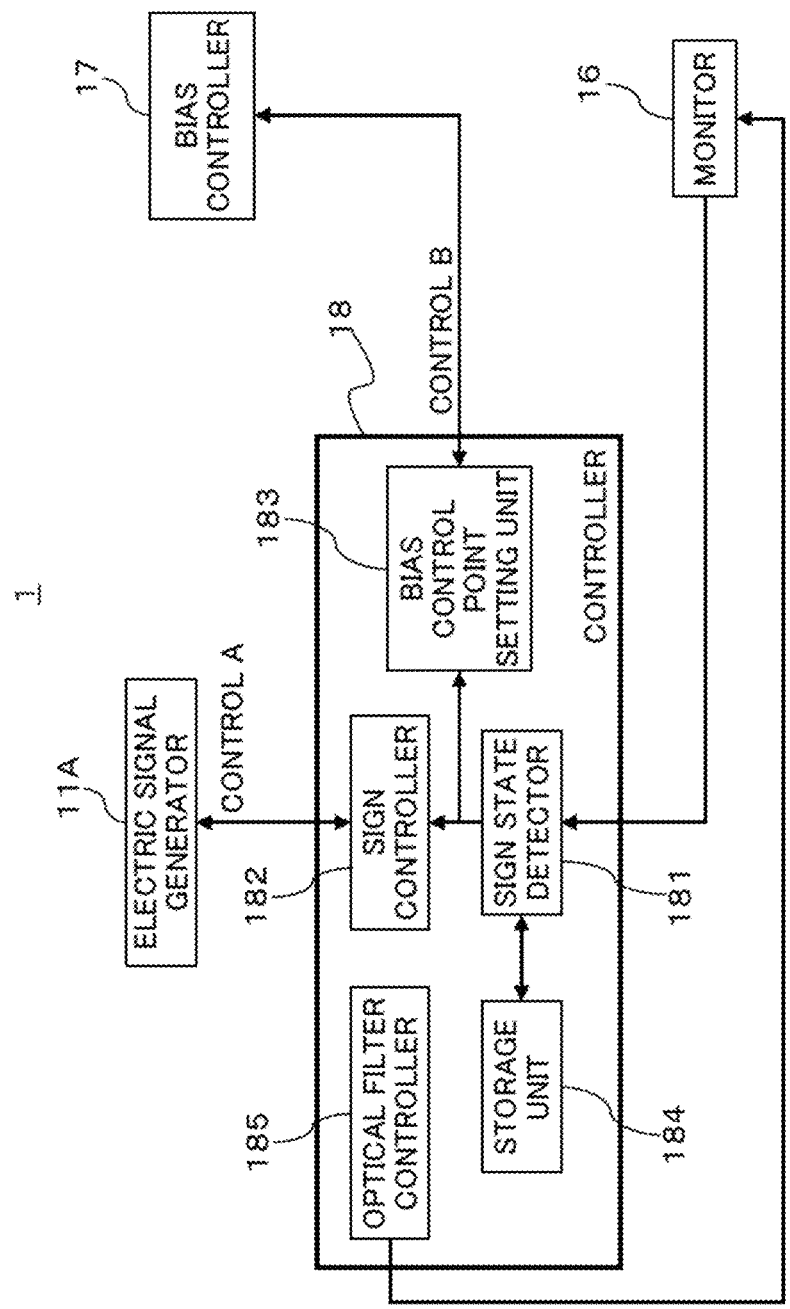
FIG. 7 is a block diagram illustrating an exemplary configuration of a controller illustrated in FIG. 6.

The controller 18 may perform at least any one of the "sign control A" and the "bias control B." FIG. 7 illustrates an exemplary configuration of the controller 18. The controller 18 may include, for example, a sign state detector 181, a sign controller 182, a bias control point setting unit 183, and a storage unit 184 as illustrated in FIG. 7.

For example, the sign state detector 181 may detect a sign state of the transmission data signal (in other words, the drive signal of the polarization multiplexing optical modulator 14A) based on the output optical power of the polarization multiplexing optical modulator 14A monitored by the monitor 16. A sign state detection example will be described later.

The sign controller 182 may control the sign of the transmission data signal generated by the electric signal generator 11A based on the sign state detected by the sign state detector 181, for example.

The bias control point setting unit 183 may control the bias voltage of the polarization multiplexing optical modulator 14A by setting a control point of the bias voltage by the bias controller 17 based on the sign state detected by the sign state detector 181, for example. The bias voltage of the control target has been already described above.

The controller 18 may be integrated with the bias controller 17. When the sign control A is performed but the bias control B does not need to be performed, the bias control point setting unit 183 may be unnecessary in the controller 18. On the other hand, when the bias control B is performed but the sign control A does not need to be performed, the sign controller 182 may be unnecessary in the controller 18.

The storage unit 184 may store a detection result of the sign state detector 181. A memory such as a random access memory (RAM) or a flash memory may be applied as the storage unit 184.

As will be described later, when an optical tunable filter is used in the monitor 16, the controller 18 may include an optical filter controller 185 that controls transmission characteristics of the optical tunable filter.

Hereinafter, an exemplary operation according to the first embodiment will be described. First, the DSP 111 of the electric signal generator 11A generates a signal corresponding to a signal obtained by frequency-shifting the transmission data signal. The signal is also referred to as a "frequency-shifted signal", a "signal for detection", a "test signal", or a "monitor signal" for descriptive purposes. For example, the frequency-shifted signal can be generated by performing phase rotation according to a frequency shift amount on the transmission data signal.

As a non-limiting example, an example of shifting a modulated signal optical spectrum with a baud rate of "B" gigabaud (Gbaud) by ½ of a spectrum width "X"[GHz] is illustrated in FIGS. 8A and 8B. A direction of the frequency shift may be a negative direction (for example, −X/2 [GHz]) or a positive direction (for example, +X/2 [GHz]).

"B" is a positive real number indicating the baud rate, and "X" is a positive real number indicating a spectrum width of the modulated signal light with the baud rate B. As a non-limiting example, both of "B" and "X" may be several tens of gigahertz [GHz].

The "baud rate" indicates the number of modulations that can be performed per unit time. As the baud rate B is increased, the spectrum width X per wavelength is increased. When the spectrum width X per wavelength is increased, a frequency usage efficiency of a transmission band may decrease.

In this regard, it is possible not to change the baud rate or to suppress the baud rate to be low in implementing the same transmission rate by applying the polarization multiplexing or QPSK format and increasing the number of transmission data bits that can be transmitted through single modulation. Thus, it is possible to narrow the spectrum width per wavelength without changing the transmission rate. For example, in the case of the same transmission rate 100 Gbps, 16QAM is narrower in the spectrum width per wavelength than QPSK.

In FIGS. 8A and 8B, "fc" indicates a center frequency (also referred to as a "carrier frequency") of the polarization multiplexing modulated signal light.

For example, a signal optical spectrum illustrated in FIG. 8A is obtained by driving the polarization multiplexing optical modulator 14A using the drive signal obtained by a certain transmission data signal.

Here, for example, when the polarization multiplexing optical modulator 14A is driven using the detection signal obtained by shifting the carrier frequency fc by −X/2 [GHz] as the drive signal, the modulated signal optical spectrum is shifted in a frequency direction by −X/2 [GHz]. The modulated signal light obtained when the polarization multiplexing optical modulator 14A is driven using the detection signal as the drive signal is also referred to as a "detection signal light."

A state of the modulated signal optical spectrum illustrated in FIG. 8B corresponds to a state of the modulated signal optical spectrum that is expected when the polarization multiplexing optical modulator 14A is driven using the detection signal.

However, as described above, the modulated signal optical spectrum output from the polarization multiplexing optical modulator 14A may involve four possible states illustrated in FIG. 9A to 9D according to the relation between the sign of the signal for driving the polarization multiplexing optical modulator 14A and the bias control point.

A "state A" illustrated in FIG. 9A corresponds the "expected state" illustrated in FIG. 8B and refers to a state in which both of the X polarization component and the Y polarization component are frequency-shifted from a carrier frequency fc by −X/2 [GHz].

A "state B" illustrated in FIG. 9B is a state in which both of the X polarization component and the Y polarization component are frequency-shifted from the carrier frequency fc in a direction opposite to the "state A", in other words, by +X/2 [GHz].

In a "state C" illustrated in FIG. 9C, the X polarization component is frequency-shifted from the carrier frequency fc by −X/2 [GHz], similarly to the "state A", and it becomes an "expected state." However, in this state, the Y polarization component is frequency-shifted from the carrier frequency fc by +X/2 [GHz], similarly to the "state B."

In a "state D" illustrated in FIG. 9D, conversely to the "state C" the Y polarization component is frequency-shifted from the carrier frequency fc by −X/2 [GHz], and it becomes an "expected state." However, in this state, the X polarization component is frequency-shifted from the carrier frequency fc by +X/2 [GHz].

On the other hand, when the polarization multiplexing optical modulator 14A is driven using the detection signal having fc+X/2 [GHz] as the center frequency as the drive signal, the "state B" of FIG. 9B is the "expected state."

The monitor 16 is available to detect one of the four possible states which the modulated signal light has entered by the frequency shift of the drive signal by monitoring whether or not the component of the modulated signal light output from the polarization multiplexing optical modulator 14A appears in the specific frequency according to the frequency shift of the drive signal.

In other words, it is possible to detect (or "discriminate" or "identify") whether the modulated signal light has been shifted in the same direction as the direction of the frequency shift or a direction opposite to the direction of the frequency shift according to the frequency shift of the drive signal for each polarization component.

The controller 18 may control the relation between the sign of the drive signal of the polarization multiplexing optical modulator 14A and the bias control point according to the monitored result of the monitor 16. For example, the control may be performed such that the shift direction of the modulated signal light output from the polarization multiplexing optical modulator 14A is identical to the frequency shift direction of the drive signal. The relation between the sign of the drive signal of the polarization multiplexing optical modulator 14A and the bias control point can be controlled by at least one of the sign control A and the bias control B.

For example, when the modulated signal optical spectrum is in one of the states B to D different from the "expected state A" the controller 18 may perform the sign control A (or the bias control B) such that the modulated signal optical spectrum enters the expected "state A" of FIG. 9A.

Figure 10:
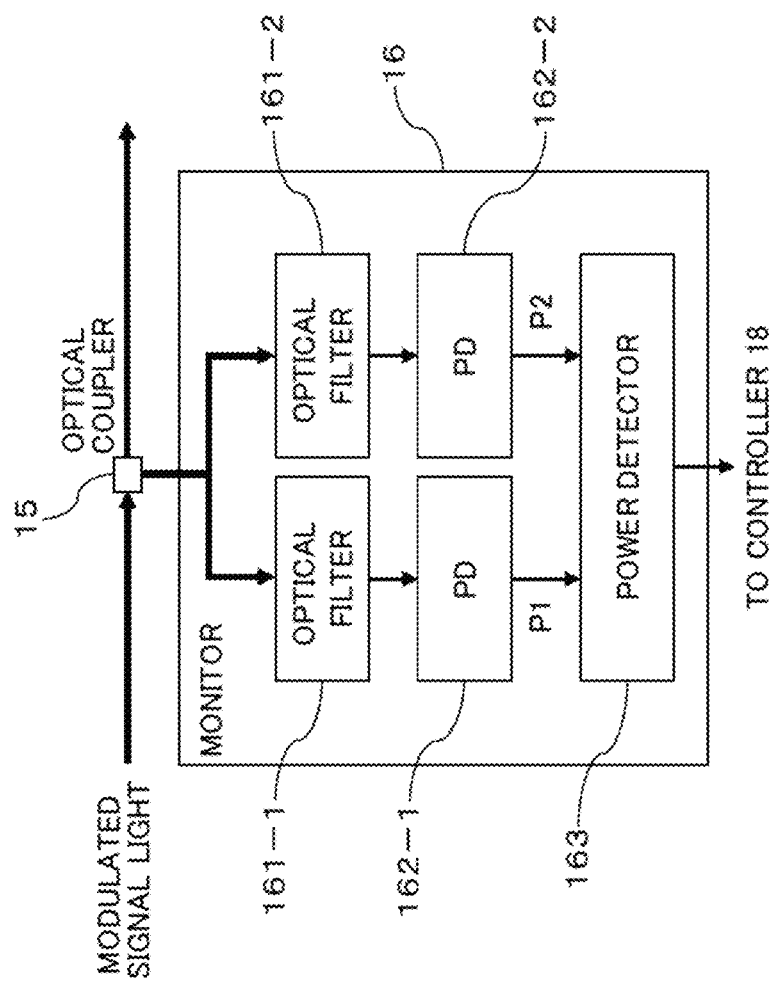
FIG. 10 is a block diagram illustrating an exemplary configuration of a monitor illustrated in FIG. 6.

FIG. 10 illustrates an exemplary configuration of the monitor 16 according to the first embodiment. The monitor 16 includes, for example, two optical filters 161-1 and 161-2, two PDs 162-1 and 162-2, and a power detector 163 as illustrated in FIG. 10.

A frequency according to the frequency shift of the transmission data signal may be set as each of pass center frequencies (may also be referred to as "center frequencies" for descriptive purposes) of the optical filters 161-1 and 161-2.

For example, as schematically illustrated in FIGS. 11A to 11D, one optical filter 161-1 may be set with the center frequency of fc−X/2 [GHz]. The other optical filter 161-2 may be set with the center frequency of fc+X/2 [GHz].

Thus, the optical filter 161-1 is an example of a first optical filter that allows light of a frequency component with a center frequency of fc−X/2N (N=1) to pass through, and the optical filter 161-2 is an example of a second optical filter that allows light of a frequency component with a center frequency of fc+X/2N to pass through.

However, since it is enough for the monitor 16 to be able to detect the presence or absence of the modulated signal light in the specific frequency according to the frequency shift of the drive signal, the center frequencies of the two optical filters 161-1 and 161-2 does not need to be fc±X/2 [GHz] accurately.

Thus, the center frequencies of the optical filters 161-1 and 161-2 may be set to frequencies near fc±X/2 [GHz] involving a possible setting error. For example, the center frequencies of the optical filters 161-1 and 161-2 may be set to frequencies at which power detection sensitivity of the modulated signal light in the specific frequency according to the frequency shift of the drive signal is as high as possible.

Pass band widths of the optical filters 161-1 and 161-2 may be set to band widths at which the presence or absence of light according to the frequency shift can be detected at the center frequencies of the optical filters 161-1 and 161-2.

In other words, both of the optical filters 161-1 and 161-2 may be enough to have pass band characteristics (also referred to as "filter characteristics") in which the polarization multiplexing modulated signal light is partially passed in the specific frequency according to the frequency shift of the drive signal.

As a non-limiting example, the pass band widths of the optical filters 161-1 and 161-2 may be set to bands that are narrower than the spectrum width X [GHz] of the modulated signal optical spectrum, for example, bands that are narrower than X/2 [GHz] as schematically illustrated in FIGS. 11A to 11D. The pass band widths of the optical filters 161-1 and 161-2 may be the same or different.

When the polarization multiplexing modulated signal optical spectrum is in the "expected state A" of FIG. 9A as illustrated in FIG. 11A, the signal light components of the X polarization and the Y polarization are output from one optical filter 161-1. The signal light component is not substantially output from the other optical filter 161-2.

On the other hand, when the modulated signal optical spectrum is in the "state B" of FIG. 9B as illustrated in FIG. 11B, no signal light component is substantially output from one optical filter 161-1, and the signal light components of the X polarization and the Y polarization are output from the other optical filter 161-2.

In other words, in the "expected state A" and the "state B", the signal light component is output only from one of the optical filters 161-1 and 161-2.

Meanwhile, when the modulated signal optical spectrum is in the "state C" of FIG. 9C as illustrated in FIG. 11C, for example, the signal light component of the X polarization is output from one optical filter 161-1, and the signal light component of the Y polarization is output from the other optical filter 161-2.

Further, when the modulated signal optical spectrum is in the "state D" of FIG. 9D as illustrated in FIG. 11D, for example, the signal light component of the Y polarization is output from one optical filter 161-1, and the signal light component of the X polarization is output from the other optical filter 161-2.

In other words, in the "state C" and the "state D", the signal light components are output from both of the optical filters 161-1 and 161-2.

The PD 162-1 receives the light passed through one optical filter 161-1, and outputs the electric signal according to the received optical signal to the power detector 163.

The PD 162-2 receives the light passed through the other optical filter 161-2, and outputs the electric signal according to the received optical signal to the power detector 163.

The electric signals output from the PD 162-1 and the PD 162-2 may be, for example, electric current signals or may be voltage signals obtained by converting electric current signals through a transimpedance amplifier (TIA) or the like.

The power detector 163 detects power (in other words, amplitudes) of the output electric signals of the PDs 162-1 and 162-2, for example. The detection result of the power detector 163 indicates, for example, signal optical power at fc±X/2 [GHz] and may be provided to the controller 18 (for example, the sign state detector 181). The power detector 163 may be individually provided for each of the PDs 162-1 and 162-2.

The controller 18 is available to detect the sign of the transmission data signal state (in other words, the frequency shift direction of the modulated signal light) based on the signal optical power at fc±X/2 [GHz] which is detected through the power detector 163. Based on the detection result, the controller 18 is available to perform the sign control A (or the bias control B) of the transmission data signal.

Next, an exemplary operation of the optical transmitter 1 illustrated in FIG. 6 according to the first embodiment will be described with reference to FIG. 12.

Figure 12:
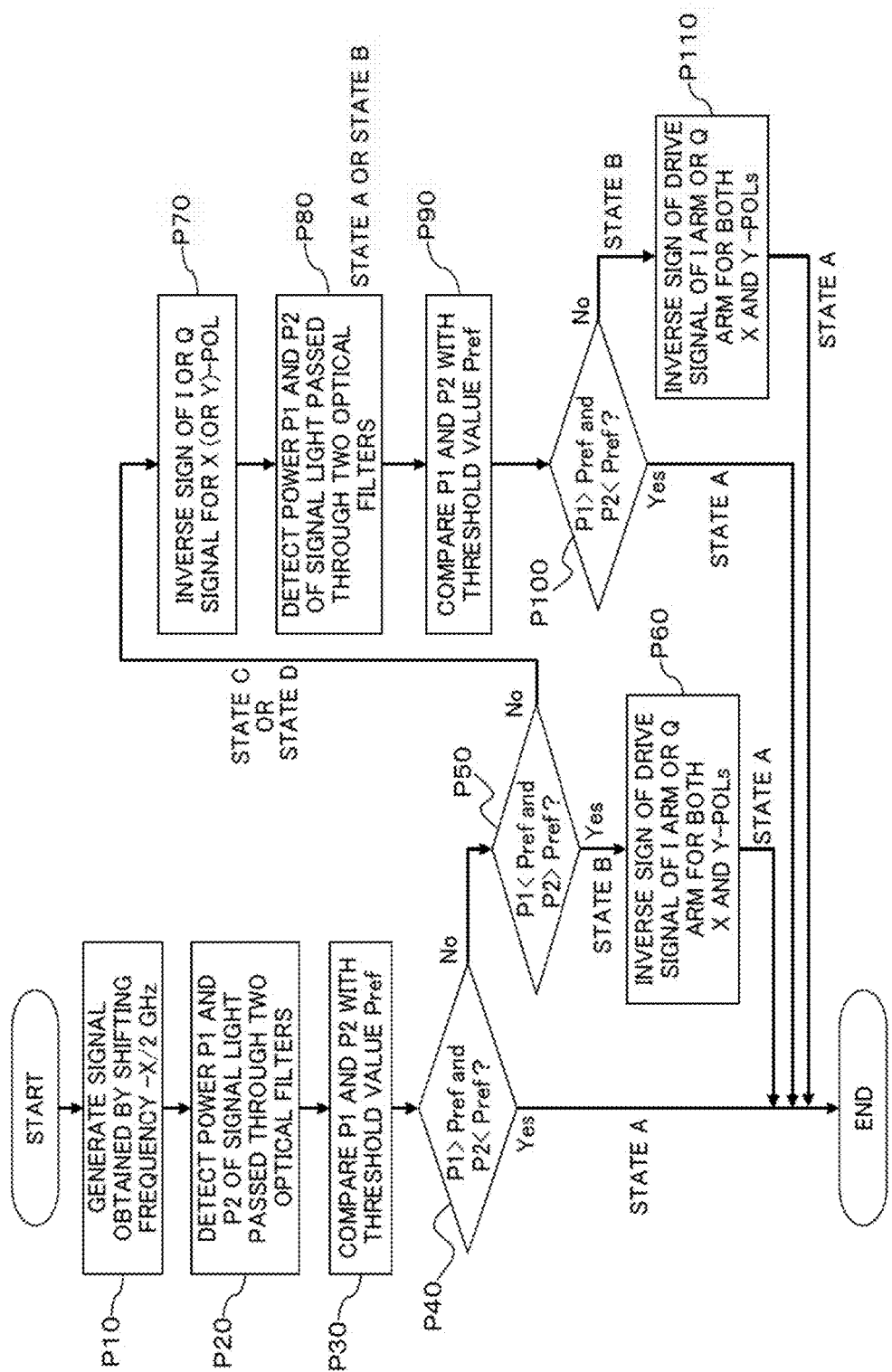
FIG. 12 is a flowchart illustrating an exemplary operation according to the first embodiment.

As illustrated in FIG. 12, the electric signal generator 11A (for example, the DSP 111) generates the frequency-shifted signal that is obtained by shifting the frequency from the carrier frequency fc by −X/2 [GHz] (process P10).

As the polarization multiplexing optical modulator 14A is driven using the frequency-shifted signal as the drive signal, the polarization multiplexing modulated signal light is generated and output to the polarization multiplexing optical modulator 14A and then input to the monitor 16 through the optical coupler 15.

The monitor 16 detects the power of the signal light component passed through either of both of the two optical filters 161-1 and 161-2 through the power detector 163 (process P20). For descriptive purposes, the power of the signal light component passed through one optical filter 161-1 is indicated by "P1", and the power of the signal light component passed through the other optical filter 161-2 is indicated by "P2."

The power P1 and P2 detected through the power detector 163 is provided to, for example, the sign state detector 181 of the controller 18 illustrated in FIG. 7. The sign state detector 181 may compare the power P1 and P2 with a threshold value Pref, for example (process P30). The comparison process P30 corresponds to a process of checking whether or not the component of the modulated signal light appears in either of the frequencies fc±X/2.

The threshold value Pref is an example of a reference value used for detecting the presence or absence of the signal light component and may be set to a value according to a value capable of preventing erroneous detection caused by noise, in other words, a value according to expected detection sensitivity. For example, a power value measured by the power detector 163 in advance in a state in which there is no signal light component of the data signal may be applied as the threshold value Pref. For example, the threshold value Pref may be stored in the storage unit 184 illustrated in FIG. 7.

When a result of comparing with the threshold value is P1>Pref and P2<Pref (Yes in process P40), the modulated signal optical spectrum can be discriminated as being in the "expected state A" illustrated in FIG. 11A. The state A is indicated by the state A "(XI, XQ), (YI, YQ)" for descriptive purposes.

Here, "XI" indicates the drive signal applied to the I arm (XI arm) of the X polarization, and "XQ" indicates the drive signal (XQ arm drive signal) applied to the Q arm (XQ arm) of the X polarization.

"YI" indicates the drive signal applied to the I arm (YI arm) of the Y polarization, and "YQ" indicates the drive signal applied to the Q arm (YQ arm) of the Y polarization. When XI, XQ, YI, and YQ are positive values, a sign "+" is omitted, whereas when XI, XQ, YI, and YQ are negative values, a sign of "−" is added.

In the "expected state A", the controller 18 does not need to perform the sign control A by the sign controller 182 on the electric signal generator 11A, and may end the process.

On the other hand, when a result of comparing with the threshold value is P1<Pref and P2>Pref (No in process P40 and Yes in process P50), the modulated signal optical spectrum can be discriminated as being in the "state B" illustrated in FIG. 11B.

The "state B" can be indicated by the state B "(XI, −XQ), (YI, −YQ)" or the state B "(−XI, XQ), (−YI, YQ)", compared to the state A "(XI, XQ), (YI, YQ)."

Thus, the state B can be converted into the state A "(XI, XQ), (YI, YQ)", for example, by controlling the sign of the Q arm (or I arm) drive signal through the sign controller 182 for both the X polarization and the Y polarization (process P60).

The sign control can be implemented by controlling the signal generation process of the DSP 111. Alternatively, the sign control may be implemented by individually controlling the DACs 112XI, 112XQ, 112YI, and 112YQ or may be implemented by individually controlling the driver amplifiers 12XI, 12XQ, 12YI, and 12YQ.

Since the converted "state A" is the "expected state" illustrated in FIG. 11A, the controller 18 may end the process.

On the other hand, when a result of comparing with the threshold value does not satisfy the condition of P1<Pref and P2>Pref (No in process P50), the modulated signal optical spectrum can be discriminated in the "state C" illustrated in FIG. 11C or the "state D" illustrated in FIG. 11D.

The "state C" can be indicated by the state C "(XI, XQ), (YI, −YQ)" or the state C "(XI, XQ), (−YI, YQ)." The "state D" can be indicated by the state D "(XI, −XQ), (YI, YQ)" or the state D "(−XI, XQ), (YI, YQ)."

In the "state C" or the "state D", the sign of one of the I arm drive signal and the Q arm drive signal for one of the X polarization and the Y polarization may be inverted by the sign controller 182 (process P70).

For example, the state C "(XI, XQ), (YI, −YQ)" can be converted into the state B "(XI, −XQ), (YI, −YQ)" by inverting the sign of the Q arm drive signal for the X polarization. Further, the state D "(XI, −XQ), (YI, YQ)" can be converted into the state A "(XI, XQ), (YI, YQ)."

Further, in order to discriminate the two possible states A and B, the output optical power P1 and P2 of the optical filters 161-1 and 161-2 is detected through the power detector 163 (process P80), and the power P1 and P2 is compared with the threshold value Pref through the sign state detector 181 (process P90).

When a result of comparing with the threshold value is P1>Pref and P2<Pref (Yes in process P100), the modulated signal optical spectrum can be discriminated as being in the "expected state A." Thus, the controller 18 may end the process.

Meanwhile, when the condition of P1>Pref and P2<Pref is not satisfied (No in process P100), the modulated signal optical spectrum can be discriminated as being in the state B "(XI, −XQ), (YI, −YQ)" or the state B "(−XI, XQ), (−YI, YQ)."

Thus, similarly to process P60, the state B can be converted into the state A "(XI, XQ), (YI, YQ)" by inverting the sign of the Q arm (or I arm) drive signal through the sign controller 182 for both the X polarization and the Y polarization (process P110).

Since the converted "state A" is the "expected state" illustrated in FIG. 11A, the controller 18 may end the process.

As described above, the controller 18 is possible to discriminate the shift direction of the modulated signal light according to the frequency shift of the drive signal based on the monitored result of the monitor 16 and controls the sign of the drive signal of the optical modulator 14A (in other words, the sign of the transmission data signal) according to the discrimination result.

Accordingly, the modulated signal optical spectrum can be controlled to enter the expected state A according to the digital signal processing. In other words, the polarization multiplexing optical modulator 14A is possible to generate the modulated signal light indicating an expected phase variation according to the digital signal processing.

Since the monitor 16 detects the presence or absence of the modulated signal light component at fc±X/2 [GHz] using the two optical filters 161-1 and 161-2, the monitor 16 is possible to reliably detect the states A to D of the modulated signal optical spectrum according to the frequency shift.

The exemplary process illustrated in the flowchart of FIG. 12 is under the assumption that the frequency shift is −X/2 [GHz] in the negative direction, but even when the frequency shift is +X/2 [GHz] in the positive direction, the same control can be performed by changing the threshold value determination criteria of processes P40, P50, and P100.

For example, in processes P40 and P100, it is determined whether or not P1<Pref and P2>Pref are satisfied, and in process P50, it is determined whether or not P1>Pref and P2<Pref are satisfied. However, when the frequency shift is +X/2 [GHz], the "expected state" is, for example, the state B of FIG. 11B as described above.

When P1<Pref and P2>Pref are satisfied in processes P40 and P100, the modulated signal optical spectrum can be determined as being in the "expected state B." When P1>Pref and P2<Pref are not satisfied in process P50, the modulated signal optical spectrum can be determined as being in the state D or the state C.

First Modified Example of First Embodiment

In the first embodiment, the monitor 16 detects the signal light component power of the two frequencies fc±X/2 [GHz] using the two filters 161-1 and 161-2 and the two PDs 162-1 and 162-2.

Figure 13:
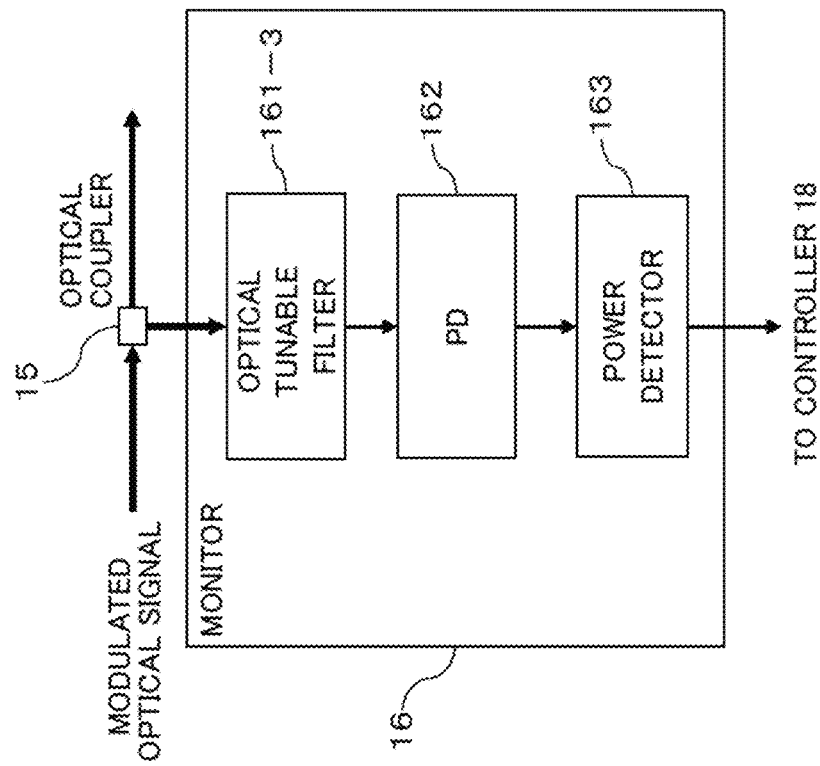
FIG. 13 is a block diagram illustrating an exemplary configuration of a monitor according to a first modified example of the first embodiment.

On the other hand, in the first modified example, for example, as illustrated in FIG. 13, the monitor 16 may detect the signal light component power of the two frequencies fc±X/2 time-divisionally using the single optical tunable filter 161-3 and the single PD 162. In the first modified example, an exemplary configuration of the optical transmitter 1 other than the monitor 16 may be the same or similar to the configuration illustrated in FIGS. 6 and 7.

For this reason, the center frequency of the optical tunable filter 161-3 may be set and controlled to either of fc±X/2. The setting and control of the center frequency of the optical tunable filter 161-3 may be performed through, for example, the optical filter controller 185 of the controller 18 illustrated in FIG. 7.

In the first modified example, since it is enough that the monitor 16 is available to detect the presence or absence of the modulated signal light in the specific frequency according to the frequency shift of the drive signal, the center frequency of the optical tunable filter 161-3 does not need to be accurately set and controlled to fc±X/2.

Thus, the center frequency of the optical tunable filter 161-3 may be set to a frequency near either of fc±X/2 [GHz] involving a possible setting error. For example, the center frequency of the optical filter 161-3 may be set and controlled to be a frequency at which the power detection sensitivity of the modulated signal light in the specific frequency according to the frequency shift of the drive signal is as high as possible.

A pass band width of the optical tunable filter 161-3 may be set to a band width at which the presence or absence of signal light according to the frequency shift can be detected at the set center frequency.

As a non-limiting example, the pass band width of the optical tunable filter 161-3 may be set to a band that is narrower than the spectrum width X [GHz] of the signal optical spectrum, for example, a band that is narrower than X/2 [GHz] as schematically illustrated in FIGS. 14A to 14D.

FIGS. 14A to 14D correspond to FIGS. 11A to 11D and illustrate the states A to D of the modulated signal optical spectrum when the frequency-shifted signal of fc−X/2 [GHz] is used as the drive signal of the polarization multiplexing optical modulator 14A.

When the modulated signal optical spectrum is in the "expected state A" of FIG. 9A, and the center frequency of the optical tunable filter 161-3 is set to fc−X/2 as illustrated in FIG. 14A, the signal light components of the X polarization and the Y polarization are output. As indicated by a dotted line in FIG. 14A, when the center frequency of the optical tunable filter 161-3 is set to fc+X/2, the signal light component is not substantially output.

On the other hand, when the modulated signal optical spectrum is in the "state B" of FIG. 9B, and the center frequency of the optical tunable filter 161-3 is set to fc+X/2 as illustrated in FIG. 14B, the signal light components of the X polarization and the Y polarization are output. When the center frequency of the optical tunable filter 161-3 is set to fc−X/2, the signal light component is not substantially output.

Meanwhile, when the modulated signal optical spectrum is in the "state C" of FIG. 9C as illustrated in FIG. 14C, the signal light component is output although the center frequency of the optical tunable filter 161-3 is set to either of fc±X/2. For example, when the center frequency of the optical tunable filter 161-3 is set to fc−X/2, the signal light component of the X polarization is output. When the center frequency of the optical tunable filter 161-3 is set to fc+X/2, the signal light component of the Y polarization is output.

Further, when the modulated signal optical spectrum is in the "state D" of FIG. 9D, and the center frequency of the optical tunable filter 161-3 is set to fc−X/2 as illustrated in FIG. 14D, the signal light component of the Y polarization is output. When the center frequency of the optical tunable filter 161-3 is set to fc+X/2, the signal light component of the X polarization is output.

The PD 162 receives the light passed through the optical tunable filter 161-3, and outputs the electric signal according to the received optical signal.

The power detector 163 detects, for example, the power (in other words, the amplitude) of the output electric signal of the PD 162. The power detector 163 according to the first modified example is available to detect the power of the light passed through the optical tunable filter 161-3 when the center frequency of the optical tunable filter 161-3 is set to allow light of a frequency component with a center frequency of fc±X/2N (N=1) to pass through.

The detection result of the power detector 163 when the center frequency of the optical tunable filter 161-3 is set and controlled to either of fc±X/2 may be provided to the controller 18 (for example, the sign state detector 181).

(Exemplary Operation)

Figure 15:
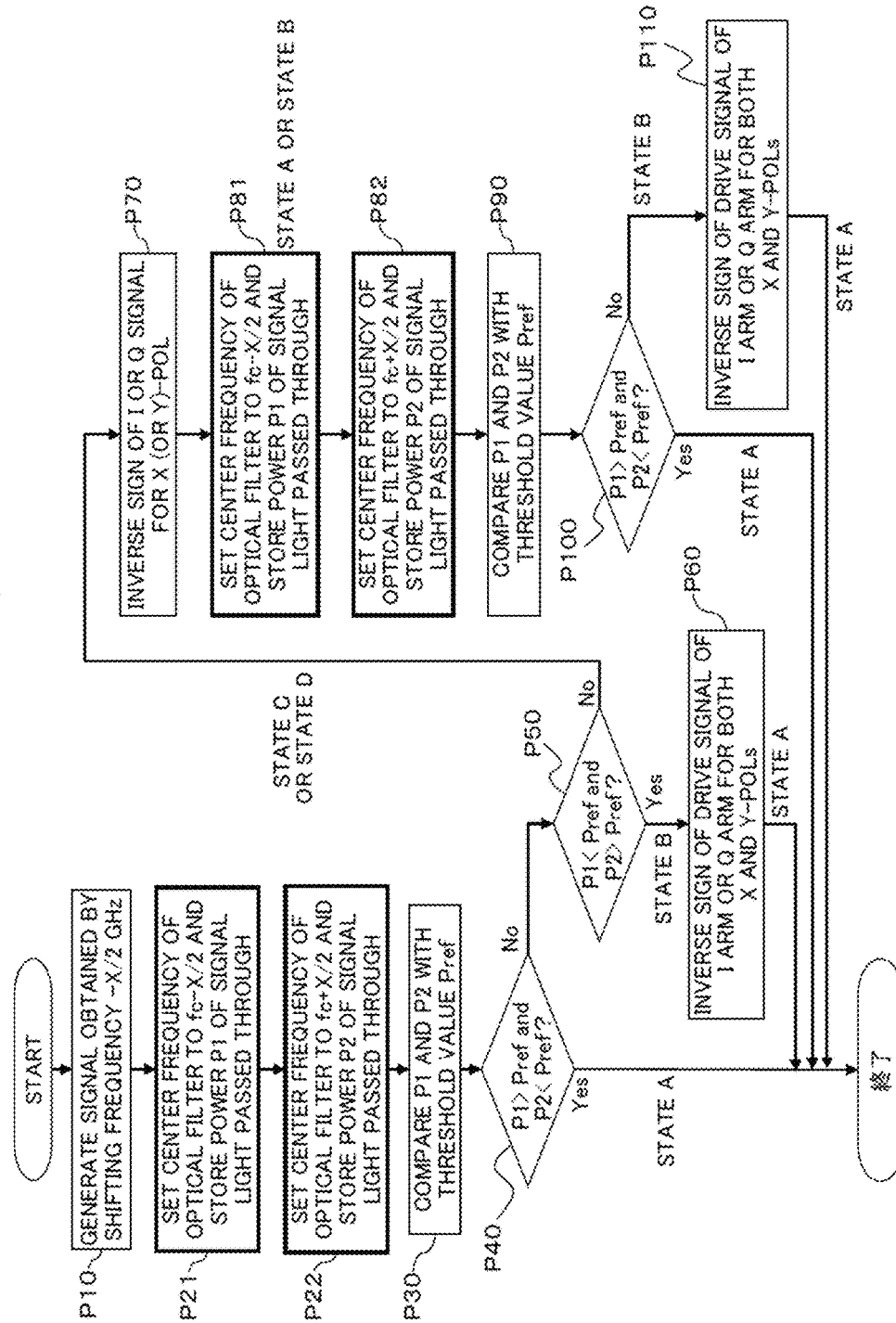
FIG. 15 is a flowchart illustrating an exemplary operation according to the first modified example of the first embodiment.

Next, an exemplary operation according to the first modified example of the first embodiment will be described with reference to a flowchart illustrated in FIG. 15. FIG. 15 differs from FIG. 12 in that process P20 in FIG. 12 is replaced with processes P21 and P22 in FIG. 15, and process P80 in FIG. 12 is replaced with processes P81 and P82 in FIG. 15 as can be easily understood from a comparison of FIG. 15 and FIG. 12.

As illustrated in FIG. 15, first, the electric signal generator 11A (for example, the DSP 111) generates the frequency-shifted signal that is obtained by shifting the frequency from the carrier frequency fc by −X/2 [GHz] (process P10).

As the polarization multiplexing optical modulator 14A is driven using the frequency-shifted signal as the drive signal, the polarization multiplexing modulated signal light is generated and output to the polarization multiplexing optical modulator 14A and then input to the monitor 16 through the optical coupler 15.

In the monitor 16, for example, the center frequency of the optical tunable filter 161-3 is set to fc−X/2 through the controller 18 (for example, the optical filter controller 185). In this setting (may also be referred to as "filter setting" for descriptive purposes), the power P1 of the signal light component passed through the optical tunable filter 161-3 is detected through the power detector 163. For example, information indicating the detected power P1 is stored in the storage unit 184 (see FIG. 7) (process P21).

As the detection of the power P1 and the storage of the detection result are completed, the controller 18 (for example, the optical filter controller 185) may set the center frequency of the optical tunable filter 161-3 to fc+X/2. In the filter setting, the power P2 of the signal light component passed through the optical tunable filter 161-3 is detected through the power detector 163. For example, information indicating the detected power P2 is stored in the storage unit 184 (process P22).

The information indicating the power P2 and the information indicating the power P1 are also referred to as "power information P1" and "power information P2" for descriptive purposes. The power information P1 and P2 may be stored in the storage unit 184 through, for example, the sign state detector 181. An order of process P21 and process P22 may be changed. In other words, a setting order of the center frequencies fc±X/2 of the optical tunable filter 161-3, in other words, a detection order of the power P1 and P2 is inversible.

In the controller 18, for example, the sign state detector 181 compares the power P1 and P2 stored in the storage unit 184 with the threshold value Pref (process P30).

When a result of comparing with the threshold value is P1>Pref and P2<Pref (Yes in process P40), the modulated signal optical spectrum can be discriminated as being in the "expected state A" illustrated in FIG. 14A. When the same notation as in the first embodiment is used, it is the state A "(XI, XQ), (YI, YQ)."

In the "expected state A", the controller 18 does not need to perform the sign control A by the sign controller 182 on the electric signal generator 11A and may end the process.

Meanwhile, when a result of comparing with the threshold value is P1<Pref and P2>Pref (No in process P40 and Yes in process P50), the modulated signal optical spectrum can be discriminated as being in the "state B" illustrated in FIG. 14B.

Similarly to the first embodiment, the "state B" can be indicated by the state B "(XI, −XQ), (YI, −YQ)" or the state B "(−XI, XQ), (−YI, YQ)," compared to the state A "(XI, XQ), (YI, YQ)."

Thus, the state B can be converted into the state A "(XI, XQ), (YI, YQ)", for example, by inversely controlling the sign of the Q arm (or I arm) drive signal through the sign controller 182 for both the X polarization and the Y polarization (process P60).

The sign control can be implemented by controlling the signal generation process of the DSP 111. Alternatively, the sign control may be implemented by individually controlling the DACs 112XI, 112XQ, 112YI, and 112YQ or may be implemented by individually controlling the driver amplifiers 12XI, 12XQ, 12YI, and 12YQ.

Since the converted "state A" is the "expected state" illustrated in FIG. 14A, the controller 18 may end the process.

Meanwhile, when a result of comparing with the threshold value does not satisfy the condition of P1<Pref and P2>Pref (No in process P50), the modulated signal optical spectrum can be discriminated as being in the "state C" illustrated in FIG. 14C or the "state D" illustrated in FIG. 14D.

Similarly to the first embodiment, the "state C" can be indicated by the state C "(XI, XQ), (YI, −YQ)" or the state C "(XI, XQ), (−YI, YQ)." The "state D" can be discriminated by the state D "(XI, −XQ), (YI, YQ)" or the state D "(−XI, XQ), (YI, YQ)."

Thus, in the case of the "state C" or the "state D", similarly to the first embodiment, the sign of one of the I arm drive signal and the Q arm drive signal for one of the X polarization and the Y polarization may be inverted through the sign controller 182 (process P70).

For example, the state C "(XI, XQ), (YI, −YQ)" can be converted into the state B "(XI, −XQ), (YI, −YQ)" by inverting the sign of the Q arm drive signal for the X polarization. Further, the state D "(XI, −XQ), (YI, YQ)" can be converted into the state A "(XI, XQ), (YI, YQ)."

In order to discriminate the two possible states A and B, the controller 18 may set the center frequency of the optical tunable filter 161-3 to fc±X/2. In an individual filter setting, the power P1 and P2 of the light passed through the optical tunable filter 161-3 is detected through the power detector 163. The detected power information P1 and P2 may be stored in the storage unit 184 (process P81 and P82). As an order of processes P21 and P22 are reversible, a process order of processes P81 and P82 is also reversible.

In the controller 18, for example, the sign state detector 181 may compare the power information P1 and P2 stored in the storage unit 184 with the threshold value Pref (process P90).

When a result of comparing with the threshold value is P1>Pref and P2<Pref (Yes in process P100), the modulated signal optical spectrum can be discriminated as being in the "expected state A". Thus, the controller 18 may end the process.

Meanwhile, when the condition of P1>Pref and P2<Pref is not satisfied (No in process P100), the modulated signal optical spectrum can be discriminated as being in the state B "(XI, −XQ), (YI, −YQ)" or the state B "(−XI, XQ), (−YI, YQ)."

Thus, similarly to process P60, the state B can be converted into the state A "(XI, XQ), (YI, YQ)" by inverting the sign of the Q arm (or I arm) drive signal through the sign controller 182 for both the X polarization and the Y polarization (process P110).

Since the converted "state A" is the "expected state" illustrated in FIG. 14A, the controller 18 may end the process.

As described above, according to the first modified example of the first embodiment, similarly to the first embodiment, the modulated signal optical spectrum can be controlled to be in the "expected state A" according to the digital signal processing.

In the first modified example, the configuration of the monitor 16 can be more simplified than in the first embodiment as can be easily understood from a comparison of FIG. 10 and FIG. 13. Thus, it is possible to reduce the size and the cost of the optical transmitter 1 equipped with the monitor 16.

Similarly to the first embodiment, even when the frequency shift is +X/2 [GHz] in the positive direction, the same control can be performed by changing the threshold value determination criterion of processes P40, P50, and P100 of FIG. 15.

For example, in processes P40 and P100, it is determined whether or not P1<Pref and P2>Pref are satisfied, and in process P50, it is determined whether or not P1>Pref and P2<Pref are satisfied. However, when the frequency shift is +X/2 [GHz], the "expected state" is, for example, the state B of FIG. 11B as described above.

When P1<Pref and P2>Pref are satisfied in processes P40 and P100, the modulated signal optical spectrum can be determined as being in the "expected state B." When P1>Pref and P2<Pref are not satisfied in process P50, the modulated signal optical spectrum can be determined as being in the state D or the state C.

Second Modified Example of First Embodiment

Figure 16:
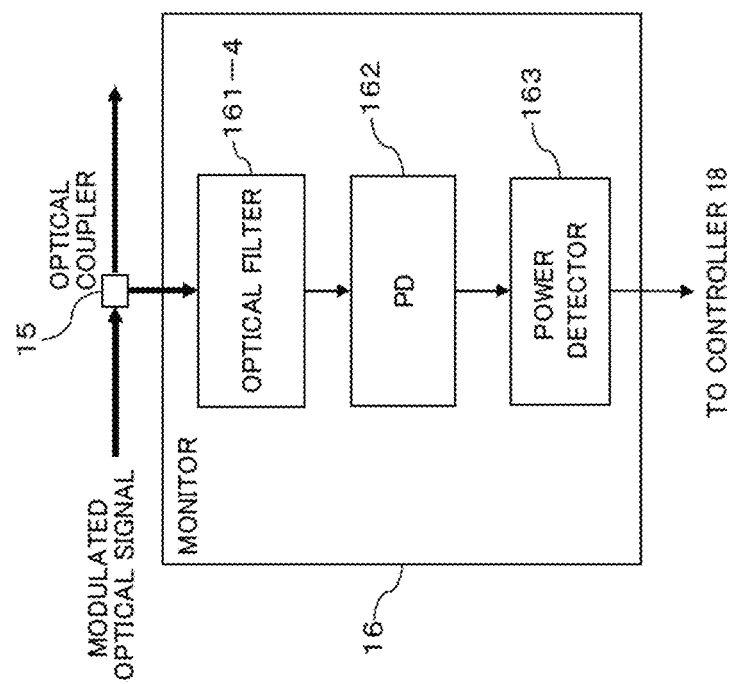
FIG. 16 is a block diagram illustrating an exemplary configuration of a monitor according to a second modified example of the first embodiment.

FIG. 16 is a block diagram illustrating an exemplary configuration of a monitor according to a second modified example of the first embodiment. As illustrated in FIG. 16, the monitor 16 may include, for example, an optical filter 161-4, a PD 162, and a power detector 163. In the second modified example, an exemplary configuration of the optical transmitter 1 other than the monitor 16 may be the same or similar to the configuration illustrated in FIGS. 6 and 7.

The center frequency of the optical filter 161-4 may be fixed or variable. For example, the center frequency of the optical filter 161-4 may be set to either of fc±X/2. Thus, the optical filter 161-4 can allow light of a frequency component with a center frequency of either of fc±X/2N (N=1) to pass through.

However, in the second modified example, since it is enough that the monitor 16 can detect the presence or absence of the modulated signal light in the specific frequency according to the frequency shift of the drive signal, the center frequency of the optical tunable filter 161-4 does not need to be accurately set to fc−X/2 or fc+X/2.

Thus, the center frequency of the optical filter 161-4 may be set to a frequency near fc−X/2 or fc+X/2 involving a possible setting error. For example, the center frequency of the optical filter 161-4 may be set and controlled to be a frequency at which the power detection sensitivity of the modulated signal light in the specific frequency according to the frequency shift of the drive signal is as high as possible.

A pass band width of the optical filter 161-4 may be set to a band width at which the presence or absence of signal light according to the frequency shift can be detected at the center frequencies. As a non-limiting example, the pass band width of the optical tunable filter 161-4 may be set to a band that is narrower than the spectrum width X [GHz] of the modulated signal optical spectrum, for example, a band that is narrower than X/2 [GHz] as schematically illustrated in FIGS. 17A to 17D.

FIGS. 17A to 17D illustrate the states A to D of the modulated signal optical spectrum when the frequency-shifted signal of fc−X/2 [GHz] is used as the drive signal of the polarization multiplexing optical modulator 14A. In other words, FIGS. 17A to 17D respectively correspond to FIGS. 11A to 11D of the first embodiment or FIGS. 14A to 14D of the first modified example.

When the modulated signal optical spectrum is in the "expected state A" of FIG. 9A as illustrated in FIG. 17A, the signal light components of both of the X polarization and the Y polarization are output from the optical filter 161-4.

On the other hand, when the modulated signal optical spectrum is in the "state B" of FIG. 9B as illustrated in FIG. 17B, the signal light component is not substantially output from the optical filter 161-4.

Further, when the modulated signal optical spectrum is in the "state C" of FIG. 9C as illustrated in FIG. 17C, the output of the optical filter 161-4 is dominated by the signal light component of one X polarization, and the output optical power decreases to be lower than in the state A.

Further, when the modulated signal optical spectrum is in the "state D" of FIG. 9D as illustrated in FIG. 17D, the output of the optical filter 161-4 is dominated by the signal light component of the other Y polarization, and the output optical power decreases to be lower than in the state A.

The PD 162 receives the light passed through the optical filter 161-4, and outputs the electric signal according to the received optical signal.

The power detector 163 detects, for example, the power (in other words, the amplitude) of the output electric signal of the PD 162. The detection result of the power detector 163 may be provided to the controller 18 (for example, the sign state detector 181).

Here, the four possible states A to D illustrated in FIGS. 17A to 17D correspond to four combinations of the signs of the drive signals applied to the XI arm, the XQ arm, the YI arm, and the YQ arm of the polarization multiplexing optical modulator 14A.

A state in which the power of the signal light component that has passed through the optical filter 161-4 and is detected through the power detector 163 becomes maximum among the four possible states A to D is the "expected state A."

Thus, the controller 18 may control the signs of the drive signals of the XI arm, the XQ arm, the YI arm, and the YQ arm in a sign combination in which the power of the signal light component detected through the power detector 163 is maximum.

(Exemplary Operation)

Next, an exemplary operation according to the second modified example of the first embodiment will be described with reference to a flowchart illustrated in FIG. 18.

Figure 18:
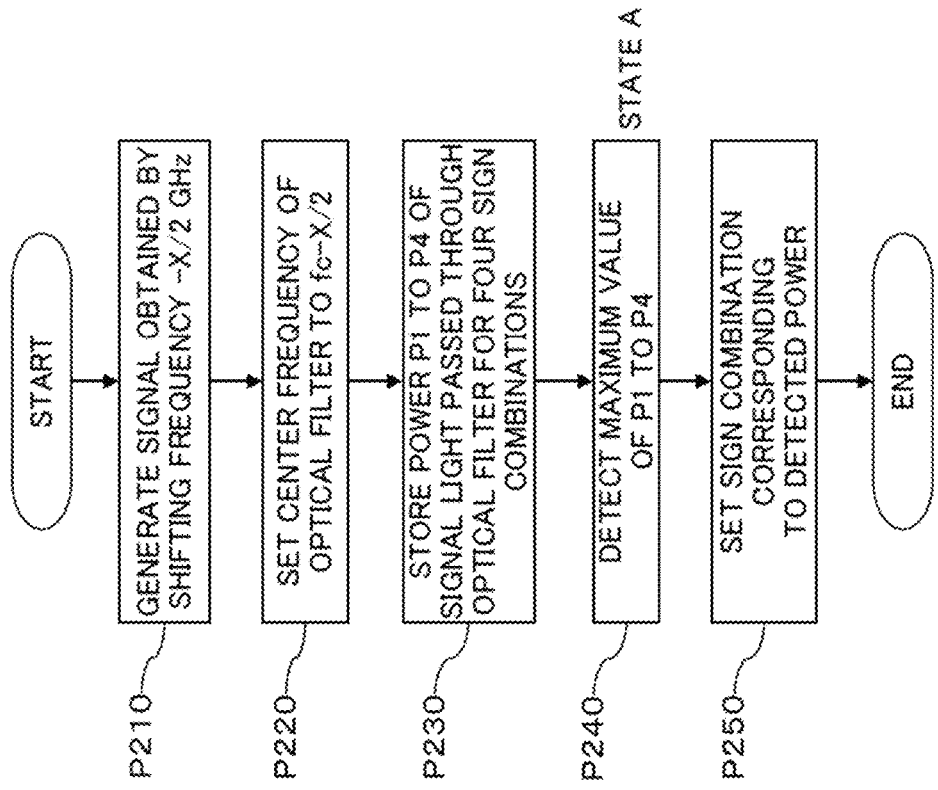
FIG. 18 is a flowchart illustrating an exemplary operation according to the second modified example of the first embodiment.

As illustrated in FIG. 18, the electric signal generator 11A (for example, the DSP 111) generates the frequency-shifted signal that is obtained by shifting the frequency from the carrier frequency fc by −X/2 [GHz] (process P210).

As the polarization multiplexing optical modulator 14A is driven using the frequency-shifted signal as the drive signal, the polarization multiplexing modulated signal light is generated and output to the polarization multiplexing optical modulator 14A and then input to the monitor 16 through the optical coupler 15.

For example, the monitor 16 sets the center frequency of the optical filter 161-4 to fc−X/2 (process P220).

Then, the signs of the drive signals of the XI arm, the XQ arm, the YI arm, and the YQ arm are individually inverted or not inverted, and the polarization multiplexing optical modulator 14A is sequentially driven using a total of four sign combinations.

The control of individually inverting or non-inverting the signs of the four drive signals may be performed, for example, by controlling the DSP 111 through the controller 18. Alternatively, the sign control may be implemented by individually controlling the DACs 112XI, 112XQ, 112YI, and 112YQ through the controller 18 or by individually controlling the driver amplifiers 12XI, 12XQ, 12YI, and 12YQ.

As a result, for example, as shown in the following Table 1, in each of the four sign combinations of the drive signals, the power P1 to P4 of the signal light components passed through the optical filter 161-4 is detected through the power detector 163. Information indicating the detected power P1 to P4 may be stored in the storage unit 184 of the controller 18 together with information indicating the corresponding sign combination (process P230).

TABLE 1

Example of four sign combinations

| | | |
|---|---|---|
| 1 | (XI, XQ), (YI, YQ) | P1 |
| 2 | (XI, −XQ), (YI, −YQ) | P2 |
| 3 | (XI, XQ), (YI, −YQ) | P3 |
| 4 | (XI, −XQ), (YI, YQ) | P4 |

In the controller 18, for example, the sign state detector 181 may detect the maximum value of the power information P1 to P4 stored in the storage unit 184 (process P240). The sign combination corresponding to the maximum value is a drive condition of the polarization multiplexing optical modulator 14A under which the "expected state A" of the modulated signal optical spectrum is obtained.

In other words, when a combination of positive and negative signals of each of the I component and the Q component of the drive signal is changed, the controller 18 detects the maximum value of the power detected through the power detector 163. The sign combination corresponding to the detected maximum value can be discriminated as being a combination in which the modulated signal light is shifted in a direction opposite to the direction of the frequency shift of the drive signal.

Thus, the controller 18 may perform control such that the drive signal of each arm is set to the sign combination corresponding to the detected maximum value, for example, through the sign controller 182 (process P250). Accordingly, the modulated signal optical spectrum of the optical transmitter 1 can be controlled to be in the "expected state A."

As described above, according to the second modified example of the first embodiment, the same effects as in the first embodiment are obtained, and since the monitor 16 can be configured with the single optical filter 161-4, the single PD 162, and the single power detector 163, the configuration of the monitor 16 can be more simplified than in the first embodiment.

Further, since the controller 18 does not need to control the center frequency of the optical filter 161-4, simplification of control and the detection speed by the monitor 16 can be further improved than in the first modified example using the optical tunable filter 161-3.

Third Modified Example of First Embodiment

In the second modified example, the maximum value of the power P1 to P4 is detected, but it is possible to cause the modulated signal optical spectrum of the optical transmitter 1 to enter the "expected state A" by detecting a minimum value of the power P1 to P4.

An exemplary operation is illustrated in a flowchart of FIG. 19. In FIG. 19, processes P210, P220, and P230 are the same as in FIG. 18. An exemplary configuration of the monitor 16 according to the third modified example may be the same as or similar to that illustrated in FIG. 16 of the second modified example.

In process P260 of FIG. 19, the controller 18 may detect the minimum value of the power information P1 to P4 through, for example, the sign state detector 181. In other words, the controller 18 may detect the minimum value of the power detected through the power detector 163 when a combination of positive and negative signals of each of the I component and the Q component of the drive signal is changed.

The sign combination corresponding to the detected minimum value can be discriminated as being a combination in which the modulated signal light is shifted in a direction opposite to the direction of the frequency shift of the drive signal and corresponds to, for example, the state B illustrated in FIG. 17B.

When the same notation as in the first embodiment is used, the state B can be indicated by the state B "(XI, −XQ), (YI, −YQ)" or the state B "(−XI, XQ), (−YI, YQ)."

Thus, the controller 18 is available to convert the state B into the state A "(XI, XQ), (YI, YQ)" by inverting the signs of the drive signals of the I arm or the Q arm for both of the X polarization and the Y polarization, for example, through the sign controller 182 (process P270).

According to the third modified example, the minimum value of the power P1 to P4 is detected, in other words, the state B of FIG. 17B in which the power of the signal light component passed through the optical filter 161-4 is minimum is detected. Thus, the detection sensitivity can be improved to be higher than in the second modified example in which the power comparison is performed among the states A, C, and D in which there is the signal light component passed through the optical filter 161-4.

The controller 18 may perform process P280 as an option after process P270. In process P280, the controller 18 (for example, the sign state detector 181) may check the power detected through the power detector 163 corresponds to the maximum value of the power information P1 to P4 stored in process P230, in other words, the state A (process P280). When the detected power corresponds to the state A, process P210 and a process subsequent thereto may be performed again.

In both FIG. 18 of the second modified example and FIG. 19 of the third modified example, the frequency shift is −X/2 [GHz] in the negative direction but may be +X/2 [GHz] in the positive direction. In the case of the positive direction, in process P220, the center frequency of the optical filter 161-4 may be set to fc+X/2.

When the frequency shift is +X/2 [GHz] in the positive direction, the "expected state" is the state B of FIG. 17B. Thus, the detection of the maximum value of the power P1 to P4 in FIG. 18 (process P240) corresponds to detection of the state B, and the detection of the minimum value of the power P1 to P4 in FIG. 19 (process P260) corresponds to detection of the state A.

Second Embodiment

Exemplary configurations of the optical transmitter 1 and the polarization multiplexing optical modulator 14A according to the second embodiment may be the same as or similar to the exemplary configurations illustrated in FIGS. 6 and 7 in the first embodiment.

In the first embodiment and the first to third modified examples of the first embodiment, as illustrated in FIGS. 8A and 8B, a signal whose baud rate B (Gbaud) does not change and whose frequency is shifted from the carrier frequency fc by −X/2 [GHz] is used as the detection signal.

Meanwhile, in a second embodiment, a signal whose baud rate is 1/M of the transmission data signal and that is shifted from the carrier frequency fc by a frequency according to the baud rate of 1/M is used as the detection signal. M is an integer of 1 or more, and a case of M=1 is understood to correspond to the first embodiment.

In the second embodiment, a case of M≥#2 will be described. As a non-limiting example, an example of the detection signal when M=2 will be described with reference to FIGS. 20A to 20C.

FIG. 20A schematically illustrates an example of obtaining a modulated signal optical spectrum in which the baud rate is B [Gbaud], and the spectrum width is X [GHz] when the polarization multiplexing optical modulator 14A is driven using the transmission data signal.

Meanwhile, in the second embodiment, as illustrated in FIG. 20B, a signal in which a modulated signal optical spectrum whose baud rate is half that of FIG. 20A, in other words, B/2 [Gbaud] and whose spectrum width is X/2 [GHz] is obtained is used as the detection signal.

The center frequency of the detection signal may be shifted from the carrier frequency fc in a negative frequency direction by X/2M=X/4 [GHz] corresponding to half of the spectrum width X/M. In other words, the detection signal may have the center frequency of fc−X/4 [GHz].

When the polarization multiplexing optical modulator 14A is driven using the detection signal, a modulated signal optical spectrum with the baud rate=B/2 [Gbaud] and the center frequency=fc−X/4 [GHz] is obtained as illustrated in FIG. 20C. The state of the spectrum illustrated in FIG. 20C corresponds to the "expected state" of the detection signal optical spectrum.

Contrary to the above example, the center frequency of the detection signal may be shifted by X/4 [GHz] in the positive frequency direction.

When the polarization multiplexing optical modulator 14A is driven using the detection signal with the center frequency of fc−X/4, the modulated signal optical spectrum possibly involve the four states A to D illustrated in FIGS. 21A to 21D according to the relation between the sign of the drive signal and the bias control point.

The "state A" illustrated in FIG. 21A corresponds to the "expected state" illustrated in FIG. 20C and is a state in which the frequency shift of −X/4 [GHz] from the carrier frequency fc is performed for both of components of the X polarization and the Y polarization.

The "state B" illustrated in FIG. 21B is a state in which the frequency shift in the opposite direction to the "state A", in other words, is of +X/4 [GHz] from the carrier frequency fc is performed for both of components of the X polarization and the Y polarization.

The "state C" illustrated in FIG. 21C is the "expected state" in which the frequency shift of −X/4 [GHz] from the carrier frequency fc is performed for the X polarization component, similarly to the "state A." However, it is a state in which the frequency shift of +X/4 [GHz] from the carrier frequency fc is performed for the Y polarization component, similarly to the "state B."

The "state D" illustrated in FIG. 21D is the "expected state" in which the frequency shift of −X/4 [GHz] from the carrier frequency fc is performed for the Y polarization component, conversely the "state C." However, it is a state in which the frequency shift of +X/4 [GHz] from the carrier frequency fc is performed for the X polarization component.

Contrary to the above example, when the polarization multiplexing optical modulator 14A is driven using the signal that is frequency-shifted from the carrier frequency fc by +X/4 [GHz] as the drive signal, the "state B" of FIG. 21B is the "expected state."

The monitor 16 is available to detect one of the four possible states of FIGS. 21A to 21D which the modulated signal light enters according to the frequency shift of the drive signal by monitoring whether or not the component of the modulated signal light appears in the specific frequency according to the frequency shift of the drive signal.

When the monitored result of the monitor 16 indicates one of the state B, the state C, and the state D, the controller 18 perform control such that the state enters the state A through the sign control A (or the bias control B).

Figure 22:
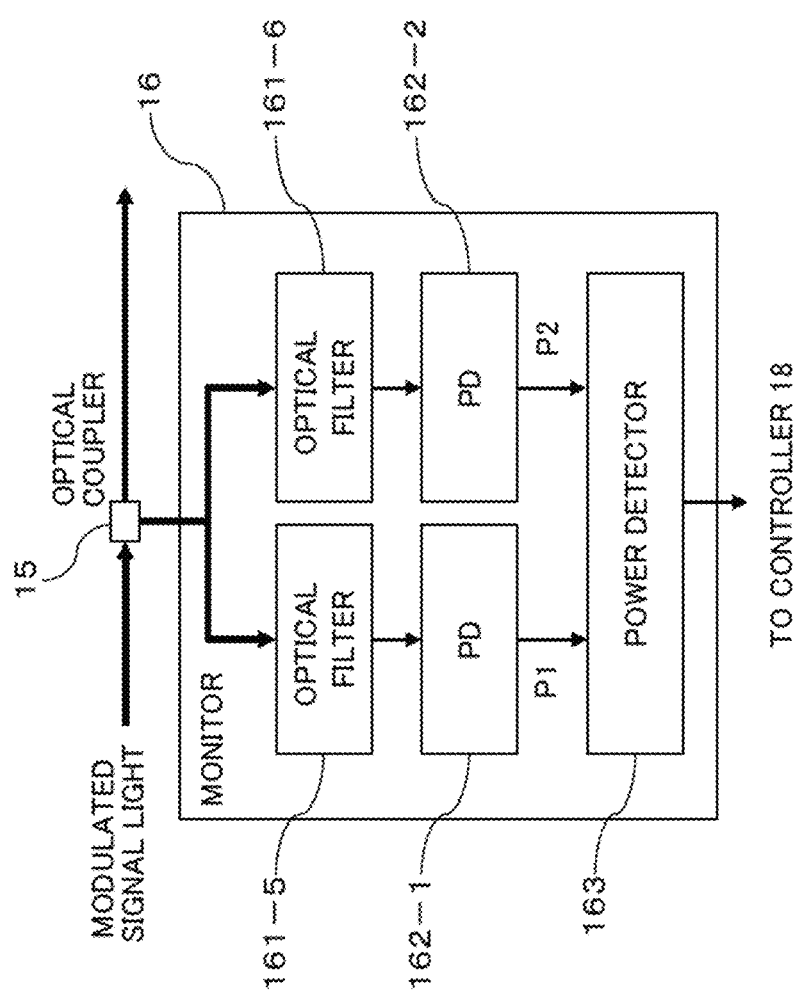
FIG. 22 is a block diagram illustrating an exemplary configuration of a monitor according to the second embodiment.

FIG. 22 illustrates an exemplary configuration of the monitor 16 according to the second embodiment. The monitor 16 may include, for example, two optical filters 161-5 and 161-6, two PDs 162-1 and 162-2, and a power detector 163 as illustrated in FIG. 22.

The center frequencies of the optical filter 161-5 and 161-6 may be set to frequencies according to the frequency shift of the transmission data signal.

For example, the center frequency of one optical filter 161-5 may be set to fc−X/4 [GHz] as schematically illustrated in FIG. 23A to FIG. 23D. The center frequency of the other optical filter 161-6 may be set to fc+X/4 [GHz].

Thus, the optical filter 161-5 is an example of a first optical filter that allows light of a frequency component with a center frequency of fc−X/2M (M=2), and the optical filter 161-6 is an example of a second optical filter that allows light of a frequency component with a center frequency of fc+X/2M.

However, since it is enough for the monitor 16 to be able to detect the presence or absence of the modulated signal light in the specific frequency according to the frequency shift of the drive signal, the center frequencies of the two optical filters 161-5 and 161-6 does not need to be accurately set to fc±X/4 [GHz].

Thus, the center frequencies of the optical filter 161-5 and 161-6 may be set to frequencies near fc±X/4 [GHz] involving a possible setting error. For example, the center frequencies of the optical filter 161-5 and 161-6 may be set and controlled to be a frequency at which the power detection sensitivity of the modulated signal light in the specific frequency according to the frequency shift of the drive signal is as high as possible.

Pass band widths of the optical filters 161-5 and 161-6 may be set to band widths at which the presence or absence of light according to the frequency shift can be detected at the center frequencies of the optical filters 161-5 and 161-6.

In other words, both of the optical filters 161-5 and 161-6 may be enough to have pass band characteristics (may also be referred to as "filter characteristics") in which the modulated signal optical spectrum is partially passed according to the frequency shift.

As a non-limiting example, the pass band widths of the optical filters 161-5 and 161-6 may be set to bands that are narrower than the spectrum width X/2 [GHz] of the modulated signal optical spectrum as schematically illustrated in FIGS. 23A to 23D. The pass band widths of the optical filters 161-5 and 161-6 may be the same or different.

When the modulated signal optical spectrum is the "expected state A" of FIG. 21A as illustrated in FIG. 23A, the signal light components of the X polarization and the Y polarization are output from one optical filter 161-5, and the signal light component is not substantially output from the other optical filter 161-6.

On the other hand, when the modulated signal optical spectrum is in the "state B" of FIG. 21B as illustrated in FIG. 23B, the signal light component is not substantially output from one optical filter 161-5, and the signal light components of the X polarization and the Y polarization are output from the other optical filter 161-6.

In other words, in the "expected state A" and the "state B", the signal light component is output only from one of the optical filters 161-5 and 161-6.

Meanwhile, when the modulated signal optical spectrum is in the "state C" of FIG. 21C as illustrated in FIG. 23C, for example, the signal light component of the X polarization is output from one optical filter 161-5, and the signal light component of the Y polarization is output from the other optical filter 161-6.

Further, when the modulated signal optical spectrum is in the "state D" of FIG. 21D as illustrated in FIG. 23D, for example, the signal light component of the Y polarization is output from one optical filter 161-5, and the signal light component of the X polarization is output from the other optical filter 161-6.

In other words, in the "state C" and the "state D", the signal light component is output from the optical filters 161-5 and 161-6.

The PD 162-1 receives the light passed through one optical filter 161-5, and outputs the electric signal according to the received optical signal to the power detector 163.

The PD 162-2 receives the light passed through the other optical filter 161-6, and outputs the electric signal according to the received optical signal to the power detector 163.

The electric signals output from the PD 162-1 and the PD 162-2 may be, for example, electric current signals or may be voltage signals obtained by converting electric current signals through a TIA or the like.

For example, the power detector 163 detects power (in other words, amplitudes) of the output electric signals of the PDs 162-1 and 162-2. The detection result of the power detector 163 indicates, for example, signal optical power at fc±X/4 [GHz] and may be provided to the controller 18 (for example, the sign state detector 181). The power detector 163 may be individually provided for each of the PDs 162-1 and 162-2.

The controller 18 is available to detect the sign of the transmission data signal state based on the signal optical power at fc±X/4 [GHz] which is detected by the power detector 163 and to perform the sign control A (or the bias control B) of the transmission data signal based on the detection result.

Figure 24:
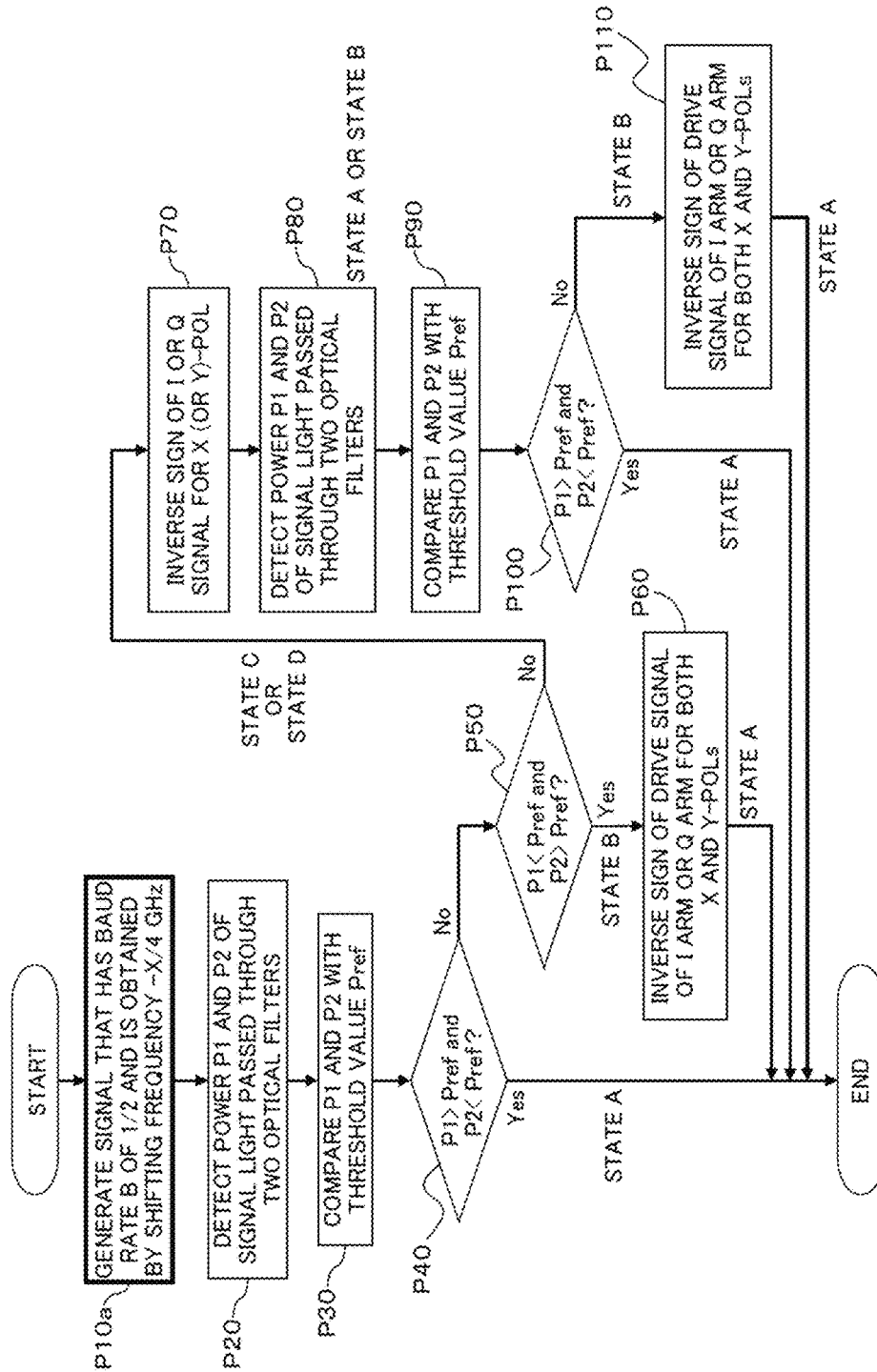
FIG. 24 is a flowchart illustrating an exemplary operation according to the second embodiment.

FIG. 24 is a flowchart illustrating an exemplary operation of the optical transmitter 1 according to the second embodiment. The flowchart illustrated in FIG. 24 differs from the flowchart illustrated in FIG. 12 according to the first embodiment in that process P10 of generating the detection signal through the electric signal generator 11A is replaced with process P10a.

In process P10a, the electric signal generator 11A (for example, the DSP 111) generates a frequency-shifted signal whose baud rate is B/2 [Gbaud] and whose frequency is shifted from the carrier frequency fc by −X/4 [GHz]. A subsequent process may be the same as or similar to the process described above with reference to FIG. 12.

For example, the controller 18 is available to discriminate the states A to D illustrated in FIGS. 23A to 23D by comparing the power P1 and P2 of the signal light component passed through the optical filter 161-5 and 161-6 with the threshold value Pref. According to a discrimination result, the controller 18 may individually control the signs of the drive signals applied to the XI arm, the XQ arm, the YI arm, and the YQ arm.

Accordingly, in the second embodiment, similarly to the first embodiment, it is possible to cause the modulated signal optical spectrum to enter the expected state A.

A process example illustrated in a flowchart of FIG. 24 is an example in which the frequency shift is −X/4 [GHz] in the negative direction, but even when the frequency shift is +X/4 [GHz] in the positive direction, the same control can be performed by changing the threshold value determination criteria of process P40, P50, and P100 as described above in the first embodiment.

As described above, according to the second embodiment, even when the baud rate B of the detection signal is lowered, and the spectrum width of the modulated signal light (X) is narrowed, the same operations and effects as in the first embodiment can be obtained.

For example, by lowering the baud rate of the detection signal to B/M, the modulated signal optical spectrum can fall within the transmission band when the baud rate is B as in the first embodiment. Thus, the filter characteristics of the optical filter 161-5 and 161-6 used in the monitor 16 are enough when the center frequency is within the original transmission band. Accordingly, the filter characteristics needed in the monitor 16 can be mitigated.

First Modified Example of Second Embodiment

In the second embodiment, the monitor 16 detects the signal light component power of the two frequencies fc±X/4 [GHz] using the two filters 161-5 and 161-6 and the two PDs 162-1 and 162-2.

Figure 25:
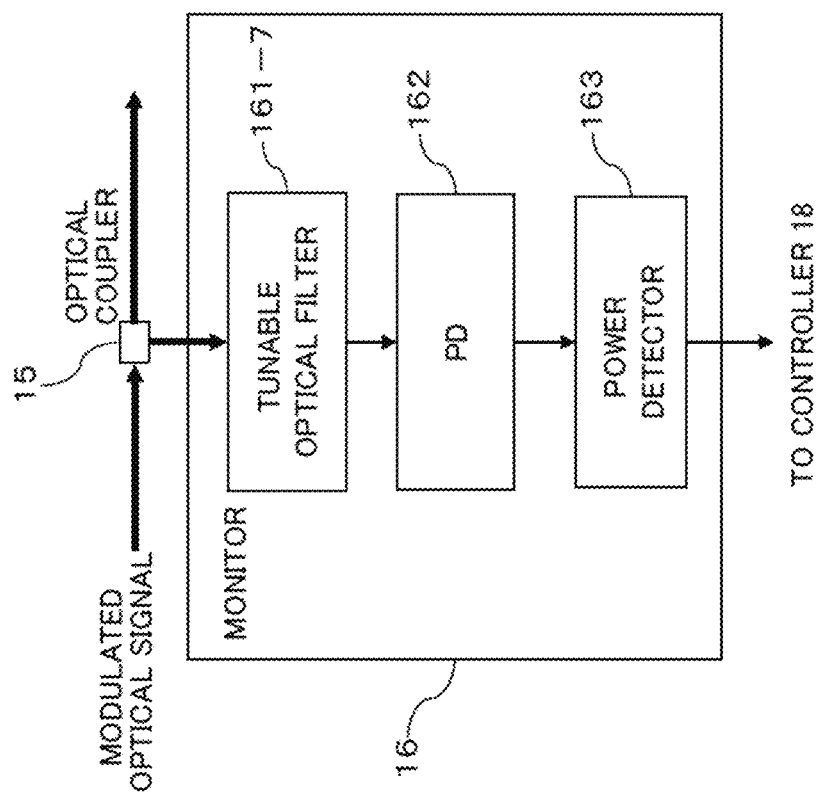
FIG. 25 is a block diagram illustrating an exemplary configuration of a monitor according to a first modified example of the second embodiment.

On the other hand, in the first modified example of the second embodiment, similarly to the first modified example of the first embodiment (FIG. 13), for example, as illustrated in FIG. 25, the monitor 16 detects the power of the signal light components of the two frequencies fc±X/4 using one optical tunable filter 161-7 and one PD 162. In the first modified example of the second embodiment, the exemplary configuration of the optical transmitter 1 other than the monitor 16 may be the same or similar to the configuration illustrated in FIGS. 6 and 7.

For this reason, the center frequency of the optical tunable filter 161-7 may be set and controlled to either of fc±X/4. The setting and control of the center frequency of the optical tunable filter 161-7 may be performed through, for example, the optical filter controller 185 of the controller 18 illustrated in FIG. 7.

In the first modified example of the second embodiment, since it is enough for the monitor 16 to be able to detect the presence or absence of the modulated signal light in the specific frequency according to the frequency shift of the drive signal, the center frequency of the optical tunable filter 161-7 does not need to be accurately set and controlled to fc±X/4.

Thus, the center frequency of the optical tunable filter 161-7 may be set to a frequency near either of fc±X/4 [GHz] involving a possible setting error. For example, the center frequency of the optical filter 161-7 may be set and controlled to be a frequency at which the power detection sensitivity of the modulated signal light in the specific frequency according to the frequency shift of the drive signal is as high as possible.

A pass band width of the optical tunable filter 161-7 may be set to a band width at which the presence or absence of signal light according to the frequency shift can be detected at the set center frequency.

As a non-limiting example, the pass band width of the optical tunable filter 161-7 may be set to a band that is narrower than the spectrum width X/2 [GHz] of the modulated signal optical spectrum as schematically illustrated in FIGS. 26A to 26D.

FIGS. 26A to 26D respectively correspond to FIGS. 23A to 23D and illustrate the states A to D of the modulated signal optical spectrum when the frequency-shifted signal of fc−X/4 [GHz] is used as the drive signal of the polarization multiplexing optical modulator 14A.

When the modulated signal optical spectrum is in the "expected state A" of FIG. 21A, and the center frequency of the optical tunable filter 161-7 is set to fc−X/4 as illustrated in FIG. 26A, the signal light components of the X polarization and the Y polarization are output. When the center frequency of the optical tunable filter 161-7 is set to fc+X/4 as indicated by a dotted line in FIG. 26A, the signal light component is not substantially output.

When the modulated signal optical spectrum is in the "state B" of FIG. 21B, and the center frequency of the optical tunable filter 161-7 is set to fc+X/4 as illustrated in FIG. 26B, the signal light components of the X polarization and the Y polarization are output. When the center frequency of the optical tunable filter 161-7 is set to fc−X/4, the signal light component is not substantially output.

Even when the modulated signal optical spectrum is in the "state C" of FIG. 21C, and the center frequency of the optical tunable filter 161-7 is set to either of fc±X/4 as illustrated in FIG. 26C, the signal light component is output. For example, when the center frequency of the optical tunable filter 161-7 is set to fc−X/4, the signal light component of the X polarization is output. When the center frequency of the optical tunable filter 161-7 is set to fc+X/4, the signal light component of the Y polarization is output.

When the modulated signal optical spectrum is in the "state D" of FIG. 21D, and the center frequency of the optical tunable filter 161-7 is set to fc−X/4 as illustrated in FIG. 26D, the signal light component of the Y polarization is output. When the center frequency of the optical tunable filter 161-7 is set to fc+X/4, the signal light component of the X polarization is output.

The PD 162 causes, for example, the center frequency of the optical tunable filter 161-7 to be set either of fc±X/4, receives the light passed through the optical tunable filter 161-7, and outputs the electric signal according to the received optical signal to the power detector 163.

The power detector 163 detects, for example, the power (in other words, the amplitude) of the output electric signal of the PD 162. The power detector 163 according to the first modified example of the second embodiment is possible to detect the power of the light passed through the optical tunable filter 161-7 when the center frequency of the optical tunable filter 161-7 is set to allow light of a frequency component with a center frequency of fc±X/2M (M=2) to pass through.

The detection result of the power detector 163 when the center frequency of the optical tunable filter 161-7 is set and controlled to be either of fc±X/4 may be provided to the controller 18 (for example, the sign state detector 181).

Figure 27:
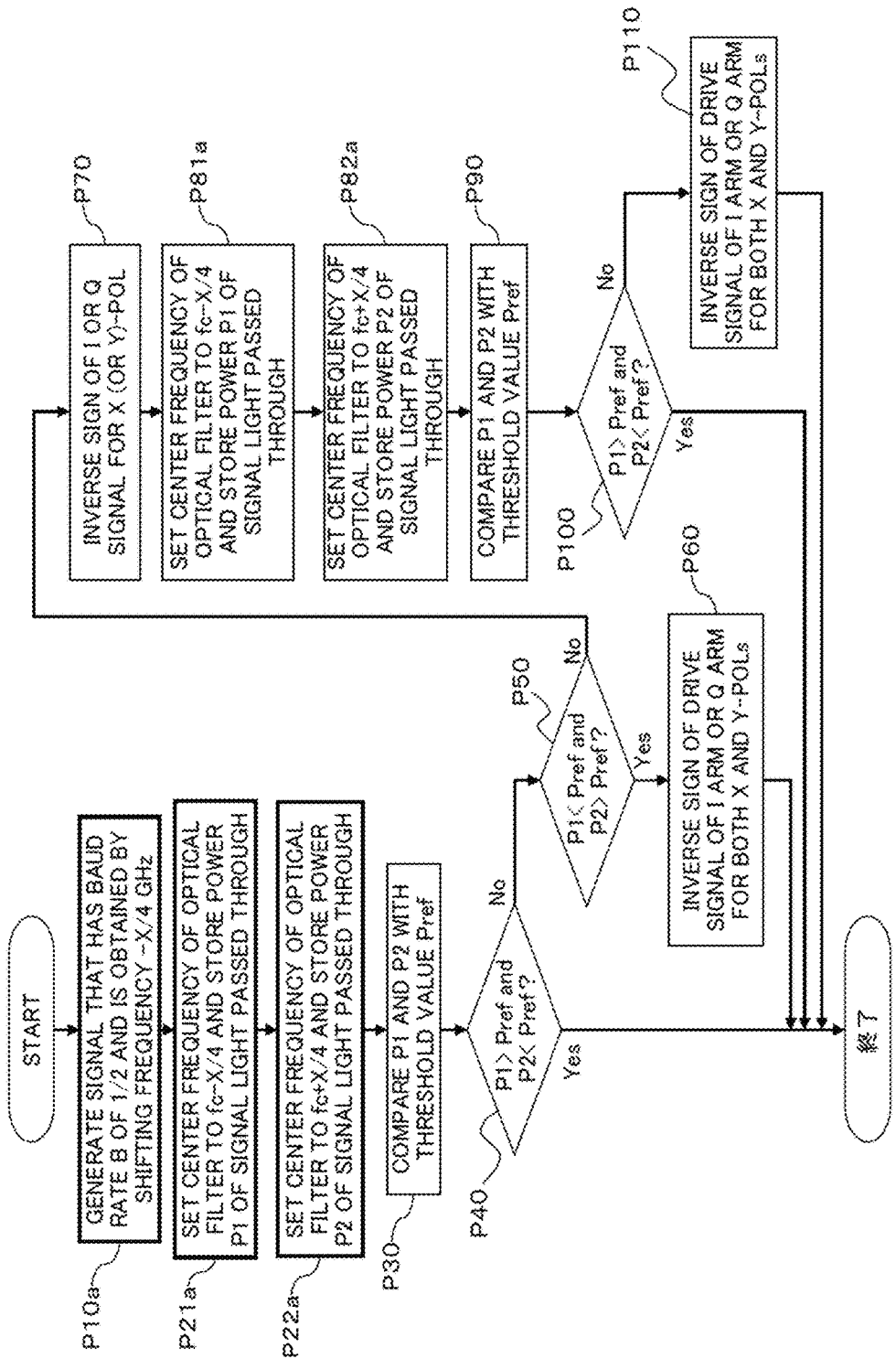
FIG. 27 is a flowchart illustrating an exemplary operation according to the first modified example of the second embodiment.

FIG. 27 is a flowchart illustrating an exemplary operation of the optical transmitter 1 according to the first modified example of the second embodiment. The flowchart illustrated in FIG. 27 differs from the flowchart illustrated in FIG. 15 according to the first modified example of the first embodiment in that process P10 of generating the detection signal through the electric signal generator 11A is replaced with process P10a.

In process P10a, the electric signal generator 11A (for example, the DSP 111) generates a frequency-shifted signal whose baud rate is B/2 and whose frequency is shifted from the carrier frequency fc by −X/4 [GHz].

A subsequent process may be the same as or similar to the process described above with reference to FIG. 15 other than a condition that the center frequency of the optical tunable filter 161-7 is set to either of fc±X/4.

For example, in FIG. 27, processes P21 and P81 of FIG. 15 are replaced with processes P21a and P81a of setting the center frequency of the optical tunable filter 161-7 to fc−X/4 instead of fc−X/2.

In FIG. 27, processes P22 and P82 of FIG. 15 are replaced with processes P22a and P82a of setting the center frequency of the optical tunable filter 161-7 to fc+X/4 instead of fc+X/2.

Accordingly, in the first modified example of the second embodiment, similarly to the second embodiment, it is possible to cause the modulated signal optical spectrum to enter the expected state A. Thus, the same effects as in the second embodiment can be obtained.

In the first modified example of the second embodiment, similarly to the relation between the first embodiment and the first modified example of the first embodiment, the configuration of the monitor 16 can be further improved than in the second embodiment as can be easily understood from a comparison of FIG. 22 and FIG. 25. Thus, it is possible to reduce the size and the cost of the optical transmitter 1 equipped with the monitor 16.

Further, in the first modified example of the second embodiment, the spectrum width of the modulated signal light monitored through the monitor 16 is narrowed by lowering the baud rate of the detection signal. Thus, the control width of the center frequency of the optical tunable filter 161-7 can be more narrowed than in the first modified example of the first embodiment. Thus, compared to the first modified example of the first embodiment, the control speed of the optical tunable filter 161-7 can be expected to be improved, and a detection time of the spectrum state by the monitor 16 can be expected to be reduced.

Even when the frequency shift is +X/4 [GHz] in the positive direction similarly to the second embodiment, the same control can be performed by changing the threshold value determination criteria of process P40, P50, and P100 of FIG. 27 as described above in the first embodiment, similarly to the second embodiment.

Second Modified Example of Second Embodiment

In the second embodiment, it is possible to cause the modulated signal optical spectrum to enter the "expected state A" through the detection of the maximum value of the power P1 to P4 in the four sign combinations of the drive signal of each of XI, XQ, YI, and YQ arms, similarly to the first modified example of the first embodiment.

FIG. 28 is a block diagram illustrating an exemplary configuration of a monitor according to a second modified example of the second embodiment. The monitor 16 may include, for example, an optical filter 161-8, a PD 162, and a power detector 163 as illustrated in FIG. 28. In the second modified example of the second embodiment, the exemplary configuration of the optical transmitter 1 other than the monitor 16 may be the same or similar to the configuration illustrated in FIGS. 6 and 7.

The center frequency of the optical filter 161-8 may be fixed or variable. For example, the center frequency of the optical filter 161-8 may be set to either of fc±X/2M (M=2). Thus, the optical filter 161-8 is possible to allow light of a frequency component with a center frequency of either of either of fc±X/4 to pass through.

However, since it is enough for the monitor 16 to detect the presence or absence of the modulated signal light in the specific frequency according to the frequency shift of the drive signal, the center frequency of the optical filter 161-8 does not need to be accurately set to fc−X/4 or fc+X/4.

Thus, the center frequency of the optical filter 161-8 may be set to a frequency near fc−X/4 or fc+X/4 involving a possible setting error. For example, the center frequency of the optical filter 161-8 may be set and controlled to be a frequency at which the power detection sensitivity of the modulated signal light in the specific frequency according to the frequency shift of the drive signal is as high as possible.

A pass band width of the optical filter 161-8 may be set to a band width at which the presence or absence of signal light according to the frequency shift can be detected at the center frequencies. As a non-limiting example, the pass band width of the optical filter 161-8 may be set to a band that is narrower than the spectrum width X/2 [GHz] of the modulated signal optical spectrum as schematically illustrated in FIGS. 29A to 29D.

FIGS. 29A to 29D illustrate the states A to D of the modulated signal optical spectrum when the frequency-shifted signal of fc−X/4 [GHz] is used as the drive signal of the polarization multiplexing optical modulator 14A. In other words, FIGS. 29A to 29D correspond to FIGS. 23A to 23D of the second embodiment or FIGS. 26A to 26D of the first modified example.

As illustrated in FIG. 29A, when the modulated signal optical spectrum is in the "expected state A" of FIG. 21A, the signal light components of both of the X polarization and the Y polarization are output from the optical filter 161-8.

Meanwhile, as illustrated in FIG. 29B, when the modulated signal optical spectrum is in the "state B" of FIG. 21B, the signal light component is not substantially output from the optical filter 161-8.

Further, when the modulated signal optical spectrum is in the "state C" of FIG. 21C as illustrated in FIG. 29C, the output of the optical filter 161-8 is dominated by the signal light component of one X polarization, and the output optical power decreases to be lower than in the state A.

Further, when the modulated signal optical spectrum is in the "state D" of FIG. 21D as illustrated in FIG. 29D, the output of the optical filter 161-8 is dominated by the signal light component of the other Y polarization, and the output optical power decreases to be lower than in the state A.

The PD 162 receives, for example, the light passed through the optical filter 161-8, and outputs the electric signal according to the received optical signal to the power detector 163.

The power detector 163 detects, for example, the power (in other words, the amplitude) of the output electric signal of the PD 162. The detection result of the power detector 163 may be provided to the controller 18 (for example, the sign state detector 181).

Here, the four possible states A to D illustrated in FIGS. 29A to 29D correspond to four combinations of the signs of the drive signals applied to the XI arm, the XQ arm, the YI arm, and the YQ arm of the polarization multiplexing optical modulator 14A.

A state in which the power of the signal light component that has passed through the optical filter 161-8 and is detected through the power detector 163 becomes maximum among the four possible states A to D is the "expected state A."

Thus, the controller 18 may control the signs of the drive signals of the XI arm, the XQ arm, the YI arm, and the YQ arm such that a sign combination in which the power of the signal light component detected through the power detector 163 is maximum is made.

FIG. 30 is a flowchart illustrating an exemplary operation of the optical transmitter 1 according to the second modified example of the second embodiment. The flowchart illustrated in FIG. 30 differs from the flowchart illustrated in FIG. 18 according to the second modified example of the first embodiment in that process P210 of generating the detection signal through the electric signal generator 11A is replaced with process P210a. Further, process P220 of FIG. 18 is replaced with process P220a in FIG. 30.

In process P210a, similarly to process P10a of FIG. 24 or FIG. 27, the electric signal generator 11A (for example, the DSP 111) generates a frequency-shifted signal whose baud rate is B/2 [Gbaud] and whose frequency is shifted from the carrier frequency fc by −X/4 [GHz].

In process P220a, the center frequency of the optical filter 161-8 is set to fc−X/4. A subsequent process may be the same as or similar to processes P230, P240, and P250 of FIG. 18.

For example, in the controller 18 may detect the maximum value of the power information P1 to P4 for the four sign combinations through the sign state detector 181 and perform control such that the drive signal of each arm is set to the sign combination corresponding to the maximum value through, for example, the sign controller 182. Accordingly, it is possible to cause the modulated signal optical spectrum of the optical transmitter 1 to enter the "expected state A."

As described above, according to the second modified example of the second embodiment, the same effects as in the second embodiment are obtained, and similarly to the second modified example of the first embodiment, the monitor 16 can be configured with one optical filter 161-8, the PD 162, and the power detector 163. Thus, the configuration of the monitor 16 can be more simplified than in the second embodiment.

Since the controller 18 does not need to control the center frequency of the optical filter 161-8, compared to the first modified example of the second embodiment using the optical tunable filter 161-7, the control can be more simplified, and the detection speed by the monitor 16 can be improved.

Third Modified Example of Second Embodiment

In the second modified example of the second embodiment, the maximum value of the power P1 to P4 is detected, but similarly to a third modified example of the first embodiment, it is possible to detect the minimum value of the power P1 to P4 and perform control such that the modulated signal optical spectrum of the optical transmitter 1 enters the "expected state A." An exemplary configuration of the monitor 16 according to the third modified example of the second embodiment may be the same as or similar to the configuration of FIG. 28.

Figure 31:
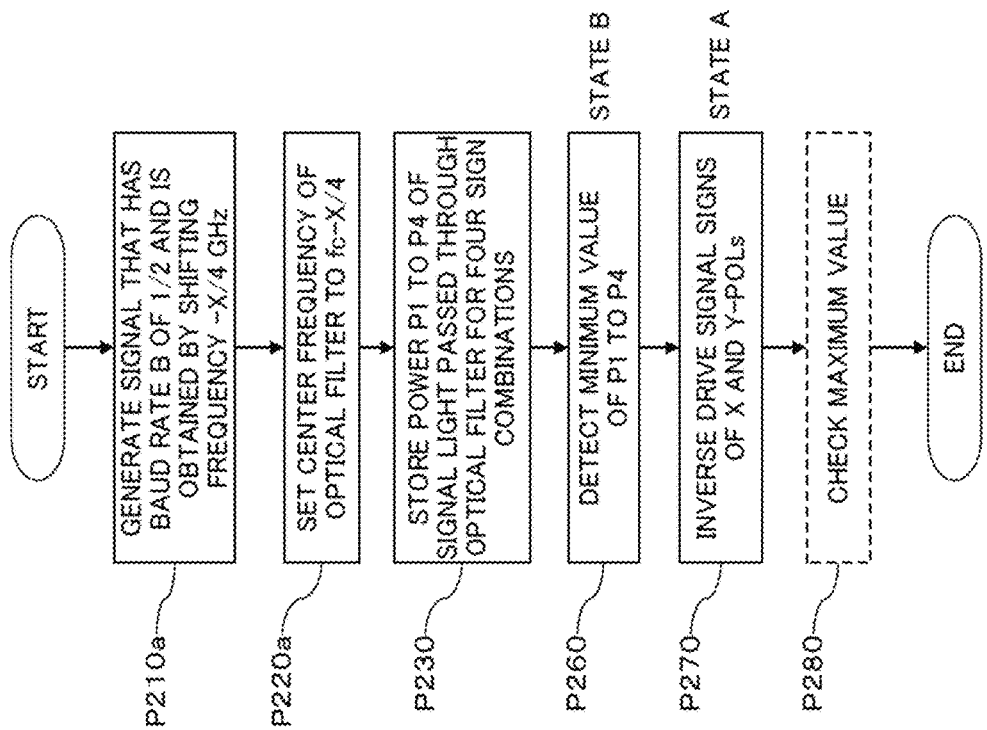
FIG. 31 is a flowchart illustrating an exemplary operation according to a third modified example of the second embodiment.

The exemplary operation according to the third modified example of the second embodiment is illustrated in a flowchart of FIG. 31. Processes P210a, P220a, and P230 in FIG. 31 may be the same as those in FIG. 30. Processes P260 and P270 in FIG. 31 may be the same as or similar to processes P260 and P270 of FIG. 19.

According to the third modified example of the second embodiment, the same effects as in the second modified example of the second embodiment are obtained. In the third modified example of the second embodiment, the state B of FIG. 29B in which the power of the signal light component passed through the optical filter 161-8 is minimum is detected.

Thus, similarly to the third modified example of the first embodiment, the detection sensitivity is expected to be improved to be higher than in the second modified example of the second embodiment in which the power comparison is performed among the states A, C, and D in which there is the signal light component passed through the optical filter 161-8.

In FIG. 31, similarly to FIG. 19, the controller 18 may perform process P280 as an option after process P270. In process P280, the controller 18 (for example, the sign state detector 181) may check the power detected through the power detector 163 corresponds to the maximum value of the power information P1 to P4 stored in process P230, in other words, the state A (process P280).

In both of the flowcharts of FIGS. 30 and 31, the frequency shift is −X/4 [GHz] in the negative direction but may be +X/4 [GHz] in the positive direction. In the case of the positive direction, in process P220a, the center frequency of the optical filter 161-8 may be set to fc+X/4.

When the frequency shift is +X/4 [GHz] in the positive direction, the "expected state" is the state B of FIG. 29B. Thus, the detection of the maximum value of the power P1 to P4 in FIG. 30 (process P240) corresponds to detection of the state B, and the detection of the minimum value of the power P1 to P4 in FIG. 31 (process P260) corresponds to detection of the state A.

Third Embodiment

Exemplary configurations of the optical transmitter 1 and the polarization multiplexing optical modulator 14A according to the third embodiment may be the same as or similar to the exemplary configurations illustrated in FIGS. 6 and 7 in the first embodiment.

In the second embodiment, a signal whose baud rate B (Gbaud) is 1/M of the baud rate B of the transmission data signal and whose center frequency is shifted from the carrier frequency fc by either of ±X/2M is used as the detection signal.

In the third embodiment, one of K subcarrier (SC) signals whose baud rate B (Gbaud) is 1/M of the baud rate of the transmission data signal is used as the detection signal. One of the K subcarrier (SC) signals has a frequency that is shifted from the carrier frequency fc by either of ±X/2K as the center frequency. Thus, one of the K subcarrier (SC) signals can be considered as corresponding to the detection signal of the second embodiment with the center frequency of either of fc±X/2K.

As a non-limiting example, an example the detection signal according to the third embodiment when K=2 will be described with reference to FIGS. 32A to 32C.

FIG. 32A schematically illustrates an example of obtaining a modulated signal optical spectrum in which the baud rate is B [Gbaud], and the spectrum width is X [GHz] when the polarization multiplexing optical modulator 14A is driven using the transmission data signal.

In the third embodiment, as illustrated in FIG. 32B, one of the SC signals in which two SC modulated signal optical spectrums whose baud rate is half that of FIG. 32A, in other words, B/2 [Gbaud] and whose spectrum width is X/2 [GHz] are obtained is used as the detection signal.

For example, one of the two SC signals (#1 and #2) is ON-controlled, and the other of the two SC signals is OFF-controlled. For example, when the SC signal #1 at the low frequency side is ON-controlled, and the SC signal #2 at the high frequency side is OFF-controlled, SC modulated signal light illustrated in FIG. 32C is obtained. A spectrum state illustrated in FIG. 32C corresponds to the "expected state."

The spectrum state illustrated in FIG. 32C may be considered as being equivalent to the spectrum state illustrated in FIG. 20C. In other words, the SC modulated signal optical spectrum of FIG. 32C can be considered as corresponding to the polarization multiplexing modulated signal optical spectrum illustrated in FIG. 20C in which the baud rate is B/2 [Gbaud], and the center frequency is shifted from the carrier frequency fc by −X/4 [GHz].

Contrary to the above example, the SC signal #1 at the low frequency side may be OFF-controlled, and the SC signal #2 at the high frequency side may be ON-controlled. In this case, it can be considered that the SC modulated signal optical spectrum in which the baud rate is B/2 [Gbaud] and the center frequency is fc+X/4 [GHz] can be obtained.

Thus, the SC signal #1 may be considered as being an example of a frequency-shifted signal whose center frequency is shifted from the carrier frequency fc by −X/4 [GHz]. The SC signal #2 may be considered as being an example of a frequency-shifted signal whose center frequency is shifted from the carrier frequency fc by +X/4 [GHz].

Assuming that the polarization multiplexing optical modulator 14A is driven using the SC signal #1, the modulated signal optical spectrum possibly involve the four states A to D illustrated in FIGS. 33A to 33D according to the relation between the sign of the drive signal and the bias control point.

The "state A" illustrated in FIG. 33A corresponds to the "expected state" illustrated in FIG. 32C and is a state in which, for example, the signal light components of the X polarization and the Y polarization are generated at an expected subcarrier frequency (for example, fc−X/4).

Contrary to FIG. 33A, the "state B" illustrated in FIG. 33B is a state in which the signal light components of the X polarization and the Y polarization are generated at a frequency (for example, the subcarrier frequency fc+X/4 of the SC signal #2) different from an expected subcarrier frequency (for example, fc−X/4).

The "state C" illustrated in FIG. 33C is the "expected state" for the X polarization component, similarly to the "state A." However, it is the state in which the signal light component is generated at a frequency (for example, the subcarrier frequency fc+X/4 of the SC signal #2) different from an expected subcarrier frequency (for example, fc−X/4) for the Y polarization component.

The "state D" illustrated in FIG. 33D is a state in which a subcarrier position relation of the X polarization component and the Y polarization component of the "state C" is inverted.

Further, when the SC signal #1 at the low frequency side is OFF-controlled, and the SC signal #2 at the high frequency side is ON-controlled, the "state B" of FIG. 33B is the "expected state."

The monitor 16 is available to detect one of the four possible states of FIGS. 21A to 21D which the modulated signal light enters for the subcarrier frequency of the SC signal using the drive signal by monitoring the specific frequency in which the component of the modulated signal light appears.

When the monitored result of the monitor 16 indicates one of the state B, the state C, and the state D, the controller 18 perform control such that the state enters the state A through the sign control A (or the bias control B).

Figure 34:
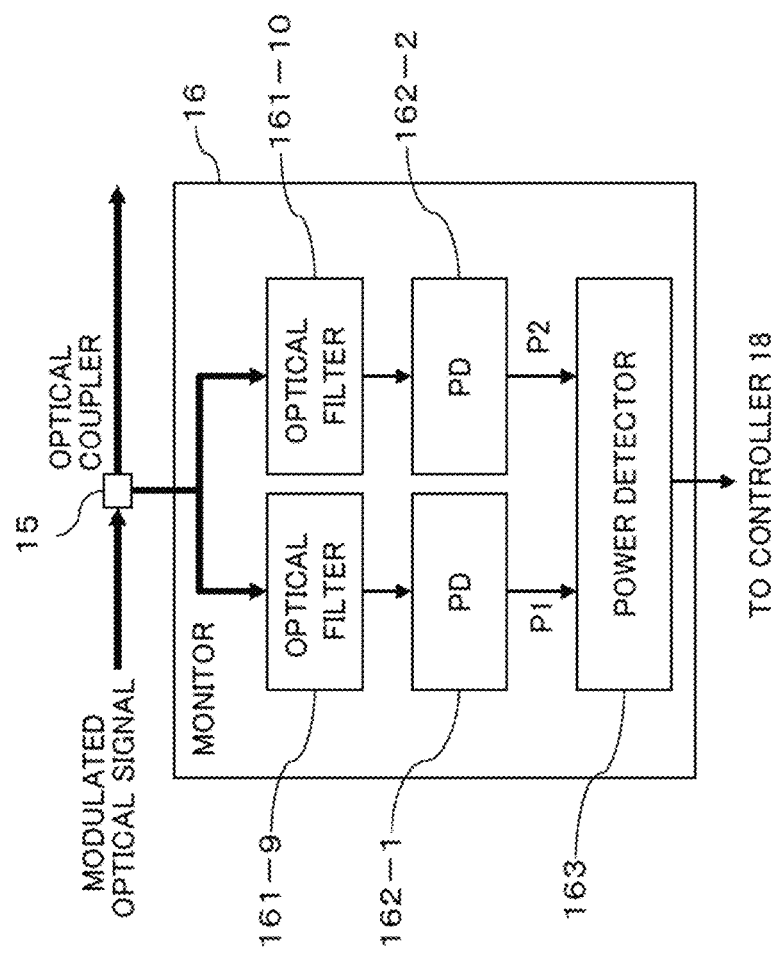
FIG. 34 is a block diagram illustrating an exemplary configuration of a monitor according to the third embodiment.

FIG. 34 illustrates an exemplary configuration of the monitor 16 according to the third embodiment. Similarly to the exemplary configuration of FIG. 10, the monitor 16 may include, for example, two optical filters 161-9 and 161-10, two PDs 162-1 and 162-2, and a power detector 163 as illustrated in FIG. 34.

The pass center frequencies of the optical filters 161-9 and 161-10 may be set to the subcarrier frequencies of the SC signals #1 and #2.

For example, the center frequency of one optical filter 161-9 may be set to fc−X/4 [GHz] corresponding to the subcarrier frequency of the SC signal #1 as schematically illustrated in FIGS. 35A to 35D. The center frequency of the other optical filter 161-10 may be set to fc+X/4 [GHz] corresponding to the subcarrier frequency of the SC signal #2.

Thus, the optical filter 161-9 is an example of a first optical filter that allows light of a frequency component with a center frequency of fc−X/2K (K=2), and the optical filter 161-10 is an example of a second optical filter that allows light of a frequency component with a center frequency of fc+X/2K.

However, since it is enough for the monitor 16 to detect the presence or absence of the SC modulated signal light in the subcarrier frequency of the SC signal used as the drive signal, the center frequencies of the two optical filters 161-9 and 161-10 do not need to be accurately set to fc±X/4 [GHz].

Thus, the center frequencies of the optical filters 161-9 and 161-10 may be set to frequencies near fc±X/4 [GHz] involving a possible setting error. For example, the center frequencies of the optical filters 161-9 and 161-10 may be set and controlled to be a frequency at which the power detection sensitivity of the modulated signal light in the specific frequency according to the frequency shift of the drive signal is as high as possible.

Pass band widths of the optical filters 161-9 and 161-10 may be set to band width at which the presence or absence of the SC modulated signal light can be detected at the center frequencies of the optical filters 161-9 and 161-10.

In other words, the optical filters 161-9 and 161-10 may be enough to have pass band characteristics (filter characteristics) in which the SC modulated signal optical spectrum is partially passed at the subcarrier frequency.

As a non-limiting example, the pass band widths of the optical filters 161-9 and 161-10 may be set to, for example, bands that are narrower than the spectrum width X/2 [GHz] of the SC modulated signal optical spectrum as schematically illustrated in FIGS. 35A to 35D. The pass band widths of the optical filters 161-9 and 161-10 may be the same or different.

Figure 35:
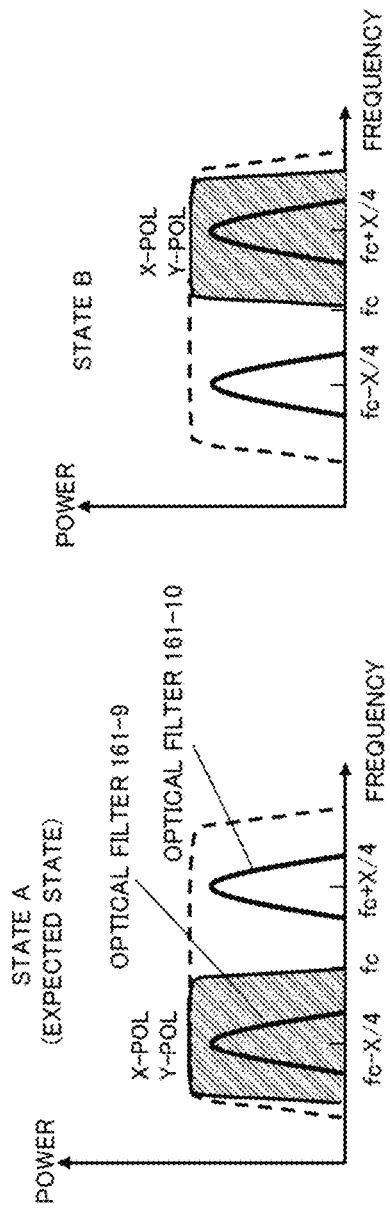
FIGS. 35A to 35D are diagrams illustrating examples of a relation between the four possible states of the modulated signal optical spectrum illustrated in FIGS. 33A to 33D and filter characteristics of two optical filters illustrated in FIG. 34.

When the SC modulated signal optical spectrum is in the "expected state A" of FIG. 33A as illustrated in FIG. 35A, the X polarization component and the Y polarization component of the SC modulated signal light are output from one optical filter 161-9. The SC modulated signal light component is not substantially output from the other optical filter 161-10.

Adversely, when the SC modulated signal optical spectrum is in the "state B" of FIG. 33B as illustrated in FIG. 35B, the SC modulated signal light component is not substantially output from one optical filter 161-9. The X polarization component and the Y polarization component of the SC modulated signal light are output from the other optical filter 161-10.

In other words, in the "expected state A" and the "state B", the SC modulated signal light component is output only from one of the optical filters 161-9 and 161-10.

Meanwhile, when the SC modulated signal optical spectrum is in the "state C" of FIG. 33C as illustrated in FIG. 35C, for example, the X polarization component of the SC modulated signal light is output from one optical filter 161-9, and the Y polarization of the SC modulated signal light component is output from the other optical filter 161-10.

Further, when the SC modulated signal optical spectrum is in the "state D" of FIG. 33D as illustrated in FIG. 35D, for example, the Y polarization of the SC modulated signal light component is output from one optical filter 161-9. The X polarization component of the SC modulated signal light is output from the other optical filter 161-10.

In other words, in the "state C" and the "state D", the SC modulated signal light component is output from both of the optical filters 161-9 and 161-10.

The PD 162-1 receives the light passed through one optical filter 161-9, and outputs the electric signal according to the received optical signal to the power detector 163.

The PD 162-2 receives the light passed through the other optical filter 161-10, and outputs the electric signal according to the received optical signal to the power detector 163.

For example, the power detector 163 detects the power (in other words, amplitudes) of the output electric signals of the PDs 162-1 and 162-2. For example, the detection result of the power detector 163 may indicate the signal optical power at the subcarrier frequency fc±X/4 [GHz] and be provided to the controller 18 (for example, the sign state detector 181). The power detector 163 may be individually provided for each of the PDs 162-1 and 162-2.

The controller 18 is available to detect the sign of the transmission data signal state based on the signal optical power at fc±X/4 [GHz] which is detected by the power detector 163 and to perform the sign control A (or the bias control B) of the transmission data signal based on the detection result.

Figure 36:
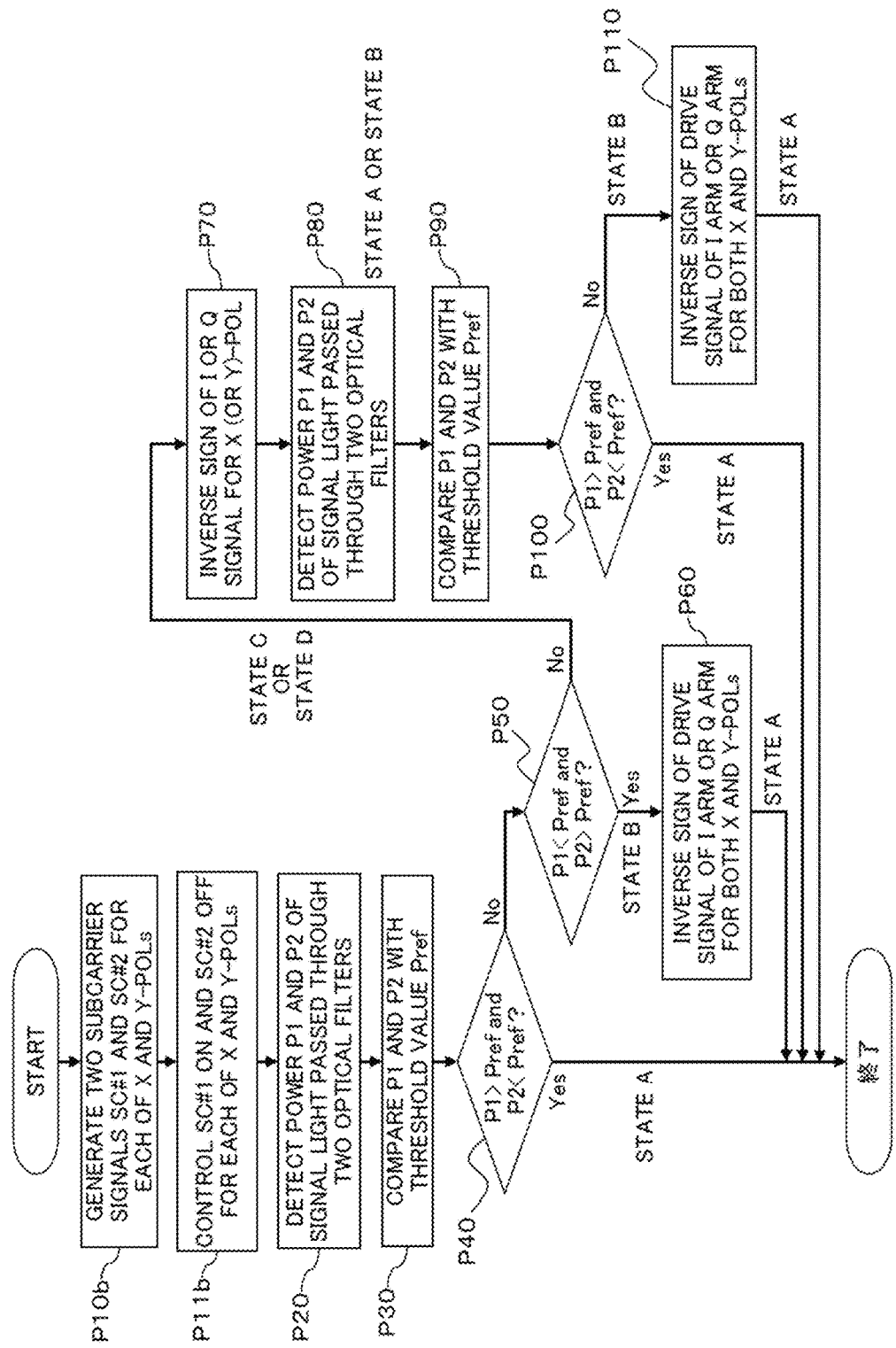
FIG. 36 is a flowchart illustrating an exemplary operation according to the third embodiment.

FIG. 36 is a flowchart illustrating an exemplary operation of the optical transmitter 1 according to the third embodiment. The flowchart illustrated in FIG. 36 differs from the flowchart illustrated in FIG. 12 according to the first embodiment in that process P10 of generating the detection signal through the electric signal generator 11A is replaced with processes P10b and P11b.

In process P10b, the electric signal generator 11A (for example, the DSP 111) generates the two SC signals #1 and #2 for each of the X polarization and the Y polarization.

In process P11b, for each of the X polarization and the Y polarization, the SC signal #1 is ON-controlled and the SC signal #2 is OFF-controlled. For example, the ON and OFF control for the SC signal may be implemented by the digital signal processing performed by the DSP 111 (the same is applied hereinafter).

A subsequent process may be the same as or similar to the process illustrated in FIG. 12. For example, the controller 18 is possible to discriminate the states A to D illustrated in FIGS. 35A to 35D by comparing the power P1 and P2 of the signal light component passed through the optical filter 161-9 and 161-10 with the threshold value Pref. According to a discrimination result, the controller 18 may individually control the signs of the drive signals applied to the XI arm, the XQ arm, the YI arm, and the YQ arm.

Accordingly, in the third embodiment, similarly to the first and second embodiments, it is possible to cause the modulated signal optical spectrum to enter the expected state A.

Adversely, even when the SC signal #1 is OFF-controlled and the SC signal #2 is ON-controlled, the same control can be performed by changing the threshold value determination criteria of process P40, P50, and P100 as described above in the first embodiment.

In the above-described example, K is 2, and the two SC signals#1 and #2 are generated, but the K SC signals may be generated, and an SC signal with a center frequency of either of fc±X/2K among the K SC signals may be used as the detection signal.

Further, when the transmission data signal is the K subcarrier (SC) signals, the detection signal does not need to be generated. In other words, it is enough to drive the polarization multiplexing optical modulator 14A using the transmission data signal instead of the detection signal. This point is the same as in modified examples of the third embodiment to be described below.

First Modified Example of Third Embodiment

In the third embodiment, similarly to the first modified examples of the first embodiment and the second embodiment, the monitor 16 may include, for example, one optical tunable filter 161-11 and one PD 162 as illustrated in FIG. 37. The signal light component power of the two subcarrier frequencies fc±X/4 [GHz] can be time-divisionally detected by controlling the center frequency of the optical tunable filter 161-11.

Thus, the center frequency of the optical tunable filter 161-11 may be set and controlled to be either of fc±X/4. The setting and control of the center frequency of the optical tunable filter 161-11 may be performed through, for example, the optical filter controller 185 of the controller 18 illustrated in FIG. 7.

Since it is enough for the monitor 16 to detect the presence or absence of the SC modulated signal light in the subcarrier frequency of the SC signal used as the drive signal, the center frequency of the optical tunable filter 161-11 does not need to be accurately set and controlled to fc±X/4.

Thus, the center frequency of the optical tunable filter 161-11 may be set to a frequency near either of fc±X/4 [GHz] involving a possible setting error. For example, the center frequency of the optical filter 161-11 may be set and controlled to be a frequency at which the power detection sensitivity of the modulated signal light in the specific frequency according to the frequency shift of the drive signal is as high as possible.

A pass band width of the optical tunable filter 161-11 may be set to a band width at which the presence or absence of signal light according to the frequency shift can be detected at the set center frequency.

As a non-limiting example, the pass band width of the optical tunable filter 161-11 may be set to a band that is narrower than the spectrum width X/2 [GHz] of the SC modulated signal optical spectrum as schematically illustrated in FIGS. 38A to 38D.

FIGS. 38A to 38D correspond to FIGS. 33A to 33D. For example, FIGS. 38A to 38D illustrate the states A to D of the SC modulated signal optical spectrum when the SC signal with the subcarrier frequency of fc−X/4 [GHz] is used as the drive signal of the polarization multiplexing optical modulator 14A.

Figure 38A:
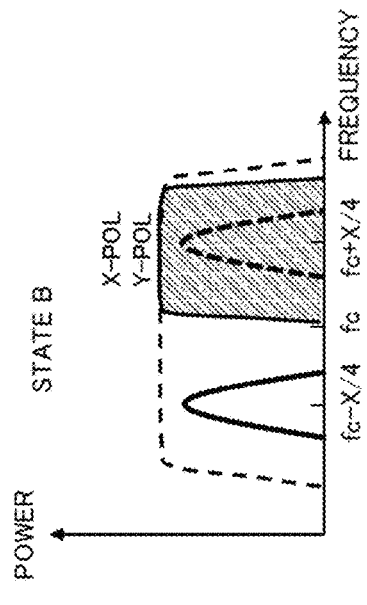
FIGS. 38A to 38D are diagrams illustrating examples of a relation between the four possible states of the modulated signal optical spectrum illustrated in FIGS. 33A to 33D and filter characteristics of an optical tunable filter illustrated in FIG. 37.

When the SC modulated signal optical spectrum is in the "expected state A" of FIG. 33A, and the center frequency of the optical tunable filter 161-11 is set to fc−X/4 as illustrated in FIG. 38A, the X polarization component and the Y polarization component of the SC modulated signal light are output. When the center frequency of the optical tunable filter 161-11 is set to fc+X/4 as indicated by a dotted line in FIG. 38A, the SC modulated signal light component is not substantially output.

Figure 38B:
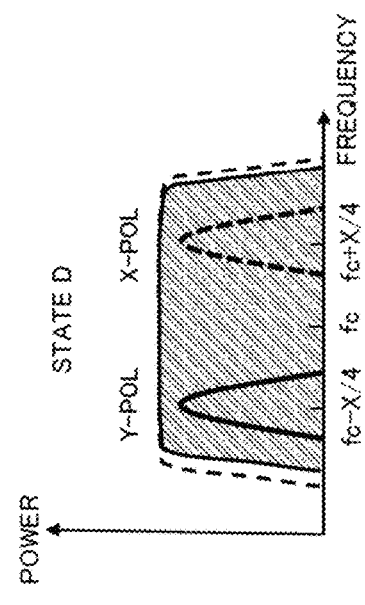

Adversely, when the SC modulated signal optical spectrum is in the "state B" of FIG. 33B, and the center frequency of the optical tunable filter 161-11 is set to fc+X/4 as illustrated in FIG. 38B, the X polarization component and the Y polarization component of the SC modulated signal light are output. When the center frequency of the optical tunable filter 161-11 is set to fc−X/4, the signal light component is not substantially output.

Figure 38C:
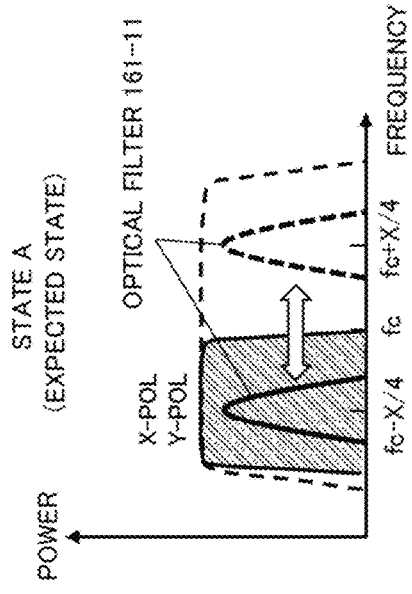

Meanwhile, when the SC modulated signal optical spectrum is the "state C" of FIG. 33C, and the center frequency of the optical tunable filter 161-11 is set to either of fc±X/4 as illustrated in FIG. 38C, the SC modulated signal light component is output. For example, when the center frequency of the optical tunable filter 161-11 is set to fc−X/4, the X polarization component of the SC modulated signal light is output. When the center frequency of the optical tunable filter 161-11 is set to fc+X/4, the Y polarization of the SC modulated signal light component is output.

Figure 38D:
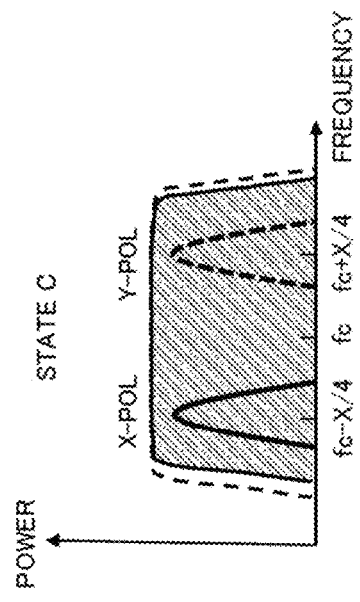

Further, when the SC modulated signal optical spectrum is in the "state D" of FIG. 33D, and the center frequency of the optical tunable filter 161-11 is set to fc−X/4 as illustrated in FIG. 38D, the Y polarization of the SC modulated signal light component is output. When the center frequency of the optical tunable filter 161-11 is set to fc+X/4, the X polarization component of the SC modulated signal light is output.

For example, the PD 162 sets the center frequency of the optical tunable filter 161-11 to either of fc±X/4, receives the light passed through the optical tunable filter 161-11, and outputs the electric signal according to the received optical signal to the power detector 163.

The power detector 163 detects, for example, the power (in other words, the amplitude) of the output electric signal of the PD 162. The power detector 163 according to a first modified example of the third embodiment is possible to detect the power of the light passed through the optical tunable filter 161-11 when the center frequency of the optical tunable filter 161-11 is set to allow light of a frequency component with a center frequency of fc±X/2K (K=2) to pass through.

The detection result of the power detector 163 when the center frequency of the optical tunable filter 161-11 is set and controlled to be either of fc±X/4 may be provided to the controller 18 (for example, the sign state detector 181).

FIG. 39 is a flowchart illustrating an exemplary operation of the optical transmitter 1 according to the first modified example of the third embodiment. The flowchart illustrated in FIG. 39 differs from the flowchart illustrated in FIG. 36 according to the third embodiment in that process P10a illustrated in FIG. 27 according to the first modified example of the second embodiment is replaced with processes P10b and P11b illustrated in FIG. 36.

In process P10b, the electric signal generator 11A (for example, the DSP 111) generates the two SC signals#1 and #2 for the X polarization and the Y polarization.

In process P11b, for each of the X polarization and the Y polarization, the SC signal #1 is ON-controlled and the SC signal #2 is OFF-controlled.

A subsequent process may be the same as or similar to the process illustrated in FIG. 27. For example, the controller 18 compares the power P1 and P2 of the signal light component passed through the optical tunable filter 161-11 when the center frequency of the optical tunable filter 161-11 is set and controlled to be fc±X/4 with the threshold value Pref. Accordingly, the states A to D illustrated in FIGS. 38A to 38D can be discriminated. According to a discrimination result, the controller 18 may individually control the signs of the drive signals applied to the XI arm, the XQ arm, the YI arm, and the YQ arm.

Thus, in the first modified example of the third embodiment, similarly to the third embodiment, it is possible to cause the modulated signal optical spectrum to enter the expected state A, and the same effects as in the third embodiment can be obtained.

In the first modified example of the third embodiment, similarly to the relation between the first embodiment and the first modified example of the first embodiment, the configuration of the monitor 16 can be further improved than in the third embodiment as can be easily understood from a comparison of FIG. 34 and FIG. 37. Thus, it is possible to reduce the size and the cost of the optical transmitter 1 equipped with the monitor 16.

Similarly to the third embodiment, even when the frequency shift is +X/4 [GHz] in the positive direction, similarly to the second embodiment, the same control can be performed by changing the threshold value determination criteria of processes P40, P50, and P100 of FIG. 27 as described above in the first embodiment.

Adversely, even when the SC signal #1 is OFF-controlled and the SC signal #2 is ON-controlled, the same control can be performed by changing the threshold value determination criteria of process P40, P50, and P100 as described above in the first embodiment.

Second Modified Example of Third Embodiment

In the third embodiment, similarly to the first modified example of the first embodiment, it is possible to cause the modulated signal optical spectrum to enter the "expected state A" through the detection of the maximum value of the power P1 to P4 of the four sign combinations of the drive signal of each of XI, XQ, YI, and YQ arms.

FIG. 40 is a block diagram illustrating an exemplary configuration of a monitor according to a second modified example of the third embodiment. The monitor 16 may include, for example, an optical filter 161-12, a PD 162, and a power detector 163 as illustrated in FIG. 40. In the second modified example of the third embodiment, the exemplary configuration of the optical transmitter 1 other than the monitor 16 may be the same or similar to the configuration illustrated in FIGS. 6 and 7.

The center frequency of the optical filter 161-12 may be fixed or variable. For example, the center frequency of the optical filter 161-12 may be set to either of fc±X/4. Thus, the optical filter 161-12 is possible to allow light of the frequency component with a center frequency of either of fc±X/2K (K=2) to pass through.

However, since it is enough for the monitor 16 to be able to detect the presence or absence of the SC modulated signal light in the subcarrier frequency of the SC signal used as the drive signal, the center frequency of the optical filter 161-12 does not need to be accurately set to fc−X/4 or fc+X/4.

Thus, the center frequency of the optical filter 161-12 may be set to a frequency near fc−X/4 or fc+X/4 involving a possible setting error. For example, the center frequency of the optical filter 161-12 may be set and controlled to be a frequency at which the power detection sensitivity of the modulated signal light in the specific frequency according to the frequency shift of the drive signal is as high as possible.

A pass band width of the optical filter 161-12 may be set to band width at which the presence or absence of the SC modulated signal light can be detected at the center frequencies of the optical filter 161-12. As a non-limiting example, the pass band width of the optical filter 161-12 may be set to a band that is narrower than the spectrum width X/2 [GHz] of the SC modulated signal optical spectrum as schematically illustrated in FIGS. 41A to 41D.

FIGS. 41A to 41D illustrate the states A to D of the modulated signal optical spectrum when the SC signal with the subcarrier frequency of fc−X/4 [GHz] is used as the drive signal of the polarization multiplexing optical modulator 14A. In other words, FIGS. 41A to 41D correspond to FIGS. 35A to 35D of the third embodiment or FIGS. 38A to 38D of the first modified example of the third embodiment.

Figure 41A:
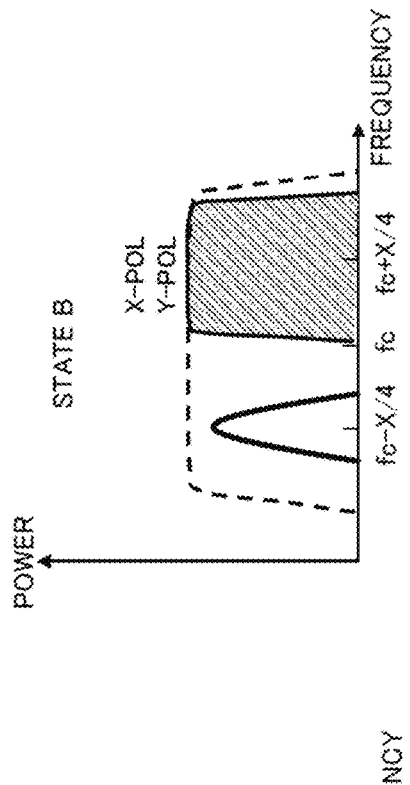
FIGS. 41A to 41D are diagrams illustrating an example of a relation between the four possible states of the modulated signal optical spectrum illustrated in FIGS. 33A to 33D and filter characteristics of an optical filter illustrated in FIG. 40.

When the SC modulated signal optical spectrum is in the "expected state A" of FIG. 33A as illustrated in FIG. 41A, the signal light components of both of the X polarization and the Y polarization are output from the optical filter 161-12.

Figure 41C:
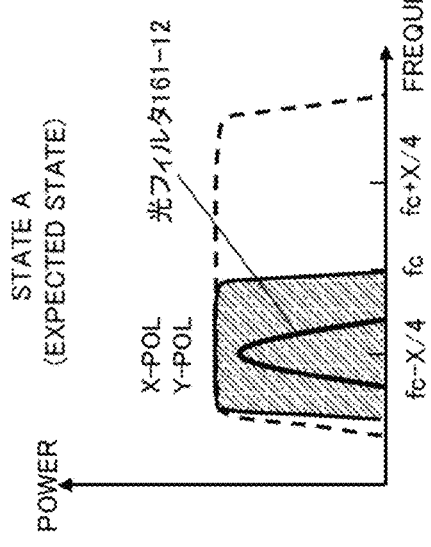
Figure 41B:
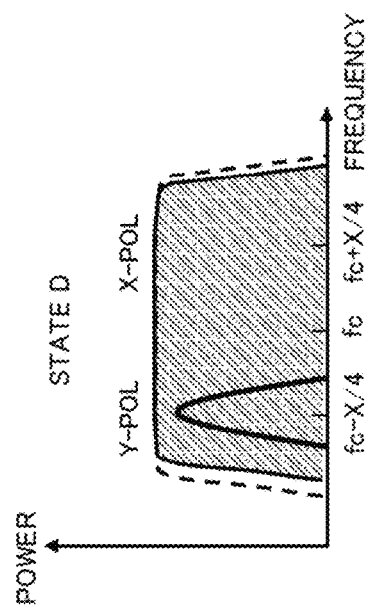

Meanwhile, when the SC modulated signal optical spectrum is in the "state B" of FIG. 33B as illustrated in FIG. 41B, the signal light component is not substantially output from the optical filter 161-12.

Further, when the SC modulated signal optical spectrum is in the "state C" of FIG. 33C as illustrated in FIG. 41C, the output of the optical filter 161-12 is dominated by the signal light component of one X polarization, and the output optical power decreases to be lower than in the state A.

Figure 41D:
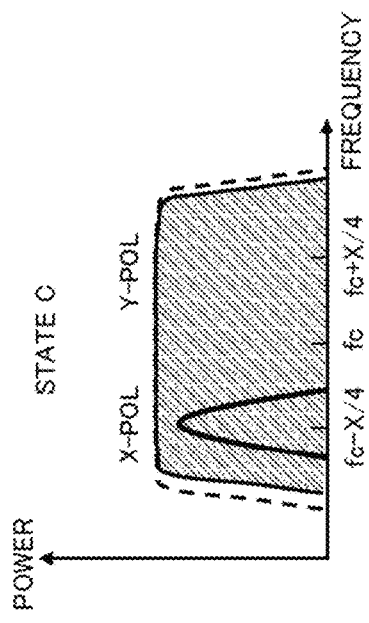

Further, when the SC modulated signal optical spectrum is in the "state D" of FIG. 33D as illustrated in FIG. 41D, the output of the optical filter 161-12 is dominated by the signal light component of the other Y polarization, and the output optical power decreases to be lower than in the state A.

The PD 162 receives, for example, the light passed through the optical filter 161-12, and outputs the electric signal according to the received optical signal to the power detector 163.

The power detector 163 detects, for example, the power (in other words, the amplitude) of the output electric signal of the PD 162. The detection result of the power detector 163 may be provided to the controller 18 (for example, the sign state detector 181).

Here, the four possible states A to D illustrated in FIGS. 41A to 41D correspond to four combinations of the signs of the drive signals applied to the XI arm, the XQ arm, the YI arm, and the YQ arm of the polarization multiplexing optical modulator 14A.

A state in which the power of the SC modulated signal light component that is passed through the optical filter 161-12 and detected through the power detector 163 among the four possible states A to D becomes maximum is the "expected state A."

Thus, the controller 18 is enough to control the signs of the drive signals of the XI arm, the XQ arm, the YI arm, and the YQ arm in a sign combination in which the power of the SC modulated signal light component detected through the power detector 163 is maximum.

FIG. 42 is a flowchart illustrating an exemplary operation of the optical transmitter 1 according to the second modified example of the third embodiment. The flowchart illustrated in FIG. 42 differs from the flowchart illustrated in FIG. 18 according to the second modified example of the first embodiment in that processes P210 and P220 illustrated in FIG. 18 are replaced with processes P211, P212 and P220a illustrated in FIG. 42.

Processes P211 and P212 correspond to processes P10b and P11b illustrated in FIG. 36. For example, in process P211, the electric signal generator 11A (for example, the DSP 111) generates the two SC signals#1 and #2 for each of the X polarization and the Y polarization.

In process P212, for each of the X polarization and the Y polarization, the SC signal #1 is ON-controlled and the SC signal #2 is OFF-controlled.

Meanwhile, process P220a corresponds to process P220a illustrated in FIG. 30. In process P220a, for example, the center frequency of the optical filter 161-12 is set to fc−X/4.

A subsequent process may be the same as or similar to processes P230, P240, and P250 of FIG. 18.

For example, the controller 18 may detect the maximum value of the power information P1 to P4 for the four sign combinations through the sign state detector 181, and perform control such that the drive signal of each arm is set to the sign combination corresponding to the maximum value through, for example, the sign controller 182.

Accordingly, it is possible to cause the SC modulated signal optical spectrum of the optical transmitter 1 to enter the "expected state A", similarly to the third embodiment and the first modified example of the third embodiment.

According to the second modified example of the third embodiment, since the monitor 16 can be configured with the single optical filter 161-12, the single PD 162, and the single power detector 163, the configuration of the monitor 16 can be more simplified than in the first embodiment.

Since the controller 18 does not need to control the center frequency of the optical filter 161-12, compared to the first modified example of the third embodiment using the optical tunable filter 161-11, the control can be more simplified, and the detection speed by the monitor 16 can be improved.

Third Modified Example of Third Embodiment

In the second modified example of the third embodiment, the maximum value of the power P1 to P4 is detected, but similarly to the third modified example of the first embodiment, even when the minimum value of the power P1 to P4 is detected, it is possible to cause the SC modulated signal optical spectrum of the optical transmitter 1 to enter the "expected state A." An exemplary configuration of the monitor 16 according to the third modified example of the third embodiment may be the same as or similar to the configuration of FIG. 40.

Figure 43:
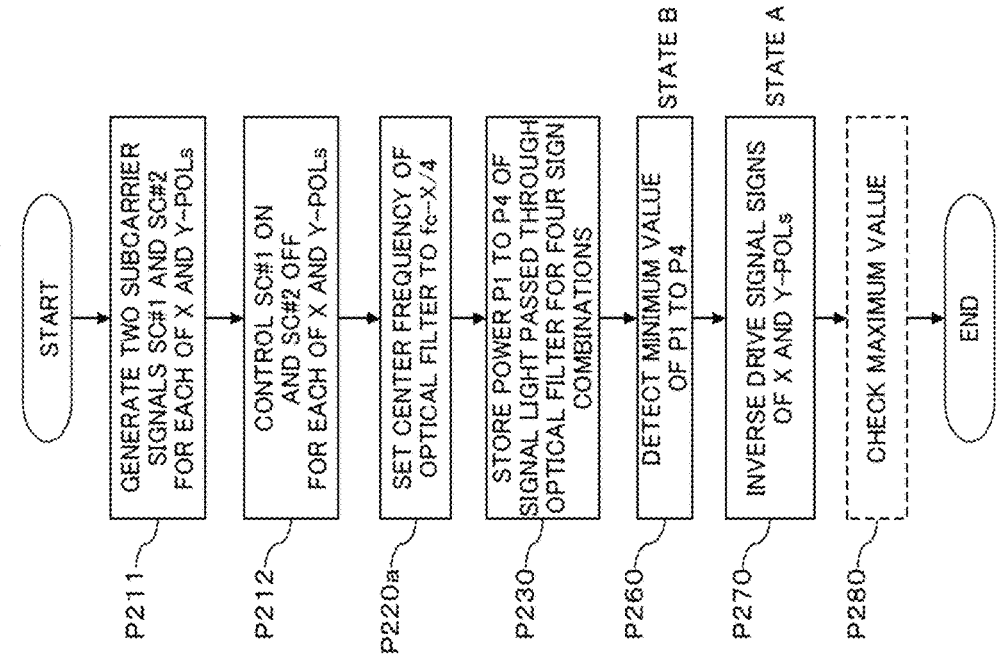
FIG. 43 is a flowchart illustrating an exemplary operation a third modified example of the third embodiment.

An exemplary operation according to the third modified example of the third embodiment is illustrated in a flowchart of FIG. 43. In FIG. 43, processes P211, P212, and P220a may be the same as those in FIG. 42. Further, processes P260 and P270 in FIG. 43 may be the same as or similar to processes P260 and P270 of FIG. 19.

In the third modified example of the third embodiment, the state B of FIG. 41B in which the signal light component power passed through the optical filter 161-12 becomes minimum is detected. Thus, the detection sensitivity is expected to be improved to be higher than in the second modified example of the third embodiment in which the power comparison is performed among the states A, C, and D in which there is the SC modulated signal light component passed through the optical filter 161-12.

In FIG. 43, similarly to FIG. 19, the controller 18 may perform process P280 as an option after process P270. In process P280, the controller 18 (for example, the sign state detector 181) may check the power detected through the power detector 163 corresponds to the maximum value of the power information P1 to P4 stored in process P230, in other words, the state A (process P280).

In both of the flowcharts of FIGS. 42 and 43, the SC signal #1 is ON-controlled and the SC signal #2 is OFF-controlled, but conversely, the SC signal #1 may be OFF-controlled and the SC signal #2 may be ON-controlled. In this case, in process P220a, the center frequency of the optical filter 161-12 may be set to fc+X/4.

When OFF control is performed on the SC signal #1, and ON control is performed on the SC signal #2, the "expected state" is the state B of FIG. 41B. Thus, the detection of the maximum value of the power P1 to P4 (process P240) in FIG. 42 corresponds to detection of the state B, and the detection of the minimum value of the power P1 to P4 (process P260) of FIG. 43 corresponds to detection of the state A.

In the third embodiment, the number of SC signals is K=2, but when K≥#B, and K is an even number, for example, some or all of the SC signals positioned at one of a low frequency side and a high frequency side of the carrier frequency fc are enough to be ON-controlled. Further, some or all of the SC signals positioned at the other of the low frequency side and the high frequency side of the carrier frequency fc are enough to be OFF-controlled.

When the number of SC signals is K≥#B, K is an odd number, for example, some or all of the SC signals that are positioned at one of a low frequency side and a high frequency side and that includes the SC signal with the center frequency of the carrier frequency fc are enough to be ON-controlled. Further, all of the SC signals positioned at the other of the low frequency side and the high frequency side are enough to be OFF-controlled.

Fourth Embodiment

In the first to third embodiments and the modified examples thereof, the sign control A by the controller 18 (for example, the sign controller 182) has been described. In other words, the example in which a target of the control by the controller 18 is the sign of the drive signal applied to each of the XQ, XI, YI, and YQ arms of the polarization multiplexing optical modulator 14A.

Meanwhile, the fourth embodiment, the bias control B by the controller 18 (for example, the bias control point setting unit 183) will be described. As a non-limiting example, an example in which a target of the control by the controller 18 is the bias voltage applied to each of the XQ, XI, YI, and YQ arms of the polarization multiplexing optical modulator 14A will be described.

In the fourth embodiment, the exemplary configuration of the optical transmitter 1 other than the monitor 16 may be the same or similar to the configuration illustrated in FIGS. 6 and 7. An exemplary configuration of the monitor 16 may be the same as or similar to the exemplary configurations described in the first to third embodiments and the modified examples thereof.

Figure 44:
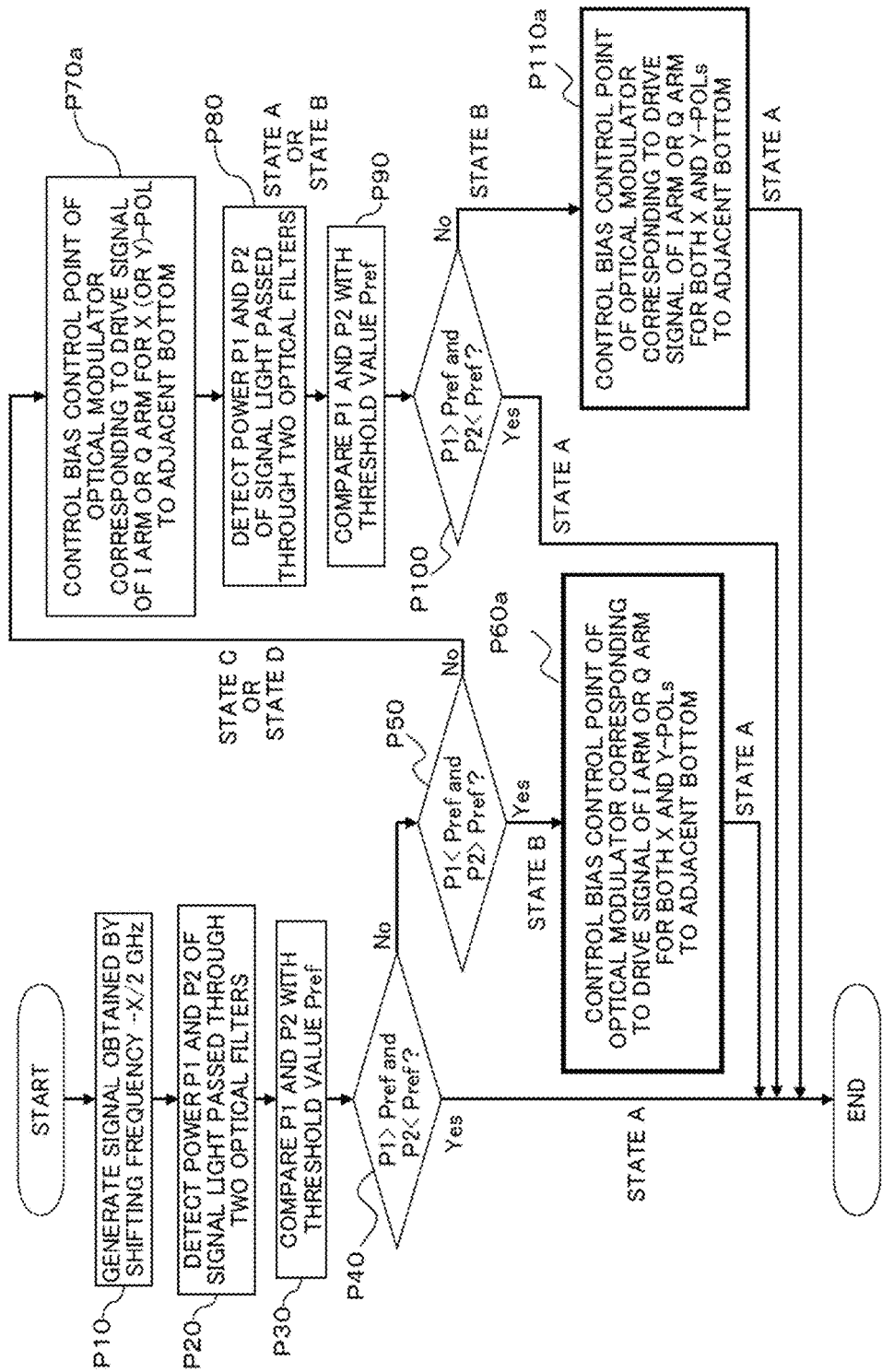
FIG. 44 is a flowchart illustrating an exemplary operation according to a fourth embodiment.

For example, an exemplary operation of performing the bias control B through the controller 18, for example, the bias control point setting unit 183 in the exemplary configuration of the monitor 16 illustrated in FIG. 10 according to the first embodiment is illustrated in a flowchart of FIG. 44.

A flowchart illustrated in FIG. 44 differs from the flowchart illustrated in FIG. 12 in that processes P60, P70, and P110 are replaced with processes P60a, P70a, and P110a.

Both processes P60 and P110 of FIG. 12 is the process of converting the "state B" of FIG. 11B into the "expected state A" of FIG. 11A by inversely controlling the sign of the Q arm (or I arm) drive signal for both of the X polarization and the Y polarization.

Meanwhile, in processes P60a and P110a of FIG. 44, control is performed such that the current bias control point corresponding to the Q arm (or the I arm) for both of the X polarization and the Y polarization is changed to a bias control point corresponding to an adjacent "bottom" of a periodic extinction curve illustrated in FIG. 2.

For example, the controller 18 may perform control such that the bias control point A of FIG. 2 is changed to the adjacent bias control point B, perform control such that the bias control point B is changed to the adjacent bias control point A or C, and perform control such that the bias control point C is changed to the adjacent bias control point B.

Even in any of the above cases, since the output light phase of the polarization multiplexing optical modulator 14A is shifted by π by performing control such that the bias control point is changed to the adjacent bias control point, equivalent control to the inversion control of the sign of the drive signal in the sign control A can be performed.

Thus, in processes P60a and P110a, the state B "(XI, −XQ), (YI,−YQ)" or the state B "(−XI, XQ), (−YI, YQ)" can be converted into the expected state A "(XI, XQ), (YI, YQ)."

The same applies to process P70a of FIG. 44. For example, process P70 of FIG. 12 is the process of converting the state C into the state B and converting the state D into the state A by inversely controlling the sign of one of the drive signals of the I arm and the Q arm for one of the X polarization and the Y polarization.

Meanwhile, in process P70a of FIG. 44, control is performed such that the current bias control point corresponding to one of the I arm and the Q arm for one of the X polarization and the Y polarization is changed to the bias control point corresponding to the adjacent "bottom" of the periodic extinction curve illustrated in FIG. 2.

Accordingly, in process P70a, for example, the state C "(XI, XQ), (YI, −YQ)" or the state C "(XI, XQ), (−YI, YQ)" can be converted into the state B "(XI, −XQ), (YI, −YQ)" or the state B "(−XI, XQ), (−YI, YQ)."

In process P70a, for example, the state D "(XI, −XQ), (YI, YQ)" or the state D "(−XI, XQ), (YI, YQ)" can be converted into the state A "(XI, XQ), (YI, YQ)."

Thus, the modulated signal optical spectrum can be controlled to enter the expected state A through the bias control B by the controller 18, similarly to the sign control A.

The bias control B can be applied to all of the second and third modified examples of the first embodiment, the first to third modified examples of the second embodiment, and the first to third modified examples of the third embodiment. For example, in the flowcharts of FIGS. 15, 24, 27, 36 and 39, processes P60, P70, and P110 may be replaced with processes P60a, P70a, and P110a.

It is possible to performs control such that the modulated signal optical spectrum of the optical transmitter 1 enters the "expected state A" by setting and controlling the bias control point of individual arms to correspond to the detected sign combination in process P250 of FIGS. 18, 30 and 42.

In the flowcharts of FIGS. 19, 31 and 43, process P270 may be replaced with process P60a (or P110a). Accordingly, for example, the state B "(XI, −XQ), (YI, −YQ)" or the state B "(−XI, XQ), (−YI, YQ)" corresponding to the minimum value of the power P1 to P4 can be converted into the expected state A "(XI, XQ), (YI, YQ)."

In the bias control B, the four arms of the XI arm, the XQ arm, the YI arm, and the YQ arm of the polarization multiplexing optical modulator 14A are the target of the bias control. However, the phase shifters 144X and 144Y may be the target of the bias control B alternatively or additionally.

For example, the controller 18 may individually control the bias voltage of either or both of the phase shifters 144X and 144Y and control the phase shift amount of light propagated between the I arm and the Q arm. For example, by changing the phase shift amount by "π", the state B can be converted into the state A, and the state C or the state D can be converted into the state A or the state B.

Fifth Embodiment

In the first to fourth embodiments and the first to third modified examples thereof, the example of applying the sign control A or the bias control B to the optical transmitter 1 (see FIG. 6) to which the polarization multiplexing modulation scheme is applied has been described. However, the sign control A or the bias control B can be applied to an optical transmitter of a modulation scheme that does not employ, for example, the polarization multiplexing illustrated in FIG. 3.

Figure 45:
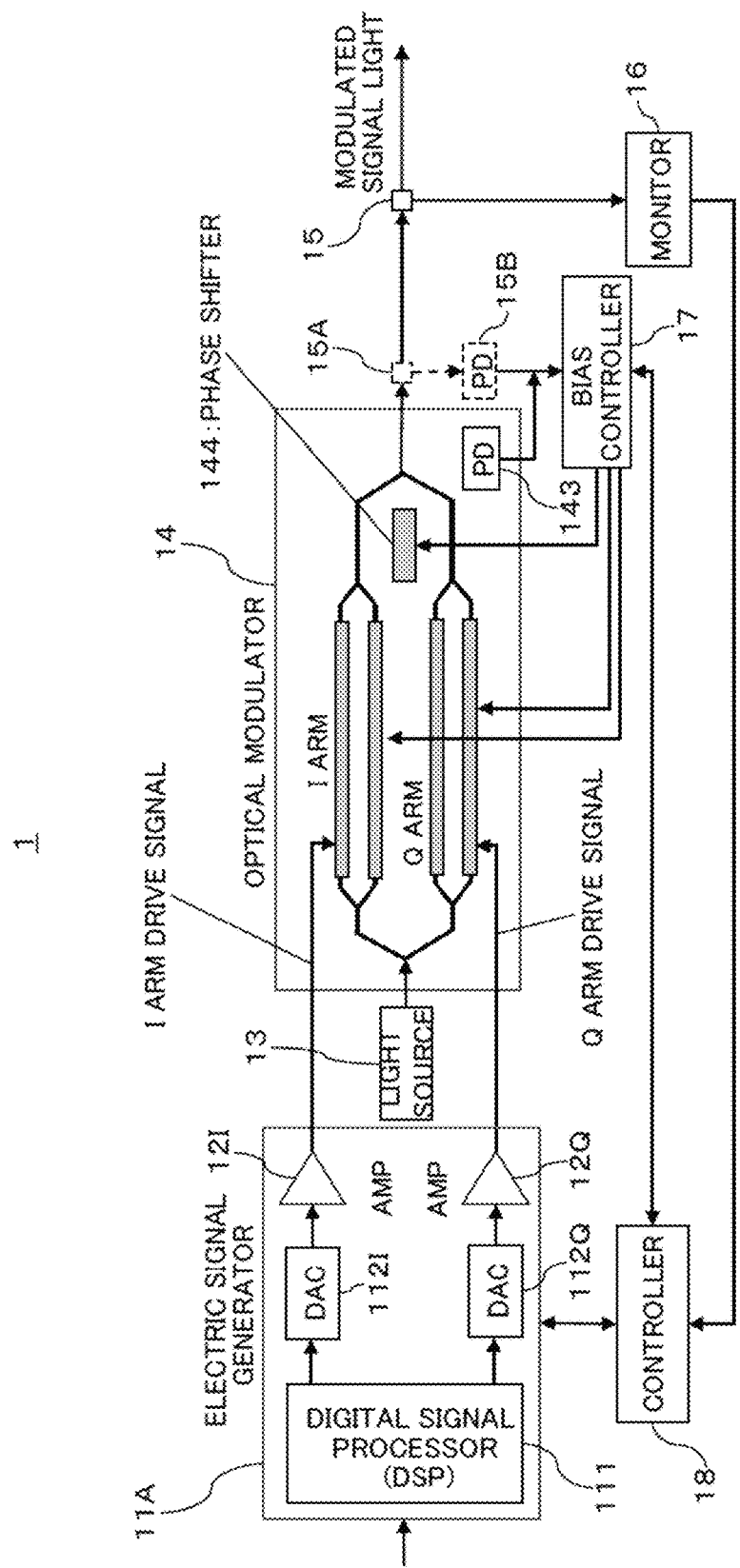
FIG. 45 is a block diagram illustrating an exemplary configuration of an optical transmitter according to a fifth embodiment.

FIG. 45 is a block diagram illustrating an exemplary configuration of an optical transmitter according to a fifth embodiment, and illustrates an exemplary configuration in which the monitor 16 and the controller 18 are applied to the optical transmitter 1 including the electric signal generator 11A and the optical modulator 14 illustrated in FIG. 3. An exemplary configuration of the controller 18 may be the same as or similar to the exemplary configuration illustrated in FIG. 7.

In the configuration illustrated in FIG. 45, similarly to the relation illustrated in FIGS. 8A and 8B in the first embodiment, the optical modulator 14 is considered to be driven using a signal that is shifted from the carrier frequency fc by −X/2 [GHz] in the frequency domain as the drive signal.

Figure 46A:
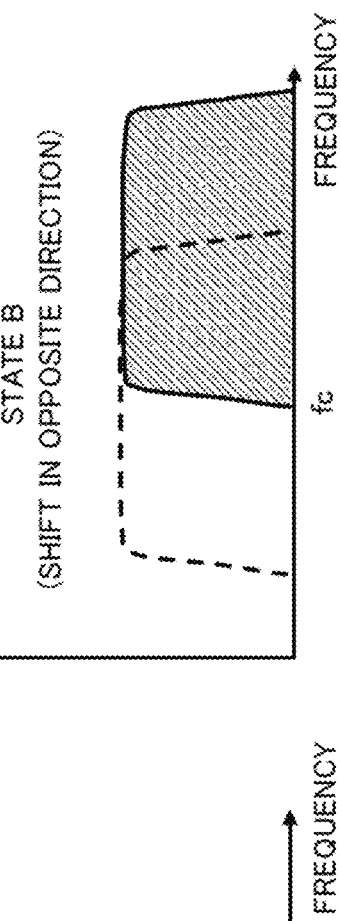
FIGS. 46A and 46B are diagrams illustrating two possible states of the modulated signal optical spectrum illustrated in FIG. 8B according to a relation between a bias control point and an output light phase variation of an optical modulator.

In this case, for example, as illustrated in FIG. 46A, the modulated signal optical spectrum is shifted from the carrier frequency fc by −X/2 [GHz] in the frequency direction in the frequency domain. The state corresponds to the "expected state A."

Figure 46B:
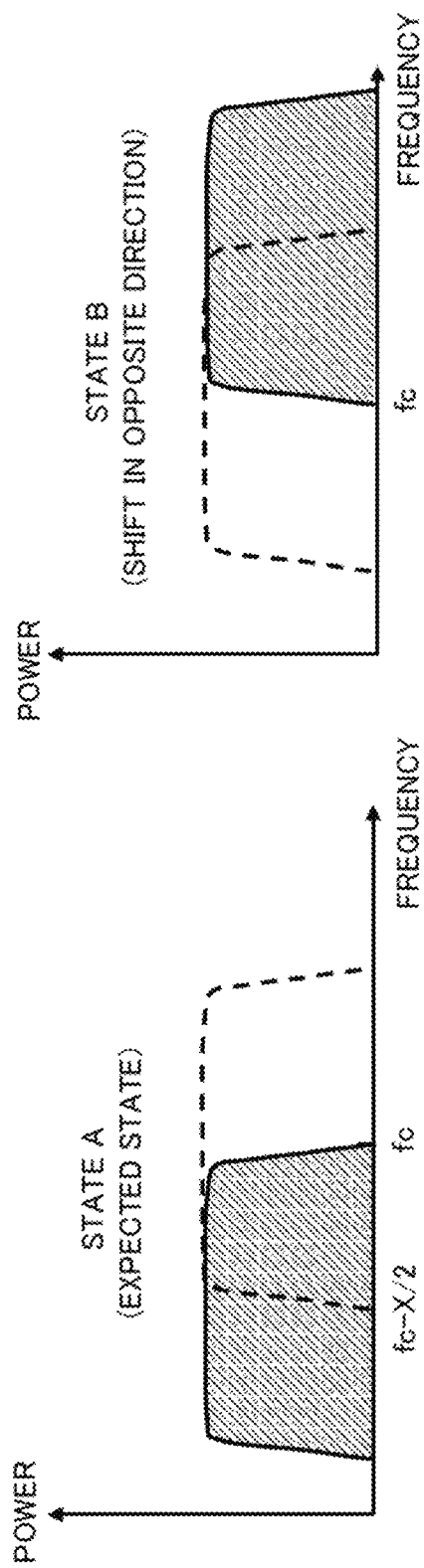

However, the modulated signal optical spectrum output from the optical modulator 14 may involve the state in which the frequency shift of +X/2 [GHz] from the carrier frequency fc in an opposite direction is performed as illustrated in FIG. 46B according to the relation between the sign of the drive signal of the optical modulator 14 and the bias control point.

Thus, for example, the controller 18 according to the fifth embodiment may detect the two possible states illustrated in FIGS. 46A and 46B based on the output optical power of the optical modulator 14 monitored through the monitor 16.

When the detected state is the state B different from the "expected state A", the controller 18 may perform the sign control A (or the bias control B) such that the modulated signal optical spectrum enters the expected "state A" of FIG. 46A.

In the controller 18, an exemplary configuration of the monitor 16 available to detect the two possible states illustrated in FIGS. 46A and 46B may be the same as or similar to the exemplary configuration illustrated in FIG. 10. For example, the monitor 16 may include two optical filters 161-1 and 161-2, two PDs 162-1 and 162-2, and a power detector 163.

The optical filters 161-1 and 161-2 may have filter characteristics in which the modulated signal optical spectrum according to the frequency shift is partially passed, and the filter characteristics of the optical filters 161-1 and 161-2 may be the same as or similar to, for example, the filter characteristics illustrated in FIGS. 11A to 11D.

FIG. 47A schematically illustrates a relation between the modulated signal optical spectrum in the state A of FIG. 46A and the filter characteristics of the optical filters 161-1 and 161-2. FIG. 47B schematically illustrates a relation with the filter characteristics of the optical filters 161-1 and 161-2 in the state B of FIG. 46B.

When the modulated signal optical spectrum is in the "expected state A" of FIG. 46A as illustrated in FIG. 47A, the signal light component is output from one optical filter 161-1. The signal light component is not substantially output from the other optical filter 161-2.

Adversely, when the modulated signal optical spectrum is in the "state B" of FIG. 46B as illustrated in FIG. 47B, the signal light component is not substantially output from one optical filter 161-1, and the signal light component is output from the other optical filter 161-2.

In other words, in the "expected state A" and the "state B", the signal light component is output only from one of the optical filters 161-1 and 161-2.

The controller 18 is available to detect the sign of the transmission data signal state based on the signal optical power at fc±X/2 [GHz] which is detected through the power detector 163 and to perform the sign control A (or the bias control B) of the transmission data signal based on the detection result.

Figure 48:
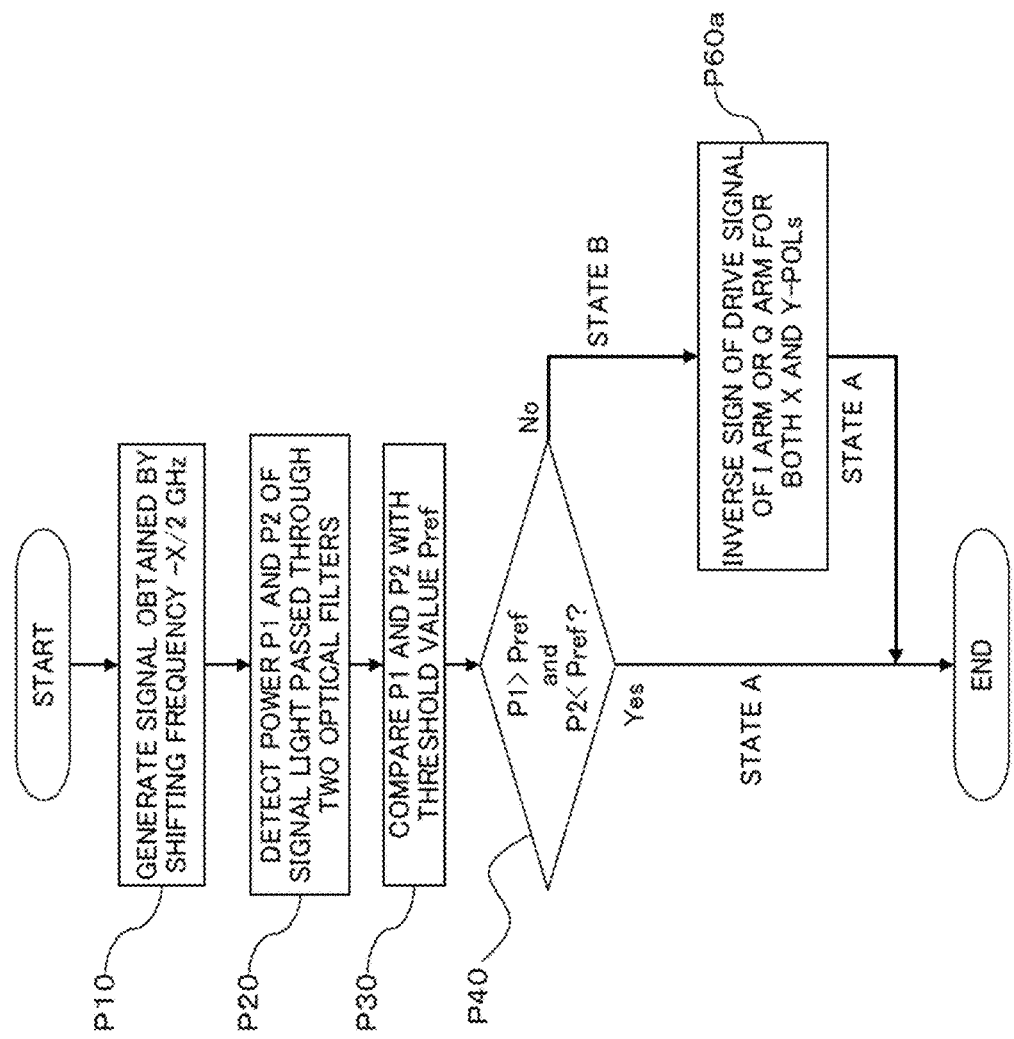
FIG. 48 is a flowchart illustrating an exemplary operation according to the fifth embodiment.

FIG. 48 is a flowchart illustrating an exemplary operation of the optical transmitter 1 illustrated in FIG. 45 according to the fifth embodiment. The flowchart of FIG. 48 corresponds to the flowchart illustrated in FIG. 12.

However, in the fifth embodiment, since it is enough to discriminate the two possible states A and B, the threshold value comparison process P50 to discriminate the state B and the state C (or the state D) in the flowchart illustrated in FIG. 12 may be unnecessary in FIG. 48.

For this reason, processes P70 to P110 for converting the state C or the state D into the state A or the state B in FIG. 12 may be unnecessary in FIG. 48 as well.

In FIG. 48, processes P10 to P40 may be the same as or similar to processes P10 to P40 described above with reference to FIG. 12. When a result of comparing with the threshold value is P1>Pref and P2<Pref in process P40 (Yes), the modulated signal optical spectrum is in the "expected state A" illustrated in FIG. 47A.

In the "expected state A", the controller 18 does not need to perform the sign control A by the sign controller 182 on the electric signal generator 11A and may end the process.

Meanwhile, when a result of comparing with the threshold value is P1<Pref and P2>Pref (NO in process P40), the modulated signal optical spectrum is in the "state B" illustrated in FIG. 47B.

Here, when the same notation as in the first embodiment is used, the state A can be indicated by the state A "(I, Q)", and the state B can be indicated by the state B "(I, −Q)" or the state B "(−I, Q)" for descriptive purposes. "I" of (I, Q) indicates the drive signal applied to the I arm of the optical modulator 14, and "Q" of (I, Q) indicates the drive signal applied to the Q arm of the optical modulator 14.

Thus, the controller 18 is available to convert the state B into the state A "(I,Q)" by inversely controlling the sign of the drive signal of the Q arm (or the I arm) through, for example, the sign controller 182 (process P60*a*).

Since the converted "state A" is the "expected state" illustrated in FIG. 47A, the controller 18 may end the process.

As described above, according to the fifth embodiment, in the optical transmitter 1 of the non-polarization multiplexing scheme, similarly to the first embodiment, it is possible to appropriately set and control the relation between the sign of the drive signal of the optical modulator 14 and the bias control point of the optical modulator 14.

First Modified Example of Fifth Embodiment

Similarly to the first modified example of the first embodiment, in the fifth embodiment, the configuration illustrated in FIG. 13 may be applied to the monitor 16. In other words, the signal optical power at fc±X/2 [GHz] may be detected using one optical tunable filter 161-3, the PD 162, and the power detector 163.

The filter characteristics of the optical tunable filter 161-3 may be the same as or similar to the filter characteristics described above with reference to FIGS. 14A to 14D.

Figure 49:
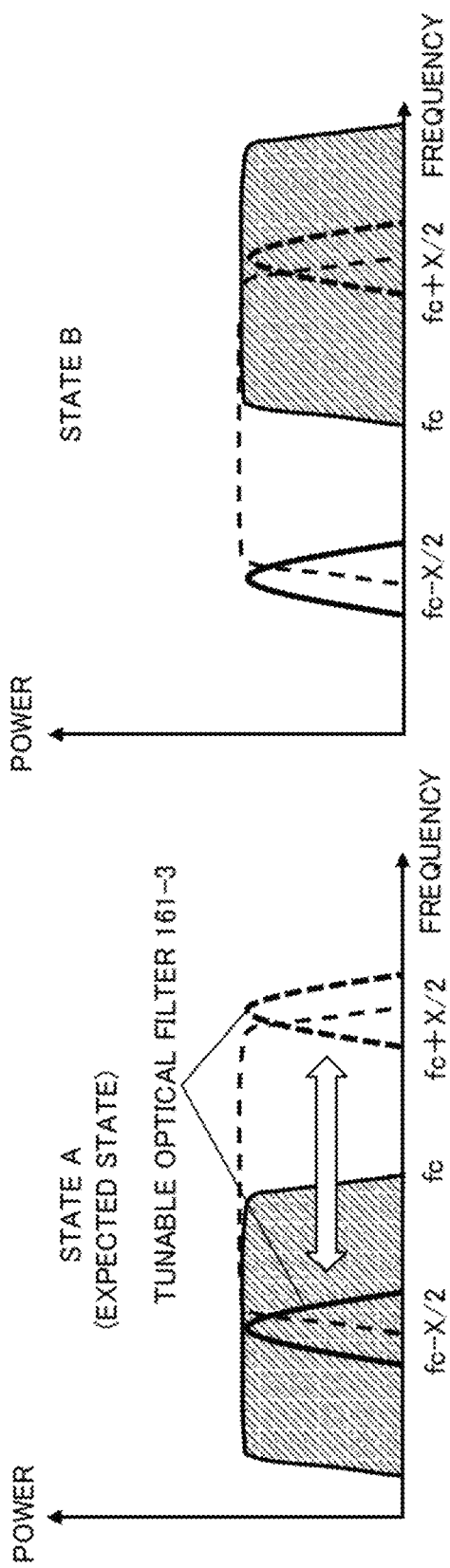
FIGS. 49A and 49B are diagrams illustrating examples of a relation between the two possible states of the modulated signal optical spectrum illustrated in FIGS. 46A and 46B and filter characteristics of the optical tunable filter illustrated in FIG. 13 according to a first modified example of the fifth embodiment.

FIGS. 49A and 49B schematically illustrates a relation between the modulated signal optical spectrum in the state A of FIG. 46A and FIG. 46B and the filter characteristics of the optical tunable filter 161-3.

The filter characteristics indicated by a solid line in FIGS. 49A and 49B indicate filter characteristics when the center frequency of the optical tunable filter 161-3 is set and control to fc−X/2.

The filter characteristics indicated by a dotted line in FIGS. 49A and 49B indicate filter characteristics when the center frequency of the optical tunable filter 161-3 is set and control to fc+X/2.

When the modulated signal optical spectrum is in the "expected state A" of FIG. 46A, and the center frequency of the optical tunable filter 161-3 is set to fc−X/2 as illustrated in FIG. 49A, the signal light component is output. When the center frequency of the optical tunable filter 161-3 is set to fc+X/2, the signal light component is not substantially output.

Adversely, when the modulated signal optical spectrum is in the "state B" of FIG. 46B, and the center frequency of the optical tunable filter 161-3 is set to fc−X/2 as illustrated in FIG. 49B, the signal light component is not substantially output. When the center frequency of the optical tunable filter 161-3 is set to fc+X/2, the signal light component is output.

The controller 18 is available to detect the sign state of the transmission data signal based on the signal optical power detected through the power detector 163 when the center frequency of the optical tunable filter 161-3 is set to each of fc±X/2 [GHz]. The controller 18 is available to perform the sign control A (or the bias control B) of the transmission data signal based on the detection result.

Figure 50:
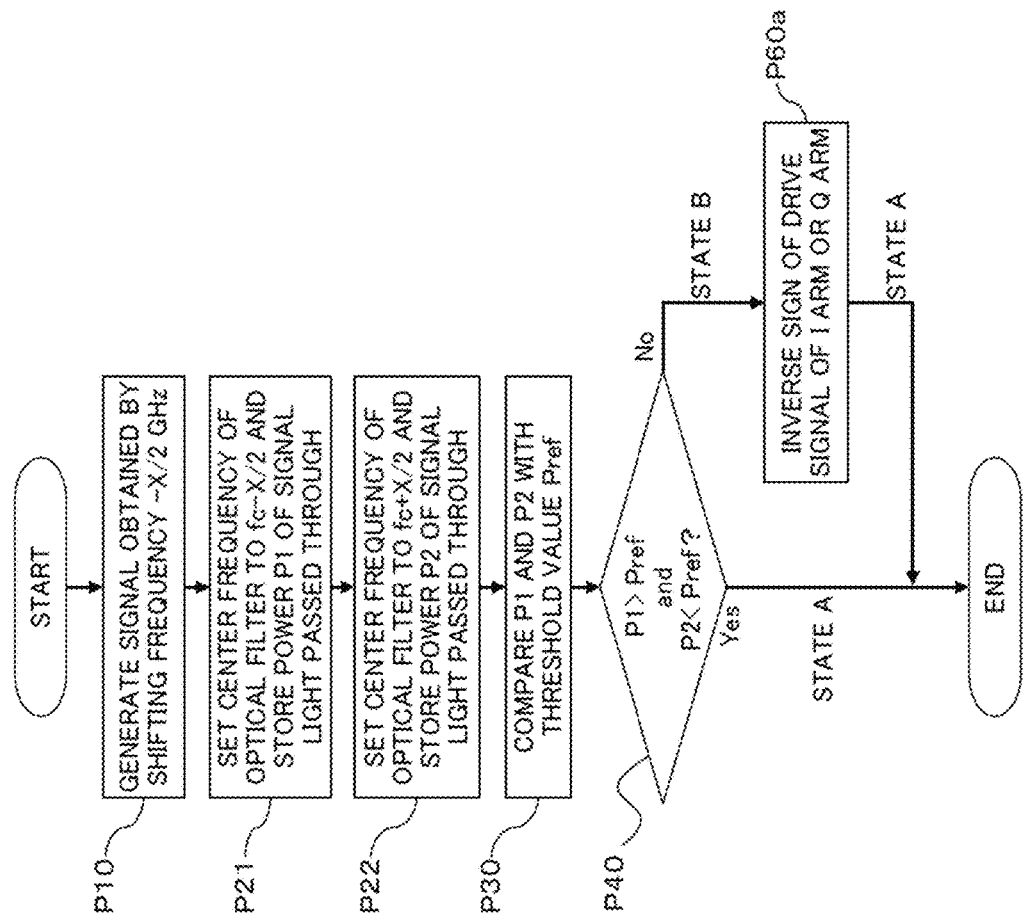
FIG. 50 is a flowchart illustrating an exemplary operation according to a first modified example of the fifth embodiment.

FIG. 50 is a flowchart illustrating an exemplary operation according to the first modified example of the fifth embodiment. The flowchart of FIG. 50 corresponds to the flowchart illustrated in FIG. 15.

However, in the first modified example of the fifth embodiment, since it is enough that the two possible states A and B can be discriminated, the threshold value comparison process P50 to discriminate the state B and the state C (or the state D) in the flowchart illustrated in FIG. 15 may be unnecessary in FIG. 50.

For this reason, processes P70, P81, P82, and P90 to P110 for converting the state C or the state D into the state A or the state B in FIG. 15 may be unnecessary in FIG. 50 as well.

In FIG. 50, when P1<Pref and P2>Pref are satisfied, and the modulated signal optical spectrum is in the "state B" (No in process P40), the sign inversion process P60a may be the same as process P60a of FIG. 48.

In other words, the controller 18 is available to convert the state B into the state A "(I, Q)" by inversely controlling the sign of the drive signal of the Q arm (or the I arm) through, for example, the sign controller 182.

As described above, according to the first modified example of the fifth embodiment, the same operations and effects as in the fifth embodiment can be obtained, and the same operations and effects as in the first modified example of the first embodiment can be obtained.

Second Modified Example of Fifth Embodiment

Similarly to the second modified example of the first embodiment, in the fifth embodiment, the detection of the maximum value of the power information does not need to be performed, and the signs of the drive signals applied to the I arm and the Q arm of the optical modulator 14 may be controlled in the sign combination corresponding to the detected maximum value.

For example, the configuration (the optical filter 161-4, the PD 162, and the power detector 163) illustrated in FIG. 16 may be applied to the monitor 16 according to the second modified example of the fifth embodiment. The filter characteristics of the optical filter 161-4 may be the same as or similar to the second modified example of the first embodiment.

Figure 51A:
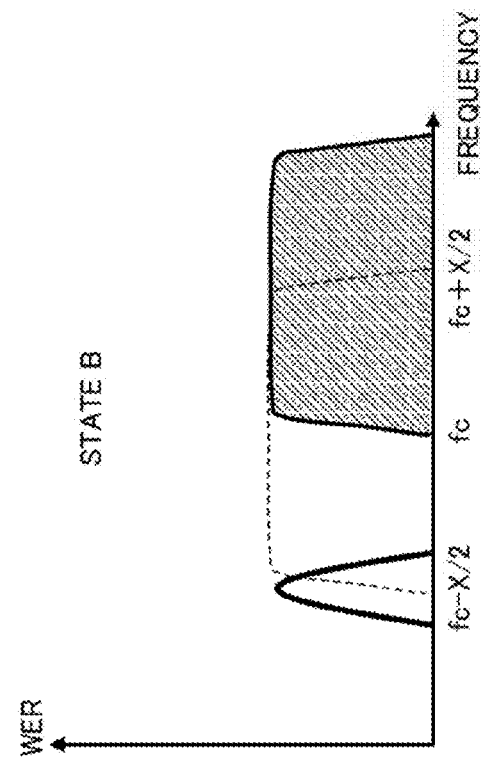
FIGS. 51A and 51B are diagrams illustrating examples of a relation between the two possible states of the modulated signal optical spectrum illustrated in FIGS. 46A and 46B and filter characteristics of the optical filter illustrated in FIG. 16 according to a second modified example of the fifth embodiment.
Figure 51B:
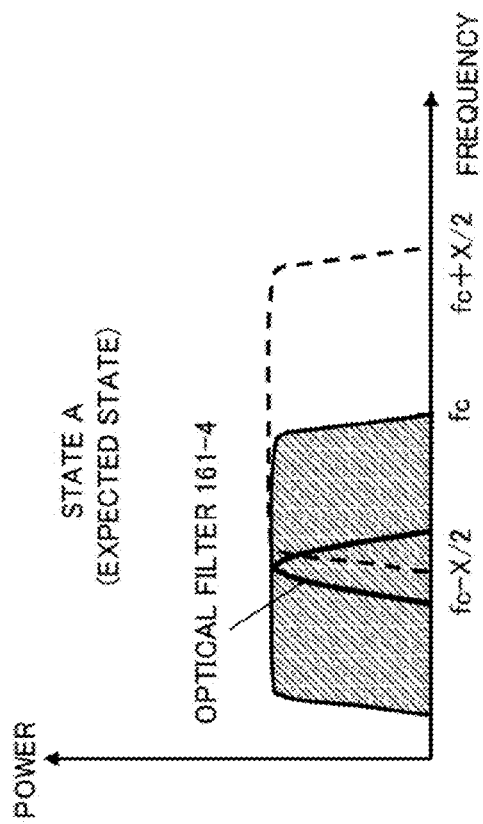

FIG. 51A schematically illustrates a relation between the modulated signal optical spectrum in the state A of FIG. 46A and the filter characteristics of the optical filter 161-4. FIG. 51B schematically illustrates the relation with the filter characteristics of the optical filter 161-4 in the state B of FIG. 46B.

Here, the two possible states A and B illustrated in FIGS. 46A and 46B correspond to two combinations of the signs of the drive signals applied to the I arm and the Q arm of the optical modulator 14.

One of the two possible states A and B in which the power of the signal light component that is passed through the optical filter 161-4 and detected through the power detector 163 becomes maximum is the "expected state A."

Thus, the controller 18 may control the signs of the drive signals of the I arm and the Q arm of the optical modulator 14 in the sign combination in which the power of the signal light component detected through the power detector 163 is maximum.

FIG. 52 is a flowchart illustrating an exemplary operation according to the second modified example of the fifth embodiment. The flowchart of FIG. 52 corresponds to the flowchart illustrated in FIG. 18.

However, in the second modified example of the fifth embodiment, it is enough to detect the maximum value of the power information P1 and P2 for the two sign combinations corresponding to the two possible states A and B. Thus, in FIG. 52, processes P230, P240, and P250 illustrated in FIG. 18 are replaced with processes P230a, P240a, and P250a. Processes P210 and P220 of FIG. 52 may be the same as or similar to processes P210 and P220 illustrated in FIG. 18.

In process P240a, for example, the optical modulator 14 is sequentially driven according to a total of four sign combinations by individually inverting or non-inverting the signs of the drive signals of the I arm and the Q arm of the optical modulator 14.

Accordingly, for example, as shown in the following Table 2, the power P1 and P2 of the signal light component passed through the optical filter 161-4 in the two sign combinations of the drive signals is detected through the power detector 163. Information indicating the detected power P1 and P2 may be stored in the storage unit 184 of the controller 18 together with information indicating the corresponding sign combination.

TABLE 2

| Example of two sign combinations | | |
| --- | --- | --- |
| 1 | (I, Q) | P1 |
| 2 | (I, −Q) | P2 |

In process P240a, the controller 18 may detect the maximum value of the power information P1 and P2 stored in the storage unit 184 through, for example, the sign state detector 181. The sign combination corresponding to the maximum value is a drive condition of the optical modulator 14 under which the "expected state A" of the modulated signal optical spectrum is obtained.

In process P250a, the controller 18 may set and control the drive signals of the I arm and the Q arm in the sign combination corresponding to the detected maximum value through, for example, the sign controller 182. Accordingly, it is possible to perform control such that the modulated signal optical spectrum enters the "expected state A."

As described above, according to the second modified example of the fifth embodiment, the same operations and effects as in the fifth embodiment and the first modified example of the fifth embodiment can be obtained, and the same operations and effects as in the second modified example of the first embodiment can be obtained.

Third Modified Example of Fifth Embodiment

In the second modified example of the fifth embodiment, the maximum value of the power P1 and P2 is detected, but similarly to the third modified example of the first embodiment, even when the minimum value of the power P1 and P2 is detected, it is possible to perform control such that the modulated signal optical spectrum enters the "expected state A."

Figure 53:
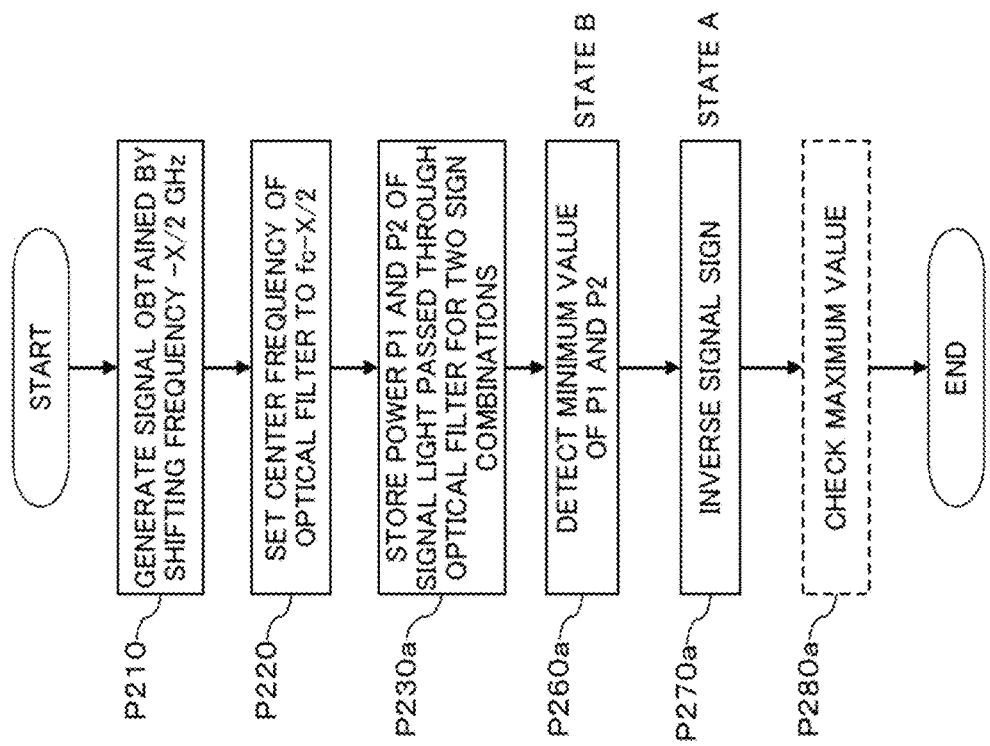
FIG. 53 is a flowchart illustrating an exemplary operation according to a third modified example of the fifth embodiment.

An exemplary operation thereof is illustrated in a flowchart of FIG. 53. The flowchart of FIG. 53 corresponds to a flowchart of FIG. 19. Processes P210 and P220 of FIG. 53 may be the same as or similar to processes P210 and P220 illustrated in FIGS. 19 and 52. Process P230a of FIG. 53 may be the same as or similar to process P230a illustrated in FIG. 52.

However, since the minimum value of the power P1 and P2 is detected, in FIG. 53, processes P260 and P270 illustrated in FIG. 19 are replaced with processes P260a and P270a.

In process P260a, in the controller 18, for example, the sign state detector 181 may detect the minimum value of the power information P1 and P2. The sign combination corresponding to the minimum value corresponds to, for example, the state B illustrated in FIG. 51B.

The state B can be discriminated by the state B "(I, −Q)" or the state B "(−I, Q)." Thus, in process P270a, the controller 18 is possible to invert the state B into the state A "(I, Q)" by inverting the signs of the drive signals of the I arm or the Q arm through, for example, the sign controller 182.

Thus, according to the third modified example of the fifth embodiment, the same operations and effects as in the second modified example of the fifth embodiment can be obtained, and the same operations and effects as in the third modified example of the first embodiment can be obtained.

After process P270a, the controller 18 may perform process P280a which is the same as process P280 illustrated in FIG. 19 as an option. In process P280a, the controller 18 (for example, the sign state detector 181) may check whether or not the power detected through the power detector 163 corresponds to the maximum value of the power information P1 and P2, in other words, the state A. When the detected power corresponds to the state A, process P210 and a process subsequent thereto in FIG. 53 may be performed again.

The fifth embodiment and the first to third modified examples thereof correspond to the examples in which the monitors 16 and the controllers 18 described in the first embodiment and the first to third modified examples thereof are applied to the optical transmitter 1 of the modulation scheme without using the polarization multiplexing.

The monitors 16 and the controllers 18 described in the second embodiment and the first to third modified examples thereof and the third embodiment and the first to third modified examples thereof can be similarly applied to the optical transmitter 1 of the modulation scheme without using the polarization multiplexing which is illustrated in FIG. 45.

In all of the above application examples, the number of states in which the modulated signal optical spectrum can be obtained according to the relation between the sign of the drive signal of the optical modulator 14 and the bias control point is four in the polarization multiplexing scheme but reduced to two, and thus it is enough to discriminate the two possible states and to perform the sign control A.

For example, in the examples in which the second embodiment and the first to third modified examples thereof are applied to the optical transmitter 1 of the modulation scheme without using the polarization multiplexing illustrated in FIG. 45, it is enough to discriminate the two possible states (the X polarization and the Y polarization do not need to be discriminated from each other) illustrated in FIGS. 21A and 21B.

In the examples in which the third embodiment and the first to third modified examples thereof are applied to the optical transmitter 1 of the modulation scheme without using the polarization multiplexing illustrated in FIG. 45, it is enough to discriminate the two possible states (the X polarization and the Y polarization do not need to be discriminated from each other) illustrated in FIGS. 33A and 33B.

When the exemplary configurations and the exemplary operations described above in the second embodiment and the first to third modified examples thereof and the third embodiment and the first to third modified examples thereof are replaced by considering that it is enough to discriminate the two possible states, a person skilled in the art can understood that an application to the optical transmitter 1 of the non-polarization multiplexing modulation scheme can be easily implemented.

Further, Since it is enough to discriminate the two possible states in which the X polarization and the Y polarization do not need to be discriminated from each other even for the bias control B described above in the fourth embodiment, an application to the optical transmitter 1 of the non-polarization multiplexing modulation scheme illustrated in FIG. 45 can be easily implemented.

As an example, FIG. 54 is a flowchart illustrating an exemplary operation focusing on the bias control B in the optical transmitter 1 of the non-polarization multiplexing modulation scheme illustrated in FIG. 45. FIG. 54 is a flowchart corresponding to FIG. 44 according to the fourth embodiment.

However, in FIG. 54, it is enough to discriminate the two possible states A and B, and the threshold value comparison process P50 to discriminate the state B and the state C (or the state D) in the flowchart illustrated in FIG. 44 may be unnecessary.

For this reason, processes P70a and P80 to P110 for converting the state C or the state D into the state A or the state B in FIG. 44 may be unnecessary in FIG. 54 as well.

In FIG. 54, when P1<Pref and P2>Pref are satisfied, and the modulated signal optical spectrum is in the "state B" (No in process P40), the controller 18 may perform process P60b instead of process P60a of FIG. 44.

In process P60b, the controller 18 may perform control such that the current bias control point corresponding to the Q arm (or the I arm) is changed to a bias control point corresponding to an adjacent "bottom" of the periodic extinction curve illustrated in FIG. 2.

For example, the controller 18 may perform control such that the bias control point A of FIG. 2 is changed to the adjacent bias control point B, perform control such that the bias control point B is changed to the adjacent bias control point A or C, and perform control such that the bias control point C is changed to the adjacent bias control point B.

Even in any of the above cases, since the output light phase of the optical modulator 14 is shifted by π by performing control such that the bias control point is changed to the adjacent bias control point, equivalent control to the inversion control of the sign of the drive signal in the sign control A can be performed.

Thus, in process P60b, the controller 18 is possible to convert the state B "(I, −Q)" or the state B "(−I, Q)" into the expected state A "(I, Q)."

In the bias control B illustrated in FIG. 54, the I arm and the Q arm of the optical modulator 14 are the target of the bias control. However, the phase shifter 144 of the optical modulator 14 may be the target of the bias control B alternatively or additionally.

For example, the controller 18 is possible to convert the state B into the state A by controlling the bias voltage of the phase shifter 144 and by changing the phase shift amount of the light propagated between the I arm and the Q arm by, for example, "π."

(Others)

The above embodiments and the modified examples thereof can be applied to the polarization multiplexing optical modulator 14A or the optical transmitter 1 that applies phase rotation to the transmission data signal used as the drive signal of the optical modulator 14 using the digital signal processing.

Examples of a process of applying the phase rotation to the transmission data signal using the digital signal processing include a process of shifting the carrier frequency, a process of performing FSK on the transmission data signal, and a process of pre-equalizing wavelength dispersion occurring in the optical transmission line using the digital signal processing.

For example, when the FSK is performed on the transmission data signal, and the state of the optical transmission line through which the modulated signal light is transmitted is monitored at the reception side, it is possible to prevent the sign of the transmission data signal from being inverted, and it is possible to properly monitor the state of the optical transmission line.

Further, since it is possible to prevent the sign of the transmission data signal from being inverted, a polarization separation process at the reception side and a process of compensating a frequency difference between a local light with which an optical receiver is equipped and the data signal are easily performed.

Further, since it is possible to prevent mirroring of the constellation illustrated in FIGS. 5A and 5B, for example, when evaluation of a signal quality such as a bit error rate (BER) or the like is performed, it is unnecessarily discriminated whether or not a sign is inverted. Thus, a processing time of the evaluation of the signal quality can be reduced.

In the monitor 16, a spectrum analyzer, frequency analysis by fast Fourier transform (FFT), or the like may be used. Through the spectrum analyzer or the frequency analysis, it is possible to monitor whether or not the component of the modulated signal light appears in the specific frequency (for example, either of fc±X/2N (or fc±X/2M or fc±X/2K)) according to the frequency shift of the drive signal. However, as described above, when the optical filter, the PD, and the power detector, the size and the cost of the monitor 16 can be reduced.

All examples and conditional language provided herein are intended for pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiment (s) of the present invention have been described in detail, it should be understood that the various changes, substitutions, and alterations could be made hereto without departing from the spirit and scope of the invention.

What is claimed is:

1. An optical transmitter, comprising:
a signal generator configured to generate a signal shifted from a carrier frequency in a frequency domain by using digital signal processing;
an optical modulator configured to be driven with a drive signal based on the signal;
a monitor configured to monitor whether or not a component of modulated signal light output from the optical modulator appears in a specific frequency depending on a frequency shift performed by the digital signal processing; and
a controller configured to control a relation between a sign of the drive signal and an operating point of the optical modulator according to a monitored result of the monitor,
wherein the controller
discriminates a direction in which the modulated signal light is shifted in the frequency domain according to the frequency shift, and
controls the relation such that the discriminated shift direction is identical to a direction of the frequency shift.

2. The optical transmitter according to claim 1,
wherein the signal generated by the signal generator is a signal with a baud rate of B/N (B is a positive real number indicative of the baud rate, and N is an integer of 1 or more) and is shifted from the carrier frequency fc by either of ±X/2N (X is a positive real number indicative of a spectrum width of the modulated signal light of the baud rate B/N) in the frequency domain, and
the specific frequency is either of ±X/2N.

3. The optical transmitter according to claim 2,
wherein the signal shifted from the carrier frequency fc in a frequency domain by either of ±X/2N corresponds to one of N subcarrier signals with the baud rate B/N.

4. The optical transmitter according to claim 2,
wherein the monitor includes
a first optical filter configured to allow light of a frequency component with a center frequency of fc−X/2N to pass through,
a second optical filter configured to allow light of a frequency component with a center frequency of fc+X/2N to pass through, and
a power detector configured to detect power of the light passed through the first optical filter and power of the light passed through the second optical filter.

5. The optical transmitter according to claim 2,
wherein the monitor includes
an optical tunable filter, and
a power detector configured to detect power of lights time-divisionally passed through the optical tunable filter upon time-divisionally setting a pass center frequency of the optical tunable filter to frequencies to allow lights of frequency components with center frequencies of fc±X/2N to pass through.

6. The optical transmitter according to claim 2,
wherein the monitor includes
an optical filter configured to allow light of a frequency component with a center frequency of either of fc±X/2N to pass through, and
a power detector configured to detect power of light passed through the optical filter,
wherein the controller is configured to
change a sign combination of positive and negative signs of an in-phase component and a quadrature component of the drive signal to detect a maximum value of the power detected by the power detector, and
discriminate that the sign combination corresponding to the detected maximum value is a sign combination to shift the modulated signal light in the frequency domain in the same direction as the direction of the frequency shift.

7. The optical transmitter according to claim 2,
wherein the monitor includes
an optical filter configured to allow light of a frequency component with a center frequency of either of fc±X/2N to pass through, and
a power detector configured to detect power of light passed through the optical filter,
wherein the controller is configured to
change a sign combination of positive and negative signs of an in-phase component and a quadrature component of the drive signal to detect a minimum value of the power detected by the power detector, and
discriminate that the sign combination corresponding to the detected minimum value is a sign combination to shift the modulated signal light in the frequency domain in a direction opposite to the direction of the frequency shift.

8. The optical transmitter according to claim 1,
wherein a control of the relation between the sign of the drive signal and the operating point of the optical modulator by the controller includes a control of the positive and negative signs of an in-phase component and a quadrature component of the drive signal.

9. The optical transmitter according to claim 8,
wherein the optical modulator is a polarization multiplexing optical modulator configured to generate polarization multiplexing modulated signal light,
the signal generator generates the signal shifted from the carrier frequency in the frequency domain for each different polarizations, and
the controller controls the positive and negative signs of the in-phase component and the quadrature component of the drive signal for each of the polarizations.

10. The optical transmitter according to claim 1,
wherein a control of the relation between the sign of the drive signal and the operating point of the optical modulator by the controller includes a control of a bias voltage used to set the operating point of the optical modulator.

11. A control method of an optical transmitter with an optical modulator, comprising:

generating a signal shifted from a carrier frequency in a frequency domain by using digital signal processing;
driving the optical modulator with a drive signal based on the signal;
monitoring whether or not a component of modulated signal light output from the optical modulator appears in a specific frequency depending on a frequency shift performed by the digital signal processing; and
controlling a relation between a sign of the drive signal and an operating point of the optical modulator according to a monitored result by the monitoring,
wherein the controlling includes:
discriminating a direction in which the modulated signal light is shifted in the frequency domain according to the frequency shift; and
controlling the relation such that the discriminated shift direction is identical to a direction of the frequency shift.

* * * * *